US011751548B2

United States Patent
Doberenz

(10) Patent No.: US 11,751,548 B2
(45) Date of Patent: Sep. 12, 2023

(54) RESONANT ULTRASONIC BARRIERS AND METHODS FOR GENERATING THEM

(71) Applicant: X-Tirp, Inc., Tigard, OR (US)

(72) Inventor: Philip W. Doberenz, Tigard, OR (US)

(73) Assignee: X-Tirp, Inc., Tigard, OR (US)

( * ) Notice: Subject to any disclaimer, the term of this patent is extended or adjusted under 35 U.S.C. 154(b) by 0 days.

(21) Appl. No.: 17/536,012

(22) Filed: Nov. 27, 2021

(65) Prior Publication Data

US 2022/0095598 A1 Mar. 31, 2022

Related U.S. Application Data

(63) Continuation of application No. 16/365,652, filed on Mar. 26, 2019, now Pat. No. 11,213,021.

(60) Provisional application No. 62/647,948, filed on Mar. 26, 2018, provisional application No. 62/647,986, filed on Mar. 26, 2018.

(51) Int. Cl.
*A01K 79/00* (2006.01)
*A01K 97/20* (2006.01)
*A01K 63/02* (2006.01)
*A01M 29/18* (2011.01)

(52) U.S. Cl.
CPC .............. *A01K 79/00* (2013.01); *A01K 63/02* (2013.01); *A01K 97/20* (2013.01); *A01M 29/18* (2013.01)

(58) Field of Classification Search
CPC ...... A01M 19/18; A01M 29/16; A01M 29/18; A01K 79/00; A01K 97/20
See application file for complete search history.

(56) References Cited

U.S. PATENT DOCUMENTS

| 1,292,246 | A | | 1/1919 | Burkey | |
|---|---|---|---|---|---|
| 3,802,109 | A | * | 4/1974 | Stein | A01K 79/00 43/17.1 |
| 4,922,468 | A | * | 5/1990 | Menezes | H04B 1/02 367/139 |
| 5,042,187 | A | | 8/1991 | Bentzley | |
| 5,445,111 | A | | 8/1995 | Smith | |
| 6,252,496 | B1 | * | 6/2001 | Jackson | G08B 3/00 340/384.73 |
| 6,343,433 | B1 | | 2/2002 | Granberg | |
| 7,537,358 | B2 | | 5/2009 | De Ginto et al. | |

(Continued)

FOREIGN PATENT DOCUMENTS

| CN | 111436389 | 7/2020 |
|---|---|---|
| EP | 3355692 | 4/2021 |
| JP | 2006345851 | 12/2006 |

OTHER PUBLICATIONS

NPL1-Translation of CN111436389.
(Continued)

*Primary Examiner* — Joshua J Michener
*Assistant Examiner* — Henry Hooper Mudd
(74) *Attorney, Agent, or Firm* — Enterprise Patent LLC

(57) ABSTRACT

Certain types of fish respond differently to certain stimuli than other types of fish. Particularly, predetermined sound or vibration can cause certain types of fish to move away or jump. These reactions by particular types of fish can be used to capture the fish or prevent them from accessing parts of water systems. An exemplary capture mechanism employs multiple receptacles adapted to catch jumping fish from the air. An exemplary barrier of directed sound can prevent fish migration.

36 Claims, 21 Drawing Sheets

(56) References Cited

U.S. PATENT DOCUMENTS

| | | |
|---|---|---|
| 7,975,425 B1 | 7/2011 | VanBurch et al. |
| 2014/0247696 A1* | 9/2014 | Lee .................. A01M 29/16 |
| 2019/0021303 A1* | 1/2019 | Swaddle .............. A01M 29/18 |

OTHER PUBLICATIONS

NPL2-Translation of JP2006345851.

NPL3-Ovivo, Downloaded from https://bugwoodcloud.org/mura/mipn/assets/File/MNWIISC%20talks/upload%20folder/Control%20of%20Invasive%20Carp%20Movements%20Sing.pdf on Nov. 27, 2021.

Asian Carp Integrated Control and Containment, downloaded from https://www.usgs.gov/special-topic/glrist/science/asian-carp-integrated-control-and-containment?qtscience_center_objects=0#qt-science_center_objects on Nov. 27, 2021.

Asian Carp Integrated Control and Containment/ Acoustic Deterrents for Asian Carp, Downloaded https://www.usgs.gov/special-topic/glrist/science/asian-carp-integrated-control-and-containment-acoustic-deterrentsasian?qt-science_center_objects=0#qt-science_center_objects on Nov. 27, 2021.

Philip W. Doberenz, "Carp Barrier Diversion Net," was submitted to an InnoCentive contest under strict nondisclosure on Oct. 31, 2017.

Philip W. Doberenz, "Resonant Ultrasonic Carp Barrier," was submitted to an InnoCentive contest under strict nondisclosure on Oct. 31, 2017. This paper was later publicly disclosed by InnoCentive as a contest winner on Mar. 27, 2018.

Philip W. Doberenz, poster (not attached) listing, but not disclosing in detail, the concepts of the "Carp Barrier Diversion Net," the "Resonant Ultrasonic Carp Barrier," and the "Conveyor Net Boat," was disclosed on Mar. 27, 2018.

Philip W. Doberenz, poster "Resonant Ultrasonic Carp Barrier" was disclosed on Mar. 27, 2018 at the InnoCentive contest winner convention.

Philip W. Doberenz, "Resonant Ultrasonic Carp Barrier," was presented as a Power Point on Mar. 27, 2018 at the InnoCentive contest winner convention.

"A Modulation Method of Parametric Array for Underwater Acoustic Communication," Tang et al., Applied Acoustics 145 (2019) 305-313.

* cited by examiner

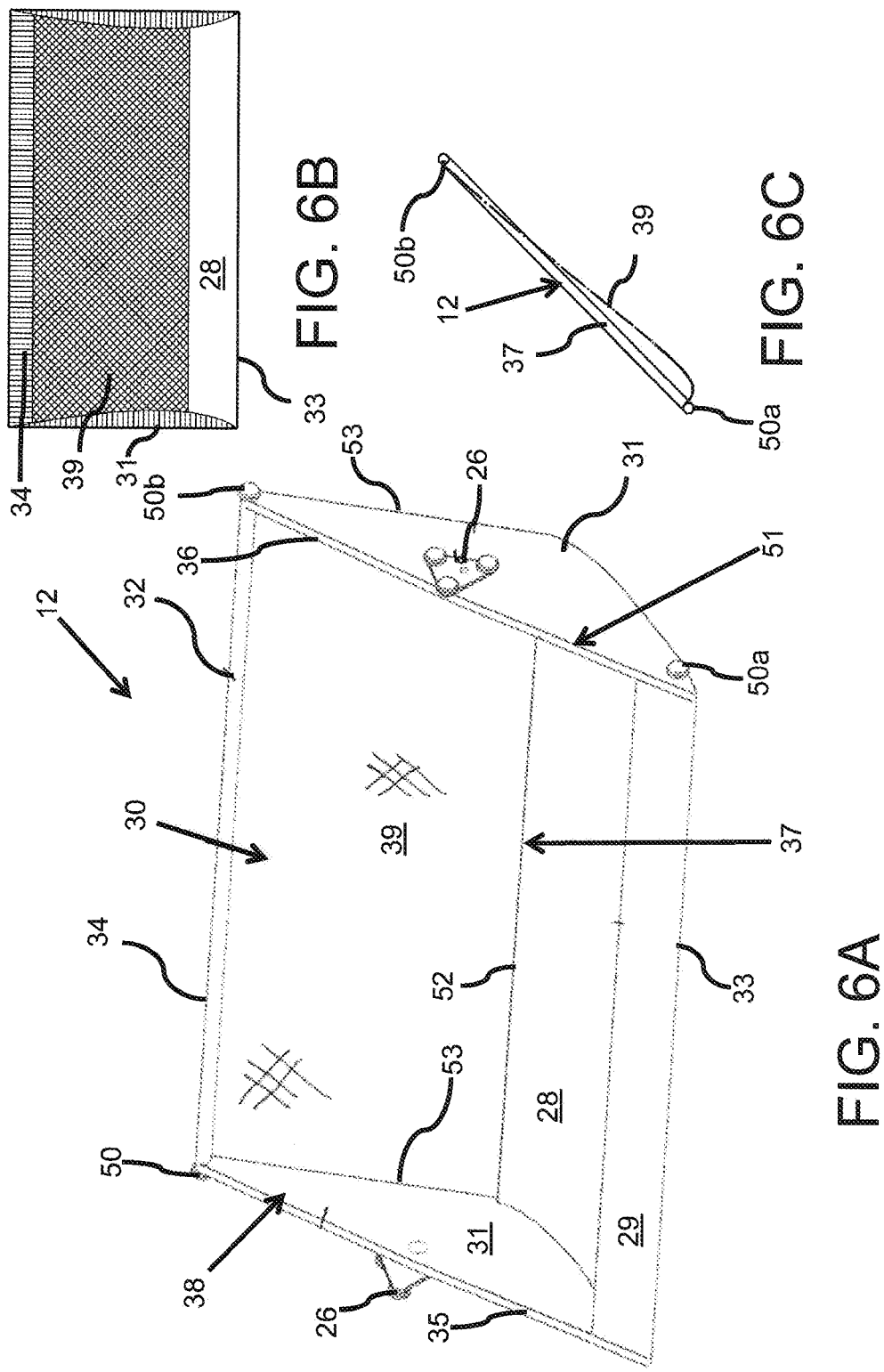

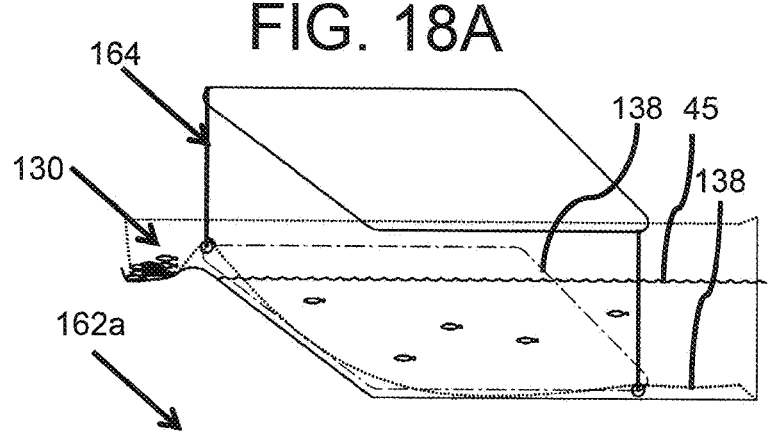
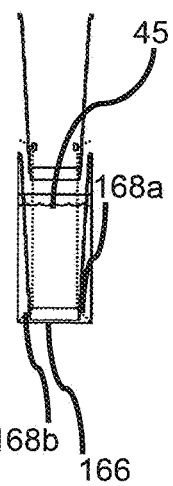
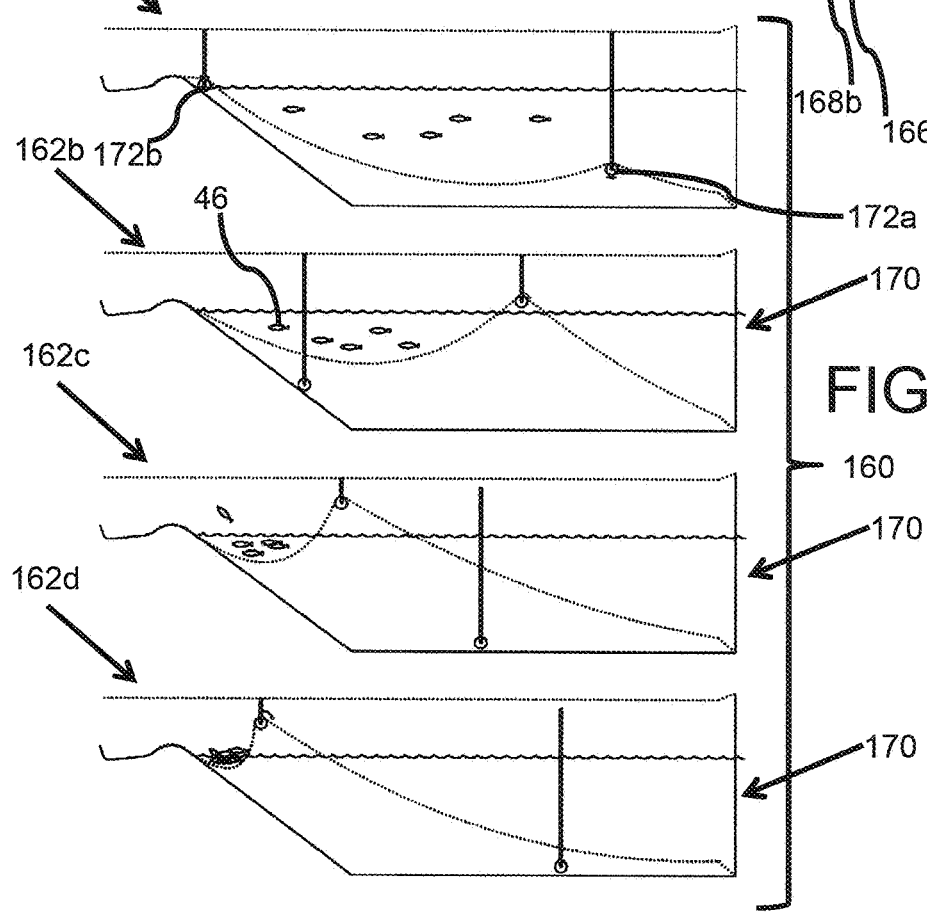
FIG. 18A
FIG. 18B
FIG. 18C

RESONANT ULTRASONIC BARRIERS AND METHODS FOR GENERATING THEM

CROSS REFERENCE TO RELATED APPLICATION

This application is a continuation of U.S. patent application Ser. No. 16/365,652, filed on Mar. 26, 2019, the contents of which are herein incorporated by reference in their entirety for all purposes, which is a non-provisional application of U.S. Provisional Application No. 62/647,986, which was filed on Mar. 26, 2018, the contents of which are herein incorporated by reference in their entirety for all purposes, and this application is a non-provisional application of U.S. Provisional Application No. 62/647,948, which was filed on Mar. 26, 2018, the contents of which are herein incorporated by reference in their entirety for all purposes.

TECHNICAL FIELD

This application relates to systems and methods for catching fish and, in particular, to systems and methods for catching fish in the air and/or this application relates to systems and methods for deterring passage of fish and, in particular, to systems and methods for creating a sound barrier that deters the passage of fish.

BACKGROUND INFORMATION

Invasive species of fish are devastating ecosystems in North America. Some of these invasive fish include non-native species of fish, such as Asian carp including silver carp. This disclosure proceeds only by way of example with reference to Asian and silver carp as invasive species of interest; however, this disclosure should not be considered to be limited only to Asian or silver carp or invasive fish in general.

Although nonnative species tend to harm ecosystems that they have invaded by outcompeting native fish for limited resources, some species of invasive fish have commercial value. For example, Asian carp are valued for their delicate flavor. Moreover, almost any type of fish can be used as a protein source or as fertilizer. Commercial fishing of some targeted invasive fish, such as Asian carp, is currently done using gill nets, where net openings are big enough to allow a fish to insert its head through the net, but small enough so that the rest of the body can't get through.

There are several problems with relying on this method as the primary and possibly the only method to catch Asian carp. Although a gill net is selective in the size fish the net captures, a gill net is not selective in targeting only invasive species such as Asian carp. The size range of the gill net mesh typically limits its catch to large fish within a certain size range, so fish that are smaller or larger are not caught. Thus, a gill net is not so effective for completely eliminating of the invasive species, and at best, slows down its population increase. Gill nets can also interfere with boat traffic, get snagged on river bottom debris, and require large open water for maximum efficiency, all of which limit the places and times that a gill net can be deployed.

In addition, gill nets are time consuming and labor intensive to deploy and retrieve. Then, the after the net is retrieved, the captured fish are removed individually from the net, which for large fish, can be hard and time-consuming work. Because gill netting is essentially a batch process, a long time may elapse between pulling the first fish and last fish out of the net. More time is added bringing the fish to shore, loading them on a truck (often by hand one-at-time), and driving (often in an unrefrigerated truck) them to a processing plant. Accordingly, the result is that the fish are no longer fresh, and are often smelly, which not only negatively affects the workers in the processing plant, and the community around the plant, the state of decay of the fish also limits the use of the meat to be good only for dog food or fertilizer.

If the fish were brought in fresh, and not smelly, there would be more profit, more incentives to build more plants. Moreover, communities would value having a processing plant in their back yard because it could provide steady jobs.

OVERVIEW OF DISCLOSURE

This overview is provided to introduce a selection of concepts in a simplified form that are further described in greater detail below. This overview is not intended to identify key or essential inventive concepts of the claimed subject matter, nor is it intended for limiting the scope of the claimed subject matter.

Silver carp normally congregate near the surface because they primarily eat phytoplankton, which are plants that need light. Among invasive species, silver carp appear to be unique among fish living in North America in that they can be induced to jump out of the water, as high as 10 feet, by various stimuli such as sound, motion, electric shock, vibration, bubbles, light, etc. Because silver carp have an average size of 30 to 40 pounds and can grow to 110 pounds, these fish are not only a threat to the environment, but also pose a threat of serious injury to people (such as recreational boaters or fishermen) when the fish leap into the air.

It is believed that no known species of fish native to North America typically behave by jumping out of the water in response to a disturbance. Thus, essentially all of the fish that can be induced to jump out of the will be silver carp. By catching them in the air, all sizes of silver carp can be harvested, without concern that native fish will be caught or harmed in the process.

People have attempted to catch these fish out of the air by shooting them with a bow-fishing rig or swinging a large net with a handle in hopes of snagging one. Others simply hope that a jumping fish will just land in the boat. However, there appears to be no known large-scale mechanism for catching silver carp while they in the air. Accordingly, this disclosure presents embodiments for catching fish from the air.

In some embodiments, a system for capturing fish from a body of water having a surface, comprises: a stimulation device for causing multiple ones of the fish to jump above the surface of the body of water; a capture mechanism including multiple receptacles pivotally attached to a conveying mechanism that is operable to convey the receptacles along a looped conveying path, wherein each of the multiple receptacles has an opening large enough to capture multiple ones of the fish, wherein respective pivotal attachments of the multiple receptacles are operable to orient respective openings in a first orientation to capture multiple ones of the fish while they are above the surface of the water; and a storage area adapted for receiving fish emptied from the receptacles along the conveying path when the receptacles are oriented at a second orientation that is different from the first orientation.

In some additional and/or cumulative embodiments, the system employs a receptacle tilting mechanism that is operable to change an orientation and/or an angle of the opening of the receptacle.

In some additional, alternative, and/or cumulative embodiments the capture mechanism is supported by floatable base.

In some additional, alternative, and/or cumulative embodiments, a method for capturing fish from a body of water having a surface, comprises: causing multiple ones of the fish to jump above the surface of the body of water in proximity to a base; employing a capture mechanism including one or more receptacles supported by the base and oriented to capture, above the surface of the body of water, multiple ones of the fish that jump; and transferring multiple ones of fish captured in the one or more receptacles to a storage area.

In some additional, alternative, and/or cumulative embodiments, a method for capturing fish from a navigable body of water having a surface, comprises: stimulating multiple ones of the fish to jump substantially simultaneously above the surface of the body of water in proximity to a moving floatable support; employing a capture mechanism including one or more receptacles operatively connected to the floatable support and oriented to capture substantially simultaneously, above the surface of the body of water, multiple ones of the fish that jump; and transferring multiple ones of fish captured from the one or more receptacles to a storage area operatively connected to the boat.

In some additional, alternative, and/or cumulative embodiments, a method for capturing a selected type of fish from a navigable body of water having a surface and containing multiple different types of fish, comprises: stimulating the selected type of fish to cause multiple ones of the selected type of fish to jump substantially simultaneously above the surface of the body of water in proximity to a moving floatable support; employing a capture mechanism including multiple moving receptacles operatively connected to the floatable support and oriented to capture substantially simultaneously, above the surface of the body of water, multiple ones of the fish that jump; and transferring multiple ones of fish captured from the one or more receptacles to a storage area operatively connected to the boat.

In some additional, alternative, and/or cumulative embodiments, the body of water comprises a lake, pond, river, stream, canal, or channel.

In some additional, alternative, and/or cumulative embodiments, the body of water comprises salt water.

In some additional, alternative, and/or cumulative embodiments, the body of water comprises an estuary, lagoon, marsh, or delta.

In some additional, alternative, and/or cumulative embodiments, the body of water comprises a bay or fjord.

In some additional, alternative, and/or cumulative embodiments, the fish is a selected type of fish, and wherein the body of water contains a second or different type of fish that is different from the selected type of fish.

In some additional, alternative, and/or cumulative embodiments, the selected type of fish is a selected species of fish.

In some additional, alternative, and/or cumulative embodiments, the selected type of fish is a non-native species of fish and wherein the different types of fish comprise native species of fish.

In some additional, alternative, and/or cumulative embodiments, the selected type of fish is non-native to North America.

In some additional, alternative, and/or cumulative embodiments, the selected type of fish is native to Asia.

In some additional, alternative, and/or cumulative embodiments the selected type of fish is Asian silver carp.

In some additional, alternative, and/or cumulative embodiments, the different types of fish comprise species of fish native to North America.

In some additional, alternative, and/or cumulative embodiments, the body of water comprises a stream, river, lake, or reservoir.

In some additional, alternative, and/or cumulative embodiments, the body of water is navigable.

In some additional, alternative, and/or cumulative embodiments, stimulating the fish employs an electrical device.

In some additional, alternative, and/or cumulative embodiments, stimulating the fish employs a mechanical device.

In some additional, alternative, and/or cumulative embodiments, stimulating the fish comprises generating a sound.

In some additional, alternative, and/or cumulative embodiments, stimulating the fish comprises generating a vibration.

In some additional, alternative, and/or cumulative embodiments, stimulating the fish comprises expulsion of one or more bursts of a gas.

In some additional, alternative, and/or cumulative embodiments, stimulating the fish comprises expulsion of one or more bursts of a gas, wherein the gas comprises air.

In some additional, alternative, and/or cumulative embodiments, stimulating the fish comprises expulsion of one or more flashes of light.

In some additional, alternative, and/or cumulative embodiments, stimulating the fish occurs below the surface of the body of water.

In some additional, alternative, and/or cumulative embodiments, stimulating the fish occurs above the surface of the body of water.

In some additional, alternative, and/or cumulative embodiments, stimulating the fish causes some different types of fish to descend deeper into the water.

In some additional, alternative, and/or cumulative embodiments, stimulating the fish causes some different types of fish to swim away from the boat.

In some additional, alternative, and/or cumulative embodiments, stimulating the fish occurs continuously or constantly.

In some additional, alternative, and/or cumulative embodiments, stimulating the fish occurs intermittently and regularly.

In some additional, alternative, and/or cumulative embodiments, stimulating the fish occurs intermittently and irregularly.

In some additional, alternative, and/or cumulative embodiments, the floatable support comprises a boat.

In some additional, alternative, and/or cumulative embodiments, the floatable support comprises at least two spaced-apart pontoons.

In some additional, alternative, and/or cumulative embodiments, the floatable support comprises a barge.

In some additional, alternative, and/or cumulative embodiments, the floatable support is motorized.

In some additional, alternative, and/or cumulative embodiments, the floatable support is moving transversely to the surface while the receptacles capture multiple ones of the fish that jump.

In some additional, alternative, and/or cumulative embodiments, movement of the floatable support causes multiple ones of the fish to jump.

In some additional, alternative, and/or cumulative embodiments, the floatable support is unmotorized.

In some additional, alternative, and/or cumulative embodiments, the floatable support is operatively connected to a second floatable support that is motorized.

In some additional, alternative, and/or cumulative embodiments, the floatable support is adapted to be stationary.

In some additional, alternative, and/or cumulative embodiments, the floatable support fails to prevent navigability of the body of water.

In some additional, alternative, and/or cumulative embodiments, the floatable support forms, or is operatively connected to, a barrier that facilitates containment of fish.

In some additional, alternative, and/or cumulative embodiments, the barrier is at least partly submerged.

In some additional, alternative, and/or cumulative embodiments, the barrier is at least partly above the surface of the water.

In some additional, alternative, and/or cumulative embodiments, the barrier provides complete containment above the surface of the water.

In some additional, alternative, and/or cumulative embodiments, the barrier provides only partial containment above the surface of the water.

In some additional, alternative, and/or cumulative embodiments, the barrier provides only partial containment below the surface of the water.

In some additional, alternative, and/or cumulative embodiments, the barrier comprises a moon pool.

In some additional, alternative, and/or cumulative embodiments, the barrier comprises side walls.

In some additional, alternative, and/or cumulative embodiments, the barrier has a height dimension that is transverse to the surface of the water.

In some additional, alternative, and/or cumulative embodiments, the barrier has a barrier major axis that is substantially parallel to the surface of the water.

In some additional, alternative, and/or cumulative embodiments, the barrier major axis is greater than or equal to 2 meters.

In some additional, alternative, and/or cumulative embodiments, the barrier major axis is greater than or equal to 3 meters.

In some additional, alternative, and/or cumulative embodiments, the receptacle has a receptacle major axis that is less than or equal to the barrier major axis.

In some additional, alternative, and/or cumulative embodiments, pontoons of the boat form a portion of the barrier.

In some additional, alternative, and/or cumulative embodiments, the barrier comprises a weir.

In some additional, alternative, and/or cumulative embodiments, the barrier defines a weir of greater than or equal to 100 square feet.

In some additional, alternative, and/or cumulative embodiments, the barrier defines a weir of greater than or equal to 150 square feet.

In some additional, alternative, and/or cumulative embodiments, the barrier defines a weir of greater than or equal to 200 square feet.

In some additional, alternative, and/or cumulative embodiments, the barrier defines a weir of less than or equal to 300 square feet.

In some additional, alternative, and/or cumulative embodiments, the number receptacles is greater than or equal to 3.

In some additional, alternative, and/or cumulative embodiments, the number receptacles is greater than or equal to 6.

In some additional, alternative, and/or cumulative embodiments, the number receptacles is greater than or equal to 8.

In some additional, alternative, and/or cumulative embodiments, the number receptacles is greater than or equal to 10.

In some additional, alternative, and/or cumulative embodiments, the number receptacles is less than or equal to 16.

In some additional, alternative, and/or cumulative embodiments, at least one of the receptacles comprises a leading edge and a trailing edge.

In some additional, alternative, and/or cumulative embodiments, the leading edge is positioned closer to the surface of the water than is the trailing edge during capture of fish that jump.

In some additional, alternative, and/or cumulative embodiments, the leading edge is positioned at or above the surface of the water during capture of fish that jump.

In some additional, alternative, and/or cumulative embodiments, the leading edge is positioned greater than or equal to 2.54 cm (1 inch) above the surface of the water during capture of fish that jump.

In some additional, alternative, and/or cumulative embodiments, the leading edge is positioned greater than or equal to 5.08 cm (2 inches) above the surface of the water during capture of fish that jump.

In some additional, alternative, and/or cumulative embodiments, the leading edge is positioned greater than or equal to 10.16 cm (4 inches) above the surface of the water during capture of fish that jump.

In some additional, alternative, and/or cumulative embodiments, the leading edge is positioned greater than or equal to 15.24 cm (6 inches) above the surface of the water during capture of fish that jump.

In some additional, alternative, and/or cumulative embodiments, the leading edge is positioned less than or equal to 30.48 cm (12 inches) above the surface of the water during capture of fish that jump.

In some additional, alternative, and/or cumulative embodiments, the leading edge is positioned less than or equal to 20.32 cm (8 inches) above the surface of the water during capture of fish that jump.

In some additional, alternative, and/or cumulative embodiments, the floatable support has a floatation direction of travel with respect to the surface, and wherein the leading edge is positioned before the trailing edge with respect to the floatation direction of travel during capture of the fish.

In some additional, alternative, and/or cumulative embodiments, the at least one receptacle has a receptacle direction of travel, and wherein the leading edge is positioned before the trailing edge with respect to the receptacle direction of travel during capture of the fish.

In some additional, alternative, and/or cumulative embodiments, the floatable support has a floatation direction of travel with respect to the surface, wherein the at least one receptacle has a receptacle direction of travel, and wherein the receptacle direction of travel is the same as the floatation direction of travel during capture of the fish.

In some additional, alternative, and/or cumulative embodiments, the floatable support has a floatation direction of travel with respect to the surface, wherein the at least one receptacle has a receptacle direction of travel, and wherein the receptacle direction of travel is different from the floatation direction of travel during capture of the fish.

In some additional, alternative, and/or cumulative embodiments, the receptacle has an opening adapted to capturing fish, wherein the opening has a major axis that is greater than or equal to 2 meters.

In some additional, alternative, and/or cumulative embodiments, the receptacle has an opening adapted to capturing fish, wherein the opening has a major axis that is greater than or equal to 2.5 meters.

In some additional, alternative, and/or cumulative embodiments, the receptacle has an opening adapted to capturing fish, wherein the opening has a major axis that is greater than or equal to 3 meters.

In some additional, alternative, and/or cumulative embodiments, the receptacle has an opening adapted to capturing fish, wherein the opening has a major axis that is greater than or equal to 4 meters.

In some additional, alternative, and/or cumulative embodiments, the receptacle has an opening adapted to capturing fish, wherein the opening has a major axis that is less than or equal to 7 meters.

In some additional, alternative, and/or cumulative embodiments, the receptacle has an opening adapted to capturing fish, wherein the opening has a major axis that is less than or equal to 6 meters.

In some additional, alternative, and/or cumulative embodiments, the receptacle has an opening adapted to capturing fish, wherein the opening has a major axis that is less than or equal to 5 meters.

In some additional, alternative, and/or cumulative embodiments, the receptacle has an opening adapted to capturing fish, wherein the opening has a major axis that is substantially parallel to the surface of the water.

In some additional, alternative, and/or cumulative embodiments, the receptacle has an opening adapted to capturing fish, wherein the opening has a minor axis that is transverse to the major axis.

In some additional, alternative, and/or cumulative embodiments, the receptacle has an opening adapted to capturing fish, wherein the opening has a minor axis that is transverse to the surface of the water.

In some additional, alternative, and/or cumulative embodiments, the receptacle has an opening adapted to capturing fish, wherein the opening comprises a frame.

In some additional, alternative, and/or cumulative embodiments, the frame has a rectangular shape.

In some additional, alternative, and/or cumulative embodiments, the frame has a nonrectangular shape.

In some additional, alternative, and/or cumulative embodiments, the frame has an elliptical shape.

In some additional, alternative, and/or cumulative embodiments, the receptacle comprises a padded wedge at its leading edge.

In some additional, alternative, and/or cumulative embodiments, the receptacle comprises a net.

In some additional, alternative, and/or cumulative embodiments, the net comprises a mesh small enough to retain fingerling-sized fish.

In some additional, alternative, and/or cumulative embodiments, the net comprises a mesh size small enough to retain fish having a minimum fish dimension of greater than or equal to 1 cm.

In some additional, alternative, and/or cumulative embodiments, the net comprises a mesh size small enough to retain fish having a minimum fish dimension of greater than or equal to 5 cm.

In some additional, alternative, and/or cumulative embodiments, the receptacle comprises a sieve.

In some additional, alternative, and/or cumulative embodiments, the receptacle comprises a bucket with one or more apertures for drainage of water.

In some additional, alternative, and/or cumulative embodiments, frames of the capture mechanism are tubular.

In some additional, alternative, and/or cumulative embodiments, the leading edge of the receptacle during capture of fish is padded.

In some additional, alternative, and/or cumulative embodiments, the leading edge of the receptacle during capture of fish comprises fiberglass or foam.

In some additional, alternative, and/or cumulative embodiments, the leading edge of the receptacle during capture of fish comprises a trough.

In some additional, alternative, and/or cumulative embodiments, a general plane of the opening of the receptacle of the capture mechanism is oriented at angle that is between 10 degrees and 90 degrees with respect to the surface of the water during capture of the fish.

In some additional, alternative, and/or cumulative embodiments, a general plane of the opening of the receptacle of the capture mechanism is oriented at angle that is between 20 degrees and 80 degrees with respect to the surface of the water during capture of the fish.

In some additional, alternative, and/or cumulative embodiments, a general plane of the opening of the receptacle of the capture mechanism is oriented at angle that is between 30 degrees and 70 degrees with respect to the surface of the water during capture of the fish.

In some additional, alternative, and/or cumulative embodiments, a general plane of the opening of the receptacle of the capture mechanism is oriented at angle that is between 40 degrees and 60 degrees with respect to the surface of the water during capture of the fish.

In some additional, alternative, and/or cumulative embodiments, a general plane of the opening of the receptacle of the capture mechanism is oriented at angle that is between 40 degrees and 50 degrees with respect to the surface of the water during capture of the fish.

In some additional, alternative, and/or cumulative embodiments, the fish are alive immediately after they are captured.

In some additional, alternative, and/or cumulative embodiments, the fish are relatively uninjured by the capture mechanism.

In some additional, alternative, and/or cumulative embodiments, multiple receptacles of the capture mechanism are operatively connected to a conveying mechanism.

In some additional, alternative, and/or cumulative embodiments, frames of the capture mechanism are operatively connected to a conveying mechanism.

In some additional, alternative, and/or cumulative embodiments, a conveying mechanism transports one or more receptacles in a loop.

In some additional, alternative, and/or cumulative embodiments, a conveying mechanism transports one or more receptacles in a loop.

In some additional, alternative, and/or cumulative embodiments, a conveying mechanism transports one or more receptacles in a loop, wherein the loop comprises moving the one or more receptacles close to the surface of the water before catching fish toward an end portion and then moving the one or more receptacles containing fish away from the end portion.

In some additional, alternative, and/or cumulative embodiments, a conveying mechanism transports one or more receptacles in a loop, wherein the loop comprises moving the one or more receptacles close to the surface of the water before catching fish toward an end portion and then moving the one or more receptacles containing fish away from the end portion, and wherein the end portion is closer to a forward or bow section of the floatable support than the aft or stern section of the boat.

In some additional, alternative, and/or cumulative embodiments, a conveying mechanism transports one or more receptacles in a loop, wherein the loop comprises moving the one or more receptacles close to the surface of the water before catching fish toward an end portion of the barrier and then moving the one or more receptacles containing fish away from the end portion of the barrier to empty the one or more receptacles and then returning the one or more receptacles along the surface of the water to capture additional fish.

In some additional, alternative, and/or cumulative embodiments, a general plane of the opening of the receptacle of the capture mechanism has a changing orientation angle with respect to the surface of the water during movement along the loop.

In some additional, alternative, and/or cumulative embodiments, a general plane of the opening of the receptacle of the capture mechanism has its orientation controlled along at least two locations along a loop.

In some additional, alternative, and/or cumulative embodiments, multiple receptacles of the capture mechanism are operatively connected to a conveying mechanism, wherein the conveying mechanism comprises a belt, rope, or chain.

In some additional, alternative, and/or cumulative embodiments, multiple receptacles of the capture mechanism are operatively connected to a conveying mechanism, wherein the conveying mechanism comprises a track that determines a loop.

In some additional, alternative, and/or cumulative embodiments, multiple receptacles of the capture mechanism are operatively connected to a conveying mechanism, wherein the conveying mechanism comprises a conveyor track that determines a loop cycle for the one or more receptacles.

In some additional, alternative, and/or cumulative embodiments, multiple receptacles of the capture mechanism are operatively connected to a conveying mechanism, wherein the conveying mechanism comprises multiple tracks to guide the receptacles in a loop.

In some additional, alternative, and/or cumulative embodiments, multiple receptacles of the capture mechanism are operatively connected to a conveying mechanism, wherein the conveying mechanism comprises bilateral tracks to guide the receptacles in a loop.

In some additional, alternative, and/or cumulative embodiments, multiple receptacles of the capture mechanism are operatively connected to a conveying mechanism, wherein the conveying mechanism employs one or more teeth, sprockets, wheels, or the like to convey motion to the receptacles.

In some additional, alternative, and/or cumulative embodiments, multiple receptacles of the capture mechanism are operatively connected to a conveying mechanism, wherein the conveying mechanism employs at least four teeth, sprockets, wheels, or the like to convey motion to the receptacles.

In some additional, alternative, and/or cumulative embodiments, the capture mechanism includes three or more receptacles that are operatively connected to a conveying mechanism.

In some additional, alternative, and/or cumulative embodiments, the capture mechanism includes four or more receptacles that are operatively connected to a conveying mechanism.

In some additional, alternative, and/or cumulative embodiments, the capture mechanism includes five or more receptacles that are operatively connected to a conveying mechanism.

In some additional, alternative, and/or cumulative embodiments, the capture mechanism includes six or more receptacles that are operatively connected to a conveying mechanism.

In some additional, alternative, and/or cumulative embodiments, the capture mechanism includes seven or more receptacles that are operatively connected to a conveying mechanism.

In some additional, alternative, and/or cumulative embodiments, the capture mechanism includes eight or more receptacles that are operatively connected to a conveying mechanism.

In some additional, alternative, and/or cumulative embodiments, the capture mechanism includes nine or more receptacles that are operatively connected to a conveying mechanism.

In some additional, alternative, and/or cumulative embodiments, the capture mechanism includes ten or more receptacles that are operatively connected to a conveying mechanism.

In some additional, alternative, and/or cumulative embodiments, the capture mechanism includes ten or fewer receptacles that are operatively connected to a conveying mechanism.

In some additional, alternative, and/or cumulative embodiments, the capture mechanism includes multiple receptacles that are operatively connected to a conveying mechanism, wherein the multiple receptacles are conveyed at a speed to maximize the number of fish caught or catchable by the receptacles during a given period of time.

In some additional, alternative, and/or cumulative embodiments the capture mechanism includes multiple receptacles that are operatively connected to a conveying mechanism, wherein the multiple receptacles are conveyed at a speed greater than or equal to 1 meter per second.

In some additional, alternative, and/or cumulative embodiments, the capture mechanism includes multiple receptacles that are operatively connected to a conveying mechanism, wherein the multiple receptacles are conveyed at a speed greater than or equal to 2 meters per second.

In some additional, alternative, and/or cumulative embodiments, the capture mechanism includes multiple receptacles that are operatively connected to a conveying mechanism, wherein the multiple receptacles are conveyed at a speed greater than or equal to 3 meters per second.

In some additional, alternative, and/or cumulative embodiments, the capture mechanism includes multiple receptacles that are operatively connected to a conveying mechanism, wherein the multiple receptacles are conveyed at a speed greater than or equal to 4 meters per second.

In some additional, alternative, and/or cumulative embodiments, the capture mechanism includes multiple receptacles that are operatively connected to a conveying mechanism, wherein the multiple receptacles are spaced at a distance of greater than or equal to 1 meter along the conveying mechanism.

In some additional, alternative, and/or cumulative embodiments, the capture mechanism includes multiple receptacles that are operatively connected to a conveying mechanism, wherein the multiple receptacles are spaced at a distance of greater than or equal to 0.6 meters along the conveying mechanism.

In some additional, alternative, and/or cumulative embodiments, the capture mechanism includes multiple receptacles that are operatively connected to a conveying mechanism, wherein the multiple receptacles are spaced at a distance of greater than or equal to 1 meter along the conveying mechanism.

In some additional, alternative, and/or cumulative embodiments, the capture mechanism includes multiple receptacles that are operatively connected to a conveying mechanism, wherein the multiple receptacles are spaced apart at a distance of greater than or equal to 1.5 meters along the conveying mechanism.

In some additional, alternative, and/or cumulative embodiments, the capture mechanism includes multiple receptacles that are operatively connected to a conveying mechanism, wherein the multiple receptacles are spaced apart at a distance of greater than or equal to 2 meters along the conveying mechanism.

In some additional, alternative, and/or cumulative embodiments, the capture mechanism includes multiple receptacles that are operatively connected to a conveying mechanism, wherein the multiple receptacles are spaced apart at a distance of less than or equal to 4 meters along the conveying mechanism.

In some additional, alternative, and/or cumulative embodiments, the capture mechanism includes multiple receptacles that are operatively connected to a conveying mechanism, wherein the multiple receptacles are spaced apart at a distance along the conveying mechanism to maximize the number of fish caught or catchable by the receptacles during a given period of time.

In some additional, alternative, and/or cumulative embodiments, the capture mechanism includes multiple receptacles that are operatively connected to a conveying mechanism, wherein the multiple receptacles are spaced apart by at least two different distances at a distance along the conveying mechanism.

In some additional, alternative, and/or cumulative embodiments, the capture mechanism includes multiple receptacles that are operatively connected to a conveying mechanism, wherein the multiple receptacles have the capability to capture greater than or equal 25 fish per minute.

In some additional, alternative, and/or cumulative embodiments, captured fish are inspected to remove any nonselected fish that were unintendedly captured.

In some additional, alternative, and/or cumulative embodiments, the capture mechanism includes multiple receptacles that are operatively connected to a conveying mechanism through respective rotational joints.

In some additional, alternative, and/or cumulative embodiments, a portion of the receptacle contacts the water when the receptacle contains a fish.

In some additional, alternative, and/or cumulative embodiments, a portion of the receptacle contacts the water when the receptacle contains a fish, and where such portion of the receptacle comprises a solid surface with or without drainage apertures.

In some additional, alternative, and/or cumulative embodiments, at least a portion of the receptacle is elastic.

In some additional, alternative, and/or cumulative embodiments, the receptacles are conveyed along a conveying path that has a first segment in a first direction of travel that is closer to the surface of the water, wherein the conveying path has a second segment in a second direction of travel that is farther from the surface of the water, wherein the receptacles comprise respective leading and trailing edges, wherein the leading edges are in front of the trailing edges during the first segment of the first direction of travel, wherein the leading edges are positioned closer to the surface of the water than are the trailing edges during the first segment of travel and during capture of fish that jump.

In some additional, alternative, and/or cumulative embodiments, the receptacles are conveyed along a conveying path that has a first segment in a first direction of travel that is closer to the surface of the water, wherein the conveying path has a second segment in a second direction of travel that is farther from the surface of the water, wherein the receptacles comprise respective leading and trailing edges, wherein the leading edges are in front of the trailing edges during the first segment of the first direction of travel, wherein the leading edges are positioned closer to the surface of the water than are the trailing edges during the first segment of travel and during capture of fish that jump, wherein a first general plane of the opening between the leading and trailing edges of the receptacles is oriented at a first angle that is between 20 degrees and 80 degrees with respect to the surface of the water during the first segment of travel and during capture of fish that jump.

In some additional, alternative, and/or cumulative embodiments, the receptacles are conveyed along a conveying path that has a first segment in a first direction of travel that is closer to the surface of the water, wherein the conveying path has a second segment in a second direction of travel that is farther from the surface of the water, wherein the receptacles comprise respective leading and trailing edges, wherein the leading edges are in front of the trailing edges during the first segment of the first direction of travel, wherein the leading edges are positioned closer to the surface of the water than are the trailing edges during the first segment of travel and during capture of fish that jump, wherein a first general plane of the opening between the leading and trailing edges of the receptacles is oriented at angle that is between 20 degrees and 80 degrees with respect to the surface of the water during the first segment of travel and during capture of fish that jump, wherein a second general plane of the opening the receptacles is oriented at second angle that is between 0 degrees and 25 degrees with respect to the surface of the water during the second segment of travel.

In some additional, alternative, and/or cumulative embodiments, the receptacles are conveyed along a conveying path that has a first segment in a first direction of travel that is closer to the surface of the water, wherein the conveying path has a second segment in a second direction of travel that is farther from the surface of the water, wherein the receptacles comprise respective leading and trailing edges, wherein the leading edges are in front of the trailing edges during the first segment of the first direction of travel, wherein the leading edges are positioned closer to the surface of the water than are the trailing edges during the first segment of travel and during capture of fish that jump, wherein a first general plane of the opening between the leading and trailing edges of the receptacles is oriented at angle that is between 20 degrees and 80 degrees with respect to the surface of the water during the first segment of travel and during capture of fish that jump, wherein a second general plane of the opening the receptacles is oriented at second angle that is between 0 degrees and 25 degrees with respect to the surface of the water during the second segment of travel, wherein the trailing edges are in front of the leading edges during the second segment of the second direction of travel.

In some additional, alternative, and/or cumulative embodiments, the receptacles are conveyed along a conveying path that has a first segment in a first direction of travel that is closer to the surface of the water, wherein the conveying path has a second segment in a second direction of travel that is farther from the surface of the water, wherein the receptacles comprise respective leading and trailing edges, wherein the leading edges are in front of the trailing edges during the first segment of the first direction of travel, wherein the leading edges are positioned closer to the surface of the water than are the trailing edges during the first segment of travel and during capture of fish that jump, wherein a first general plane of the opening between the leading and trailing edges of the receptacles is oriented at angle that is between 20 degrees and 80 degrees with respect to the surface of the water during the first segment of travel and during capture of fish that jump, wherein a second general plane of the opening the receptacles is oriented at second angle that is between 0 degrees and 25 degrees with respect to the surface of the water during the second segment of travel, wherein the leading edges are in front of the trailing edges during the second segment of the second direction of travel.

In some additional, alternative, and/or cumulative embodiments, the receptacles are conveyed along a conveying path that has a first segment in a first direction of travel that is closer to the surface of the water, wherein the conveying path has a second segment in a second direction of travel that is farther from the surface of the water, wherein the receptacles comprise respective leading and trailing edges, wherein the leading edges are in front of the trailing edges during the first segment of the first direction of travel, wherein the leading edges are positioned closer to the surface of the water than are the trailing edges during the first segment of travel and during capture of fish that jump, wherein a first general plane of the opening between the leading and trailing edges of the receptacles is oriented at angle that is between 20 degrees and 80 degrees with respect to the surface of the water during the first segment of travel and during capture of fish that jump, wherein a second general plane of the opening the receptacles is oriented at second angle that is between 0 degrees and 25 degrees with respect to the surface of the water during the second segment of travel, wherein the trailing edges are in front of the leading edges during the second segment of the second direction of travel, wherein the method further comprises a receptacle tilting mechanism that is operable to change an orientation and/or the angle of the opening of the receptacle.

In some additional, alternative, and/or cumulative embodiments, the receptacles are conveyed at a first speed along a conveying path that has a first segment in a first conveying direction of travel that is closer to the surface of the water, wherein the floatable base is moving at a second speed in a first floatation direction of travel that has a component that is the same as that of the first conveying direction of travel, wherein speed differential between the first conveying direction of travel and the first floatation direction of travel is sufficient to drive airborne fish into the receptacles in a manner that inhibits their ability to escape the receptacles.

In some additional, alternative, and/or cumulative embodiments, the receptacles are conveyed at a first speed along a conveying path that has a first segment in a first conveying direction of travel that is closer to the surface of the water, wherein the floatable base is moving at a second speed in a first floatation direction of travel that has a component that is opposite from that of the first conveying direction of travel, wherein cumulative speed between the first conveying direction of travel and the first floatation direction of travel is sufficient to drive airborne fish into the receptacles in a manner that inhibits their ability to escape the receptacles.

In some additional, alternative, and/or cumulative embodiments, the receptacle is tilted to change orientation of the angle of the opening of the receptacle.

In some additional, alternative, and/or cumulative embodiments, the receptacle is tilted to change orientation of the angle of the opening of the receptacle to a second orientation to empty the receptacle of fish.

In some additional, alternative, and/or cumulative embodiments, the receptacle is tilted to change orientation of the angle of the opening of the receptacle to a third orientation for travel during the second segment of the second direction of travel.

In some additional, alternative, and/or cumulative embodiments, the receptacles or their openings have opposing side walls or frame side segments, wherein the conveying mechanism is operatively connected to the opposing side walls or frame side segments.

In some additional, alternative, and/or cumulative embodiments, the receptacles or their openings have opposing side walls or frame side segments, wherein the conveying mechanism is operatively connected to the opposing side walls or frame side segments within a 20% distance from the midpoint between the leading edge and the trailing edge.

In some additional, alternative, and/or cumulative embodiments, the receptacles or their openings have opposing side walls or frame side segments, wherein the conveying mechanism is operatively connected to the opposing side walls or frame side segments at distance closer to the leading edge than to the trailing edge during catching of the fish.

In some additional, alternative, and/or cumulative embodiments the conveying mechanism is operable to be elevated and lowered with respect to the surface of the water.

In some additional, alternative, and/or cumulative embodiments, stimulating the fish is implemented beyond boundaries of the barrier.

In some additional, alternative, and/or cumulative embodiments, stimulating the fish is implemented within boundaries of the barrier.

In some additional, alternative, and/or cumulative embodiments, stimulating the fish is implemented at a depth greater than or equal to 3 meters with respect to the surface of the water.

In some additional, alternative, and/or cumulative embodiments, at least two of the receptacles have openings of different sizes.

In some additional, alternative, and/or cumulative embodiments, the speed of the conveyor is controllable.

In some additional, alternative, and/or cumulative embodiments, the speed of the conveyor is controllable to offset changes in speed of the floatable support.

In some additional, alternative, and/or cumulative embodiments, the speed of the conveyor is controllable to change speed of collection of fish.

In some additional, alternative, and/or cumulative embodiments, the storage area is a temporary storage area where the fish are dumped out of the receptacles.

In some additional, alternative, and/or cumulative embodiments, the fish are conveyed from the temporary storage area to an inspection area or a longer-term storage container such as a hold or a bin.

One of many advantages of these embodiments is that jumping fish can be selectively captured without harm to unselected fish. Another advantage of these embodiments is that large quantities of the jumping fish can be captured efficiently and brought to users while fresh.

Another way to diminish the spread of invasive fish, such as Asian carp, would be to deter the invasive fish from migrating upstream.

Some invasive target fish, such as Asian carp, react negatively to certain sounds within their hearing range. A resonant ultrasonic barrier establishes a wall of these specific sounds across a body of water and creates a formidable barrier to deter passage of target fish. This sound barrier specifically targets invasive fish, such as Asian carp, in two ways: 1) native fish aren't spooked by sound, in general, as much as invasive fish, such as Asian carp are; and 2) the barrier can work at a frequencies higher than native fish can hear. So even if sound might otherwise spook them, the native fish should not be able to hear it.

Sound barriers have been previously considered. However, the ultrasonic barrier approach is different in that the sound is emitted in a relatively focused beam so that the sound can be much louder, more uniform, and provide a sharply defined wall unachievable by previous sound-based systems. Exemplary embodiments employ directional ultrasonic beams that are amplitude modulated at one or more frequencies within the sensitivity range of invasive fish, such as Asian Carp.

In some embodiments, a system for deterring fish from obtaining passage to a region of a body of water having a surface and opposing banks, comprises: a sound barrier between the banks, wherein the sound barrier comprises one or more directional or parabolic ultrasonic beams that are amplitude modulated at one or more frequencies within a sensitivity range of the fish.

In some additional, alternative, or cumulative embodiments, a system for deterring fish from obtaining passage to a region of a body of water having a surface and opposing banks, comprises: one or more reflectors positioned along each bank and beneath the surface of the water, wherein at least one of the reflectors on at least one of the banks comprises a directional reflector; one or more ultrasonic transducers operatively connected to at least one reflector on at least one of the banks, wherein the one or more ultrasonic transducers are capable of operating at one or more frequencies greater than or equal to 40 kHz and are adapted for modulation by one or more audio waveforms; one or more transducer drivers operatively connected to the one or more ultrasonic transducers to establish the one or more frequencies and the one or more waveforms; and one or more controllers for setting the one or more frequencies and the one or more waveforms.

In some additional, alternative, or cumulative embodiments, a system for forming a barrier to deter fish from obtaining passage to a region of a body of water having a surface and opposing banks, comprises: one or more first parabolic reflectors positioned along a first bank of the body of water and beneath the surface of the water; one or more second reflectors positioned along a second bank of the body of water and beneath the surface of the water; one or more first ultrasonic transducers operatively connected to at least one first reflector; one or more second ultrasonic transducers operatively connected to at least one second reflector, wherein the first and second ultrasonic transducers are capable of operating at one or more ultrasonic frequencies greater than or equal to 40 kHz and are adapted for modulation by one or more audio waveforms; one or more first transducer drivers operatively connected to the first ultrasonic transducers to establish the one or more ultrasonic frequencies and the one or more waveforms; one or more second transducer drivers operatively connected to the second ultrasonic transducers to establish the one or more ultrasonic frequencies and the one or more waveforms; and one or more controllers for setting the one or more ultrasonic frequencies and the one or more waveforms.

In some additional, alternative, or cumulative embodiments, the reflectors and transducers are cooperatively operable to create a sound barrier that deters selected types of fish from passing through the barrier.

In some additional, alternative, or cumulative embodiments, the reflectors and transducers are cooperatively operable to create a resonant ultrasonic barrier that deters selected types of fish from passing through the barrier.

In some additional, alternative, or cumulative embodiments, the fish is a selected type of fish, and wherein the body of water contains a second or different type of fish that is different from the selected type of fish.

In some additional, alternative, or cumulative embodiments, the selected type of fish is a selected species of fish.

In some additional, alternative, or cumulative embodiments, the selected type of fish is a non-native species of fish and wherein the different types of fish comprise native species of fish.

In some additional, alternative, or cumulative embodiments, the selected type of fish is non-native to North America.

In some additional, alternative, or cumulative embodiments, the selected type of fish is native to Asia.

In some additional, alternative, or cumulative embodiments, the selected type of fish is Asian carp.

In some additional, alternative, or cumulative embodiments, the different types of fish comprise species of fish native to North America.

In some additional, alternative, or cumulative embodiments, the sound barrier is operable to deter selected types of fish of passing while permitting non-selected types of fish to pass through the barrier.

In some additional, alternative, or cumulative embodiments, the body of water comprises a stream, river, lake, pond, reservoir, canal, or channel.

In some additional, alternative, or cumulative embodiments, the body of water is navigable.

In some additional, alternative, or cumulative embodiments, the region of the body of water is upstream of the barrier.

In some additional, alternative, or cumulative embodiments, the region of the body of water is downstream of the barrier.

In some additional, alternative, or cumulative embodiments, the barrier extends between the first and second banks.

In some additional, alternative, or cumulative embodiments, the banks comprise one or more of a man-made structure, a shore, or a cliff face.

In some additional, alternative, or cumulative embodiments, the (first and second) banks are on different sides of the body of water.

In some additional, alternative, or cumulative embodiments, the body of water has curvature, wherein the first and second banks are on the same side of the body of water.

In some additional, alternative, or cumulative embodiments, at least one of the reflectors comprises a flat reflector.

In some additional, alternative, or cumulative embodiments, at least one directional reflector is positioned along each bank.

In some additional, alternative, or cumulative embodiments, the (first and second) directional reflectors comprise parabolic reflectors.

In some additional, alternative, or cumulative embodiments, the (first and second) directional reflectors comprise cylindrical reflectors.

In some additional, alternative, or cumulative embodiments, the (first and second) directional reflectors appear parabolic from the top and cylindrical from the side.

In some additional, alternative, or cumulative embodiments, the (first and second) directional reflectors comprise paraboloidal reflectors.

In some additional, alternative, or cumulative embodiments, the (first and second) directional reflectors comprise focus-balanced paraboloidal reflectors.

In some additional, alternative, or cumulative embodiments, one or more of the reflectors comprise an array of reflector panels.

In some additional, alternative, or cumulative embodiments, the (first and second) directional reflectors comprise the same types of reflectors.

In some additional, alternative, or cumulative embodiments, the (first and second) directional reflectors comprise different types reflectors.

In some additional, alternative, or cumulative embodiments, first and second sets of respective first and second directional reflectors comprise the same number of reflector panels.

In some additional, alternative, or cumulative embodiments, first and second sets of respective first and second directional reflectors comprise different numbers of reflector panels.

In some additional, alternative, or cumulative embodiments, the (first and second) directional reflectors have the same width.

In some additional, alternative, or cumulative embodiments, the (first and second) directional reflectors comprise reflectors having different widths.

In some additional, alternative, or cumulative embodiments, first and second sets of respective first and second directional reflectors comprise reflectors having a cumulative width that is greater than or equal to 1 meter.

In some additional, alternative, or cumulative embodiments, first and second sets of respective first and second directional reflectors comprise reflectors having a cumulative width that is greater than or equal to 2 meters.

In some additional, alternative, or cumulative embodiments, first and second sets of respective first and second directional reflectors comprise reflectors having a cumulative width that is greater than or equal to 3 meters.

In some additional, alternative, or cumulative embodiments, first and second sets of respective first and second directional reflectors comprise reflectors having a cumulative a width that is greater than or equal to 4 meters.

In some additional, alternative, or cumulative embodiments, the (first and second) directional reflectors comprise reflectors each having a width that is greater than or equal to 1 meter.

In some additional, alternative, or cumulative embodiments, the (first and second) directional reflectors comprise reflectors each having a width that is greater than or equal to 2 meters.

In some additional, alternative, or cumulative embodiments, the (first and second) directional reflectors comprise reflectors each having a width that is greater than or equal to 3 meters.

In some additional, alternative, or cumulative embodiments, the (first and second) directional reflectors comprise reflectors each having a width that is greater than or equal to 4 meters.

In some additional, alternative, or cumulative embodiments, the body of water has a floor at its bottom, and wherein the (first and second) directional reflectors extend to the floor of the body of water.

In some additional, alternative, or cumulative embodiments, the (first and second) directional reflectors include surface portions that extend above the surface of the water.

In some additional, alternative, or cumulative embodiments, the (first and second) directional reflectors include surface portions that extend above the surface of the water to a height greater than or equal to a highest flood stage level.

In some additional, alternative, or cumulative embodiments, the first and second directional reflectors are positioned along opposing banks.

In some additional, alternative, or cumulative embodiments, the first and second directional reflectors extend to different depths.

In some additional, alternative, or cumulative embodiments, the first and second directional reflectors extend to different heights.

In some additional, alternative, or cumulative embodiments, the first directional reflectors have first surfaces, wherein the second directional reflectors have second surfaces, wherein a first shape of a first reflector creates a first reflector focal point, and wherein the first shape of the first reflector is adapted to create the first focal point at the second surface of the second reflector.

In some additional, alternative, or cumulative embodiments, the first directional reflectors have first surfaces, wherein the second directional reflectors have second surfaces, wherein the second surface has a second horizontal width with a second center (or central axis) in its middle, wherein a first shape of a first reflector creates a first reflector focal point, and wherein the first shape of the first reflector is adapted to create the first focal point within 25 cm of the second center (or central axis) of the second surface of the second reflector.

In some additional, alternative, or cumulative embodiments, the first directional reflectors have first surfaces, wherein the second directional reflectors have second surfaces, wherein the second surface has a second horizontal width with a second center (or central axis) in its middle, wherein a first shape of a first reflector creates a first reflector focal point, and wherein the first shape of the first reflector is adapted to create the first focal point at the second center (or central axis) of the second surface of the second reflector.

In some additional, alternative, or cumulative embodiments, the first directional reflectors have first surfaces, wherein the second directional reflectors have second surfaces, wherein a first shape of a first reflector creates a first reflector focal point, wherein a second shape of a second reflector creates a second reflector focal point, wherein the first shape of the first reflector is adapted to create the first focal point at the second surface of the second reflector, and wherein the second shape of the second reflector is adapted to create the second focal point at the first surface of the first reflector.

In some additional, alternative, or cumulative embodiments, the first directional reflectors have first surfaces, wherein the second directional reflectors have second surfaces, wherein a first shape of a first reflector creates a first reflector focal point, wherein a second shape of a second reflector creates a second reflector focal point, wherein the first surface has a first horizontal width with a first center (or central axis) in its middle, wherein the second surface has a second horizontal width with a second center (or central axis) in its middle, wherein the first shape of the first reflector is adapted to create the first focal point in proximity to the second center (or central axis) of the second surface of the second reflector, and wherein the second shape of the second reflector is adapted to create the second focal point in proximity to the first center (or central axis) of the first surface of the first reflector.

In some additional, alternative, or cumulative embodiments, the first directional reflectors have first surfaces, wherein the second directional reflectors have second surfaces, wherein a first shape of a first reflector creates a first reflector focal point, wherein a second shape of a second reflector creates a second reflector focal point, wherein the first surface has a first horizontal width with a first center (or central axis) in its middle, wherein the second surface has a second horizontal width with a second center (or central axis) in its middle, wherein the first shape of the first reflector is adapted to create the first focal point at the second center (or central axis) of the second surface of the second reflector, and wherein the second shape of the second reflector is adapted to create the second focal point at the first center (or central axis) of the first surface of the first reflector.

In some additional, alternative, or cumulative embodiments, the (first or second) ultrasonic transducers comprise transmitters.

In some additional, alternative, or cumulative embodiments, the (first or second) ultrasonic transducers comprise transmitters without reception capability.

In some additional, alternative, or cumulative embodiments, the (first or second) ultrasonic transducers comprise piezoelectric transducers.

In some additional, alternative, or cumulative embodiments, the (first or second) ultrasonic transducers comprise capacitive transducers.

In some additional, alternative, or cumulative embodiments, the (first or second) ultrasonic transducers comprise magnetostrictive transducers.

In some additional, alternative, or cumulative embodiments, the (first or second) ultrasonic transducers comprise waterproof transducers.

In some additional, alternative, or cumulative embodiments, the (first or second) ultrasonic transducers comprise sonar transducers.

In some additional, alternative, or cumulative embodiments, the first and second ultrasonic transducers comprise different types of transducers.

In some additional, alternative, or cumulative embodiments, the first and second ultrasonic transducers comprise the same type of transducers.

In some additional, alternative, or cumulative embodiments, the (first or second) ultrasonic transducers are operable at one or more ultrasonic frequencies between 25 and 1000 kHz.

In some additional, alternative, or cumulative embodiments, the (first or second) ultrasonic transducers are operable at one or more ultrasonic frequencies between 40 and 900 kHz.

In some additional, alternative, or cumulative embodiments, the (first or second) ultrasonic transducers are operable at one or more ultrasonic frequencies between 50 and 800 kHz.

In some additional, alternative, or cumulative embodiments, the (first or second) ultrasonic transducers are operable at one or more ultrasonic frequencies between 75 and 600 kHz.

In some additional, alternative, or cumulative embodiments, the (first or second) ultrasonic transducers are operable at one or more ultrasonic frequencies between 100 and 400 kHz.

In some additional, alternative, or cumulative embodiments, the (first or second) ultrasonic transducers are operable at one or more ultrasonic frequencies between 150 and 250 kHz.

In some additional, alternative, or cumulative embodiments, the (first or second) ultrasonic transducers are operable at one or more ultrasonic frequencies between 175 and 225 kHz.

In some additional, alternative, or cumulative embodiments, first and second sets of respective the first and second ultrasonic transducers employ multiple transducers.

In some additional, alternative, or cumulative embodiments, the (first or second) ultrasonic transducers are operatively connected to the (first and second) reflectors.

In some additional, alternative, or cumulative embodiments, the first directional reflectors have first surfaces, wherein the second directional reflectors have second surfaces, wherein the first surface has a first horizontal width with a first center (or central axis) in its middle, wherein the second surface has a second horizontal width with a second center (or central axis) in its middle, wherein one or more of the first ultrasonic transducers is operatively connected to the first surface within 50 cm of the first center (or central axis) of the first surface of the first reflector.

In some additional, alternative, or cumulative embodiments, the first directional reflectors have first surfaces, wherein the second directional reflectors have second surfaces, wherein the first surface has a first horizontal width with a first center (or central axis) in its middle, wherein the second surface has a second horizontal width with a second center (or central axis) in its middle, wherein one or more of the first ultrasonic transducers is operatively connected to the first center (or central axis) of the first surface of the first reflector.

In some additional, alternative, or cumulative embodiments, the first directional reflectors have first surfaces, wherein the second directional reflectors have second surfaces, wherein the first surface has a first horizontal width with a first center (or central axis) in its middle, wherein the second surface has a second horizontal width with a second center (or central axis) in its middle, wherein one or more of the first ultrasonic transducers is operatively connected to the first surface within 50 cm of the first center (or central axis) of the first surface of the first reflector, and wherein one or more of the second ultrasonic transducers is operatively connected to the second surface within 50 cm of the second center (or central axis) of the second surface of the second reflector.

In some additional, alternative, or cumulative embodiments, the first directional reflectors have first surfaces, wherein the second directional reflectors have second surfaces, wherein the first surface has a first horizontal width with a first reflector central axis, wherein the second surface has a second horizontal width with a second reflector central axis, wherein one or more of the first ultrasonic transducers is operatively connected to the first surface in proximity to or within 50 cm of the first reflector central axis of the first surface of the first reflector, and wherein one or more of the second ultrasonic transducers is operatively connected to the second surface in proximity to or within 50 cm of the second reflector central axis of the second surface of the second reflector, wherein a first shape of a first reflector creates a first reflector focal point on the second reflector in proximity to the second reflector central axis, wherein a second shape of a second reflector creates a second reflector focal point on the first reflector in proximity to the first reflector central axis, wherein the first and second transducers each have an emission divergence angle and a central emission axis, wherein the central emission axes are directed at the opposing reflector focal points.

In some additional, alternative, or cumulative embodiments, the first directional reflectors have first surfaces, wherein the second directional reflectors have second surfaces, wherein the first surface has a first horizontal width with a first reflector central axis, wherein the second surface has a second horizontal width with a second reflector central axis, wherein one or more of the first ultrasonic transducers is operatively connected to the first surface in proximity to or within 50 cm of the first reflector central axis of the first surface of the first reflector, and wherein one or more of the second ultrasonic transducers is operatively connected to the second surface in proximity to or within 50 cm of the second reflector central axis of the second surface of the second reflector, wherein a first shape of a first reflector creates a first reflector focal point on the second reflector in proximity to the second reflector central axis, wherein a second shape of a second reflector creates a second reflector focal point on the first reflector in proximity to the first reflector central axis, wherein the first and second transducers each have an emission divergence angle and a central emission axis, wherein at least one of the central emission axes is directed at angle offset from the opposing reflector focal point.

In some additional, alternative, or cumulative embodiments, the first directional reflectors have first surfaces, wherein the second directional reflectors have second surfaces, wherein the first surface has a first horizontal width with a first reflector central axis, wherein the second surface has a second horizontal width with a second reflector central axis, wherein one or more of the first ultrasonic transducers is operatively connected to the first surface in proximity to or within 50 cm of the first reflector central axis of the first surface of the first reflector, and wherein one or more of the second ultrasonic transducers is operatively connected to the second surface in proximity to or within 50 cm of the second reflector central axis of the second surface of the second reflector, wherein a first shape of a first reflector creates a first reflector focal point on the second reflector in proximity to the second reflector central axis, wherein a second shape of a second reflector creates a second reflector focal point on the first reflector in proximity to the first reflector central axis, wherein the first and second transducers each have an emission divergence angle and a central emission axis, wherein both of the central emission axes are directed at angle offset from the opposing reflector focal points.

In some additional, alternative, or cumulative embodiments, the first directional reflectors have first surfaces, wherein the second directional reflectors have second surfaces, wherein the first surface has a first horizontal width with a first reflector central axis, wherein the second surface has a second horizontal width with a second reflector central axis, wherein one or more of the first ultrasonic transducers is operatively connected to the first surface in proximity to or within 50 cm of the first reflector central axis of the first surface of the first reflector, and wherein one or more of the second ultrasonic transducers is operatively connected to the second surface in proximity to or within 50 cm of the second reflector central axis of the second surface of the second reflector, wherein a first shape of a first reflector creates a first reflector focal point on the second reflector in proximity to the second reflector central axis, wherein a second shape of a second reflector creates a second reflector focal point on the first reflector in proximity to the first reflector central axis, wherein the first and second transducers each have an emission divergence angle and a central emission axis, wherein at least one of the central emission axes is directed at angle offset by at least one degrees from the opposing reflector focal point.

In some additional, alternative, or cumulative embodiments, the first directional reflectors have first surfaces, wherein the second directional reflectors have second surfaces, wherein the first surface has a first horizontal width with a first reflector central axis, wherein the second surface has a second horizontal width with a second reflector central axis, wherein one or more of the first ultrasonic transducers is operatively connected to the first surface in proximity to or within 50 cm of the first reflector central axis of the first surface of the first reflector, and wherein one or more of the second ultrasonic transducers is operatively connected to the second surface in proximity to or within 50 cm of the second reflector central axis of the second surface of the second reflector, wherein a first shape of a first reflector creates a first reflector focal point on the second reflector in proximity to the second reflector central axis, wherein a second shape of a second reflector creates a second reflector focal point on the first reflector in proximity to the first reflector central axis, wherein the first and second transducers each have an emission divergence angle and a central emission axis, wherein the body of water has a current with a flow speed and a flow direction, wherein at least one of the central emission axes is directed at angle offset from the opposing reflector focal point in an offset direction that is opposite to the flow direction.

In some additional, alternative, or cumulative embodiments, the first directional reflectors have first surfaces, wherein the second directional reflectors have second surfaces, wherein the first surface has a first horizontal width with a first reflector central axis, wherein the second surface has a second horizontal width with a second reflector central axis, wherein one or more of the first ultrasonic transducers is operatively connected to the first surface in proximity to or within 50 cm of the first reflector central axis of the first surface of the first reflector, and wherein one or more of the second ultrasonic transducers is operatively connected to the second surface in proximity to or within 50 cm of the second reflector central axis of the second surface of the second reflector, wherein a first shape of a first reflector creates a first reflector focal point on the second reflector in proximity to the second reflector central axis, wherein a second shape of a second reflector creates a second reflector focal point on the first reflector in proximity to the first reflector central axis, wherein the first and second transducers each have an emission divergence angle and a central emission axis, wherein the body of water has a current with a flow speed and a flow direction, wherein at least one of the central emission axes is directed at an offset angle from the opposing reflector focal point in an offset direction that is opposite to the flow direction, wherein a controller is operable to cause adjustment of the offset angle in response to information concerning the current speed.

In some additional, alternative, or cumulative embodiments, the first directional reflectors have first surfaces, wherein the second directional reflectors have second surfaces, wherein the first surface has a first horizontal width with a first center (or central axis) in its middle, wherein the second surface has a second horizontal width with a second center (or central axis) in its middle, wherein one or more of the first ultrasonic transducers is operatively connected to the first center (or central axis) of the first surface of the first reflector, and wherein one or more of the second ultrasonic transducers is operatively connected to the second center (or central axis) of the second surface of the second reflector.

In some additional, alternative, or cumulative embodiments, first and second sets of respective the first and second ultrasonic transducers employ multiple transducers.

In some additional, alternative, or cumulative embodiments, first and second sets of respective the first and second ultrasonic transducers employ multiple transducers, wherein at least one of the sets is arranged as a cluster of transducers.

In some additional, alternative, or cumulative embodiments, first and second sets of respective the first and second ultrasonic transducers employ multiple transducers, wherein at least one of the sets is arranged as an array of transducers.

In some additional, alternative, or cumulative embodiments, first and second ultrasonic transducers extend along at least 95% of the depth of the reflectors.

In some additional, alternative, or cumulative embodiments, the (first and second) ultrasonic transducers are adapted to guide their emission into a beam of sound.

In some additional, alternative, or cumulative embodiments, acoustical guides are operable to focus the emissions of the (first and second) ultrasonic transducers into a beam of sound.

In some additional, alternative, or cumulative embodiments, acoustical guides are operable to focus emissions from first and second sets of respective the first and second ultrasonic transducers are guided into a beam of sound.

In some additional, alternative, or cumulative embodiments, a modulator is operable to amplitude modulate by an audio waveform the ultrasonic signal emittable from the (first or second) ultrasonic transducers.

In some additional, alternative, or cumulative embodiments, a modulator is operable to amplitude modulate by an audio waveform the ultrasonic signal emittable from the (first or second) ultrasonic transducers, wherein the audio waveform has an audio frequency that is greater than or equal to 0.5 kHz.

In some additional, alternative, or cumulative embodiments, a modulator is operable to amplitude modulate by an audio waveform the ultrasonic signal emittable from the (first or second) ultrasonic transducers, wherein the audio waveform has an audio frequency that is greater than or equal to 1 kHz.

In some additional, alternative, or cumulative embodiments, a modulator is operable to amplitude modulate by an audio waveform the ultrasonic signal emittable from the (first or second) ultrasonic transducers, wherein the audio waveform has an audio frequency that is less than or equal to 2 kHz.

In some additional, alternative, or cumulative embodiments, a modulator is operable to amplitude modulate by an audio waveform the ultrasonic signal emittable from the (first or second) ultrasonic transducers, wherein the audio waveform has an audio frequency that is less than or equal to 5 kHz.

In some additional, alternative, or cumulative embodiments, a modulator is operable to amplitude modulate by an audio waveform the ultrasonic signal emittable from the (first or second) ultrasonic transducers, wherein the audio waveform has an audio frequency that is greater than or equal to 1 kHz and less than or equal to 1.5 kHz.

In some additional, alternative, or cumulative embodiments, the modulating audio frequency is selected to build resonance between the reflectors.

In some additional, alternative, or cumulative embodiments, multiple ones of the first ultrasonic transducers are operable to broadcast in phase.

In some additional, alternative, or cumulative embodiments, multiple ones of the first ultrasonic transducers are operable to broadcast in phase, wherein multiple ones of the second ultrasonic transducers are operable to broadcast in phase.

In some additional, alternative, or cumulative embodiments, the first directional reflectors have first surfaces, wherein the second directional reflectors have second surfaces, wherein one or more of the first ultrasonic transducers is operatively connected to the first surface of the first reflector, wherein one or more of the second ultrasonic transducers is operatively connected to the second surface of the second reflector, wherein operation of the first and second transducers is capable of establishing resonance.

In some additional, alternative, or cumulative embodiments, the audio frequencies modulating the transducers are selected at least partly based on distance between the first and second reflectors.

In some additional, alternative, or cumulative embodiments, the ultrasonic frequencies of the transducers are selected at least partly based on temperature of the body of water.

In some additional, alternative, or cumulative embodiments, the reflectors are operative to reflect sound waves to constructively add to original broadcast emissions from the transducers.

In some additional, alternative, or cumulative embodiments, a sound barrier created by original broadcast emissions and reflected sound is substantially maintained regardless of currents or turbulence.

In some additional, alternative, or cumulative embodiments, the modulator is operable to provide modulated peaks of the audio waves that are in phase.

In some additional, alternative, or cumulative embodiments, an integer multiple of the modulated signal is operable to build as it travels back and forth between reflectors.

In some additional, alternative, or cumulative embodiments, the body of water has a current flowing in a flow direction, wherein the barrier is angled with respect to the flow direction.

In some additional, alternative, or cumulative embodiments, the body of water has a current flowing in a flow direction, wherein the barrier is angled with respect to the flow direction, wherein the barrier has an upstream edge portion and a downstream edge portion, wherein the barrier is operable to herd fish to the downstream portion.

In some additional, alternative, or cumulative embodiments, the body of water has a current flowing in a flow direction, wherein the barrier is angled with respect to the flow direction, wherein the barrier has an upstream edge portion and a downstream edge portion, wherein the barrier is operable to herd fish to the downstream edge portion, wherein a capture pool in proximity to the downstream edge portion is adapted for capture of fish or elimination of fish.

In some additional, alternative, or cumulative embodiments, the modulator is operable to shift the phase of the modulating signal.

In some additional, alternative, or cumulative embodiments, the modulator is operable to shift the phase of the modulating signal within sequential periods of less than or equal to 500 microseconds.

In some additional, alternative, or cumulative embodiments, the reflectors are operable to reflect greater than or equal to 60% of the power of the ultrasonic broadcast beam emanating from the opposite transducers.

In some additional, alternative, or cumulative embodiments, the reflectors are operable to reflect greater than or equal to 70% of the power of the ultrasonic broadcast beam emanating from the opposite transducers.

In some additional, alternative, or cumulative embodiments, the reflectors are operable to reflect greater than or equal to 80% of the power of the ultrasonic broadcast beam emanating from the opposite transducers.

In some additional, alternative, or cumulative embodiments, the reflectors are operable to reflect greater than or equal to 90% of the power of the ultrasonic broadcast beam emanating from the opposite transducers.

In some additional, alternative, or cumulative embodiments, the reflectors are operatively connected to the banks.

In some additional, alternative, or cumulative embodiments, the reflectors are operatively connected to the banks in a manner that deters fish from passing between the reflectors and the banks.

In some additional, alternative, or cumulative embodiments, the reflectors comprise metal.

In some additional, alternative, or cumulative embodiments, the reflectors comprise plastic.

In some additional, alternative, or cumulative embodiments, the reflectors are operatively connected to circuitry capable of detecting whether the transducers are above the waterline.

In some additional, alternative, or cumulative embodiments, the system comprises one or more power sources to provide power to each of the (first and second) transducer drivers.

In some additional, alternative, or cumulative embodiments, the one or more controllers are operable to coordinate the one or more ultrasonic frequencies and the one or more waveforms between the first and second transducer drivers.

In some additional, alternative, or cumulative embodiments, the one or more controllers are operable to synchronize the one or more ultrasonic frequencies and the one or more waveforms between the first and second transducer drivers.

In some additional, alternative, or cumulative embodiments, the (first and second) transducer drivers are in operative communication with a controller operable to synchronize the one or more ultrasonic frequencies and the one or more waveforms between the first and second transducer drivers.

In some additional, alternative, or cumulative embodiments, the (first and second) transducer drivers are in operative communication with a controller operable to generate the same one or more ultrasonic frequencies and the same one or more waveforms at the first and second transducer drivers.

In some additional, alternative, or cumulative embodiments, the (first and second) transducer drivers are in operative communication with a controller operable to generate the same one or more ultrasonic frequencies and the same one or more waveforms at the first and second transducer drivers and synchronize their phases.

In some additional, alternative, or cumulative embodiments, the (first and second) transducer drivers are in operative communication with a controller, wherein the controller is operable to adjust the one or more ultrasonic frequencies in response to temperature information concerning the body of water.

In some additional, alternative, or cumulative embodiments, the (first and second) transducer drivers are in operative communication with a controller, wherein the controller is operable to adjust the one or more ultrasonic frequencies in response to temperature information concerning the body of water, wherein the temperature information is provided by one or more sensors in proximity to the (first and/or second) reflector(s).

In some additional, alternative, or cumulative embodiments, the (first and second) transducer drivers are in operative communication with a controller, wherein the controller is operable to adjust the one or more ultrasonic frequencies in response to temperature information concerning the body of water, wherein the controller is operable to decrease one or more ultrasonic frequencies in response to a water temperature drop.

In some additional, alternative, or cumulative embodiments, the (first and second) transducer drivers are in operative communication with a controller, wherein the controller is operable to adjust the one or more ultrasonic frequencies in response to temperature information concerning the body of water, wherein the controller is operable to increase one or more ultrasonic frequencies in response to a water temperature rise.

In some additional, alternative, or cumulative embodiments, the (first and second) transducer drivers are in operative communication with a controller, wherein the controller is operable to adjust the one or more ultrasonic frequencies in response to temperature information concerning the body of water, wherein the controller is operable to employ lower ultrasonic frequencies during the winter and higher ultrasonic frequencies during the summer.

In some additional, alternative, or cumulative embodiments, the (first and second) transducer drivers are in operative communication with a controller, wherein the controller is operable to adjust the one or more ultrasonic frequencies in response to temperature information concerning the body of water, wherein the controller is operable to employ an ultrasonic frequency between 200 kHz and 500 kHz during the summer and higher ultrasonic frequencies during the winter.

In some additional, alternative, or cumulative embodiments, the (first and second) transducer drivers are in operative communication with a controller, wherein the controller is operable to adjust the one or more ultrasonic frequencies in response to temperature information concerning the body of water, wherein the controller is operable to employ an ultrasonic frequency of about 455 kHz during the summer and higher ultrasonic frequencies during the winter.

In some additional, alternative, or cumulative embodiments, the (first and second) transducer drivers are in operative communication with a controller, wherein the controller is operable to adjust the one or more ultrasonic frequencies in response to temperature information concerning the body of water, wherein the controller is operable to employ an ultrasonic frequency between 50 kHz and 455 kHz during the winter and an ultrasonic frequency between 200 kHz and 800 kHz during the summer.

In some additional, alternative, or cumulative embodiments, the (first and second) transducer drivers are in operative communication with a controller, wherein the controller is operable to adjust the one or more ultrasonic frequencies in response to temperature information concerning the body of water, wherein the controller is operable to employ an ultrasonic frequency of about 200 kHz during the winter and an ultrasonic frequency of about 455 kHz during the summer.

In some additional, alternative, or cumulative embodiments, the (first and second) transducer drivers are in operative communication with a controller, wherein the controller is operable to adjust the audio frequency and/or phase of the modulated signal supplied to the one or more transducer drivers in response to temperature information concerning the body of water.

In some additional, alternative, or cumulative embodiments, the (first and second) transducer drivers are in operative communication with a controller, wherein the controller is operable to adjust the audio frequency and/or phase of the modulated signal supplied to the one or more transducer drivers in response to temperature information concerning the body of water, wherein the temperature information is provided by one or more sensors in proximity to the (first and/or second) reflector(s).

In some additional, alternative, or cumulative embodiments, the (first and second) transducer drivers are in operative communication with a controller, wherein the controller is operable to adjust the audio frequency and/or phase of the modulated signal supplied to the one or more transducer drivers in response to temperature information concerning the body of water, wherein the controller is operable to increase the audio frequency in response to a water temperature rise.

In some additional, alternative, or cumulative embodiments, the (first and second) transducer drivers are in operative communication with a controller, wherein the controller is operable to adjust the audio frequency and/or phase of the modulated signal supplied to the one or more transducer drivers in response to temperature information concerning the body of water, wherein the controller is operable to decrease the audio frequency in response to a water temperature drop.

In some additional, alternative, or cumulative embodiments, the (first and second) transducer drivers are in operative communication with a controller, wherein the controller is operable to control the number of reflections achievable by an emission made by the transducers.

In some additional, alternative, or cumulative embodiments, the (first and second) transducer drivers are in operative communication with a controller, wherein the controller is operable to control the number of reflections achievable by an emission made by the transducers to be less than or equal to 1000.

In some additional, alternative, or cumulative embodiments, the (first and second) transducer drivers are in operative communication with a controller, wherein the controller is operable to control the number of reflections achievable by an emission made by the transducers to be less than or equal to 500.

In some additional, alternative, or cumulative embodiments, the (first and second) transducer drivers are in operative communication with a controller, wherein the controller is operable to control the number of reflections achievable by an emission made by the transducers to be less than or equal to 100.

In some additional, alternative, or cumulative embodiments, the (first and second) transducer drivers are in operative communication with a controller, wherein the controller is operable to control the number of reflections achievable by an emission made by the transducers to be less than or equal to 50.

In some additional, alternative, or cumulative embodiments, the (first and second) transducer drivers are in operative communication with a controller, wherein the controller is operable to control the number of reflections achievable by an emission made by the transducers to be less than or equal to 15.

In some additional, alternative, or cumulative embodiments, the (first and second) transducer drivers are in operative communication with a controller, wherein the controller is operable to control the number of reflections achievable by an emission made by the transducers to be less than or equal to 8.

In some additional, alternative, or cumulative embodiments, the (first and second) transducer drivers are in operative communication with a controller, wherein the controller is operable to control the number of reflections achievable by an emission made by the transducers to be less than or equal to 5.

In some additional, alternative, or cumulative embodiments, the (first and second) transducer drivers are in operative communication with a controller, wherein the controller is operable to adjust the one or more ultrasonic frequencies in response feedback information provided by ultrasonic receivers within the body of water.

In some additional, alternative, or cumulative embodiments, the (first and second) transducer drivers are in operative communication with a controller, wherein the controller is operable to adjust the one or more ultrasonic frequencies in response feedback information provided by ultrasonic receivers within the volume of the barrier.

In some additional, alternative, or cumulative embodiments, the (first and second) transducer drivers are in operative communication with a controller, wherein the controller is operable to adjust the one or more audio frequencies in response feedback information provided by receivers within the volume of the barrier.

In some additional, alternative, or cumulative embodiments, the (first and second) transducer drivers are in operative communication with a controller, wherein the controller is operable to adjust the modulation of one or more ultrasonic waveforms in response to temperature information, wherein the audio frequency of the modulated signal is adjusted while the number of periods is maintained.

In some additional, alternative, or cumulative embodiments, the (first and second) transducer drivers are in operative communication with a controller, wherein the controller is operable to adjust the modulation of one or more ultrasonic waveforms in response to temperature information, wherein the audio frequency of the modulated signal is adjusted and the number of periods is changed.

In some additional, alternative, or cumulative embodiments, the (first and second) transducer drivers are in operative communication with a controller, wherein the controller is operable to adjust the one or more modulated ultrasonic waveforms in response to temperature information, wherein the waveform is adjusted so that the number of periods differs by 1 or 2.

In some additional, alternative, or cumulative embodiments, the (first and second) transducer drivers are in operative communication with a controller, wherein the controller is operable to adjust the one or more modulated ultrasonic waveforms in response to temperature information, wherein the audio modulating frequency is adjusted so that it is as close as possible to the desired frequency while still maintaining resonance.

In some additional, alternative, or cumulative embodiments, the (first and second) transducer drivers are in operative communication with a controller, wherein the controller is operable to adjust the audio frequency of one or more modulated ultrasonic waveforms in response to temperature information, wherein the controller operative to determine existing transit time utilized for the sound to propagate from one transducer to the opposite reflector (distance/speed of sound), wherein the controller is operative to select a desired audio frequency, wherein the controller is operative to multiply the desired audio frequency by the transit time to determine a temporary period number, wherein the controller is operative to round the temporary period number to a nearest whole number integer, wherein the controller is operative to divide the whole number integer by the transit time to determine a new audio frequency for modulation of the modulated ultrasonic waveforms in response to temperature information to maintain resonance.

In some additional, alternative, or cumulative embodiments, an initial frequency is selected, wherein the length of the barrier is selected to facilitate an whole integer number of periods based on the frequency and length.

In some additional, alternative, or cumulative embodiments, an initial frequency is selected, wherein the length of the barrier is selected to facilitate an whole integer number of periods based on the frequency and length, wherein the body of water has a current with a flow direction, wherein the barrier is angled with respect to the flow direction to provide the length.

In some additional, alternative, or cumulative embodiments, the (first and second) transducers have an emission divergence angle of greater than or equal to 5°.

In some additional, alternative, or cumulative embodiments, the (first and second) transducers have an emission divergence angle of greater than or equal to 10°.

In some additional, alternative, or cumulative embodiments, the (first and second) transducers have an emission divergence angle of greater than or equal to 15°.

In some additional, alternative, or cumulative embodiments, the (first and second) transducers have an emission divergence angle of greater than or equal to 25°.

In some additional, alternative, or cumulative embodiments, the (first and second) transducers have an emission divergence angle of greater than or equal to 30°.

In some additional, alternative, or cumulative embodiments, the (first and second) transducers have an emission divergence angle of less than or equal to 30°.

In some additional, alternative, or cumulative embodiments, the (first and second) transducers have an emission divergence angle of less than or equal to 25°.

In some additional, alternative, or cumulative embodiments, the (first and second) transducers have an emission divergence angle of less than or equal to 15°.

In some additional, alternative, or cumulative embodiments, the (first and second) transducers have an emission divergence angle of less than or equal to 10°.

In some additional, alternative, or cumulative embodiments, the (first and second) transducers have the same emission divergence angles.

In some additional, alternative, or cumulative embodiments, the (first and second) transducers have different emission divergence angles.

In some additional, alternative, or cumulative embodiments, the (first and second) transducers have a central emission axis that is normal to a central axis of the reflectors.

In some additional, alternative, or cumulative embodiments, the (first and second) transducers have a central emission axis that is angled with respect to a central axis of the reflectors.

In some additional, alternative, or cumulative embodiments, the audio waveforms provide audio frequencies that are effective against all sizes of fish.

In some additional, alternative, or cumulative embodiments, a (first) shape of a (first) reflector creates a (first reflector) focal point that is about the same as the distance between the (first and second) reflectors.

In some additional, alternative, or cumulative embodiments, a (first) shape of a (first) reflector creates a (first reflector) focal point that is about the same as half the distance between the (first and second) reflectors.

In some additional, alternative, or cumulative embodiments, a (first) shape of a (first) reflector creates a (first reflector) focal point that is about twice the distance between the (first and second) reflectors.

In some additional, alternative, or cumulative embodiments, the transducers are mounted to be recessed with the reflector surface so that the transducer surface is flush with the reflector surface.

In some additional, alternative, or cumulative embodiments, the audio waveform modulation on the ultrasonic frequency comprises amplitude modulation.

In some additional, alternative, or cumulative embodiments, a controller that provides signals to the transducer drivers receives input from one or more sensors, wherein the sensors comprise one or more of ultrasonic receivers distinct from the transducers, hydrophones, or temperature sensors.

In some additional, alternative, or cumulative embodiments, the ultrasonic transducers are operable to output less than or equal to 2 W/cm$^2$ power.

In some additional, alternative, or cumulative embodiments, the ultrasonic transducers are operable to output greater than or equal to 2 W/cm$^2$ power, wherein a protective physical barrier is operable to deter a human from experiencing 2 W/cm$^2$.

In some additional, alternative, or cumulative embodiments, the emission angles of one or more of the transducers are adapted to permit an initial ultrasonic wave to exceed the width of the opposite reflector.

In some additional, alternative, or cumulative embodiments, the emission angle of one or more of the transducers are adapted to permit an initial ultrasonic wave to exceed the width of the opposite reflector, thereby facilitating a crisper edge to the ultrasonic barrier.

In some additional, alternative, or cumulative embodiments, the emission angle of one or more of the ultrasonic transducers are adapted to permit an initial ultrasonic wave to exceed the width of the opposite reflector, wherein the one or more reflectors have one or more sound absorbers along one or more of their edges.

In some additional, alternative, or cumulative embodiments, the barrier comprises an ultrasonic barrier, wherein the ultrasonic barrier includes at least one barrier edge and a barrier core.

In some additional, alternative, or cumulative embodiments, the barrier comprises an ultrasonic barrier, wherein the ultrasonic barrier includes two barrier edges and a barrier core between them.

In some additional, alternative, or cumulative embodiments, the barrier comprises an ultrasonic barrier, wherein the ultrasonic barrier includes at least one barrier edge and a barrier core, wherein the barrier edge is substantially uniform.

In some additional, alternative, or cumulative embodiments, the barrier comprises an ultrasonic barrier, wherein the ultrasonic barrier includes at least one barrier edge and a barrier core, wherein the barrier edge is sufficiently uniform such that different points along the barrier edge have less than or equal to 3 decibel difference.

In some additional, alternative, or cumulative embodiments, the barrier comprises an ultrasonic barrier, wherein the ultrasonic barrier includes at least one barrier edge and a barrier core, wherein the barrier edge is sufficiently uniform such that different points along the barrier edge have less than or equal to 5 decibel difference.

In some additional, alternative, or cumulative embodiments, the barrier comprises an ultrasonic barrier, wherein the ultrasonic barrier includes at least one barrier edge and a barrier core, wherein the barrier edge is sufficiently uniform such that different points along the barrier edge have less than or equal to a 10% variation in uniformity.

In some additional, alternative, or cumulative embodiments, the barrier comprises an ultrasonic barrier, wherein the ultrasonic barrier includes at least one barrier edge and a barrier core, wherein the barrier edge is well delineated.

In some additional, alternative, or cumulative embodiments, the barrier comprises an ultrasonic barrier, wherein the ultrasonic barrier includes at least one barrier edge and a barrier core, wherein the barrier edge is substantially planar.

In some additional, alternative, or cumulative embodiments, the barrier comprises an ultrasonic barrier, wherein the ultrasonic barrier includes at least one barrier edge and a barrier core, wherein the barrier edge is sufficiently delineated such that the barrier edge provides a decibel drop off away from the barrier edge that is greater than or equal to 10 decibels per 0.5 meters from a peak decibel of the barrier edge.

In some additional, alternative, or cumulative embodiments, the barrier comprises an ultrasonic barrier, wherein the ultrasonic barrier includes at least one barrier edge and a barrier core, wherein the barrier edge is sufficiently delineated such that the barrier edge provides a decibel drop off away from the barrier edge that is greater than or equal to 10 decibels per meter from a peak decibel of the barrier edge.

In some additional, alternative, or cumulative embodiments, the barrier comprises an ultrasonic barrier, wherein the ultrasonic barrier includes at least one barrier edge and a barrier core, wherein the barrier edge is sufficiently delineated such that the barrier edge provides a decibel drop off away from the decibel core that is greater than or equal to 25 decibels per meter from a peak decibel of the barrier edge.

In some additional, alternative, or cumulative embodiments, the transducers (and their respective drivers) are arrange in multiple columns or arrays.

In some additional, alternative, or cumulative embodiments, the transducers (and their respective drivers) are arranged in multiple columns including first and second columns, wherein the second column is operable to be inactive while first column is active, wherein the second column is operable to become active when the first column becomes inactive.

In some additional, alternative, or cumulative embodiments, the transducers (and their respective drivers) are arranged in multiple columns or arrays including first and second columns or arrays, wherein the multiple columns or are operable to be concurrently active such that in the event of a failure of the first column or array, the second column or array is operable to sustain the barrier.

In some additional, alternative, or cumulative embodiments, the transducers (and their respective drivers) are arranged in multiple columns or arrays including first, second, and additional columns or arrays, wherein the multiple columns or are operable to be concurrently active such that in the event of a failure of the first column or array, the second and additional columns or arrays are operable to sustain the barrier, wherein the first, second, and additional columns or arrays are each operable at a power level that is insufficient to fortify the barrier by a single column or array.

In some additional, alternative, or cumulative embodiments, the transducers (and their respective drivers) are arranged in multiple columns including first and second columns, wherein the second column is operable to be inactive while first column is active, wherein the second column is operable to become active when the first column becomes inactive, wherein the first column is operable to be replaced while the second column is active.

In some additional, alternative, or cumulative embodiments, the transducers (and their respective drivers) are arranged in multiple columns including first and second columns, wherein the second column is operable to be inactive while first column is active, wherein the second column is operable to become active when the first column becomes inactive, wherein the first column is operable to be replaced from behind or above the reflector while the second column is active.

In some additional, alternative, or cumulative embodiments, the barrier comprises an ultrasonic barrier, wherein the barrier also comprises a supplemental barrier in addition to sound.

In some additional, alternative, or cumulative embodiments, the barrier comprises an ultrasonic barrier, wherein the barrier also comprises a supplemental barrier in addition to sound, wherein the additional barrier comprises a luminous barrier.

In some additional, alternative, or cumulative embodiments, the barrier comprises an ultrasonic barrier, wherein the barrier also comprises a supplemental barrier in addition to sound, wherein the additional barrier comprises a luminous barrier, wherein the reflectors are optically reflective.

In some additional, alternative, or cumulative embodiments, the barrier comprises an ultrasonic barrier, wherein the barrier also comprises a supplemental barrier in addition to sound, wherein the additional barrier comprises a luminous barrier, wherein the reflectors are optically reflective, wherein the reflectors are adapted to provide a source of light visible to fish.

In some additional, alternative, or cumulative embodiments, the barrier comprises an ultrasonic barrier, wherein the barrier also comprises a supplemental barrier in addition to sound, wherein the additional barrier comprises a luminous barrier, wherein the reflectors are optically reflective, wherein the reflectors are adapted to provide a source of light visible to fish, wherein one or more wavelengths of the light visible to fish are selected to be disturbing to the selected fish.

In some additional, alternative, or cumulative embodiments, the barrier comprises an ultrasonic barrier, wherein the barrier also comprises a supplemental barrier in addition to sound, wherein the additional barrier comprises a luminous barrier, wherein the reflectors are optically reflective, wherein the reflectors are adapted to provide a source of light visible to fish, wherein one or more optical wavelengths of the light visible to fish are selected to be disturbing to the selected fish, wherein the light is continuous.

In some additional, alternative, or cumulative embodiments, the barrier comprises an ultrasonic barrier, wherein the barrier also comprises a supplemental barrier in addition to sound, wherein the additional barrier comprises a luminous barrier, wherein the reflectors are optically reflective, wherein the reflectors are adapted to provide a source of light visible to fish, wherein one or more optical wavelengths of the light visible to fish are selected to be disturbing to the selected fish, wherein the light is pulsed in a manner disturbing to the selected fish.

In some additional, alternative, or cumulative embodiments, the barrier comprises an ultrasonic barrier, wherein the barrier also comprises a supplemental barrier in addition to sound, wherein the additional barrier comprises a luminous barrier, wherein the reflectors are optically reflective, wherein the reflectors are adapted to provide a source of light visible to fish, wherein one or more optical wavelengths of the light visible to fish are selected to be disturbing to the selected fish, wherein the light is pulsed at irregular intervals in a manner disturbing to the selected fish.

In some additional, alternative, or cumulative embodiments, the barrier comprises an ultrasonic barrier, wherein the barrier also comprises a supplemental barrier in addition to sound, wherein the additional barrier comprises a luminous barrier, wherein the reflectors are optically reflective, wherein the reflectors are adapted to provide a source of light visible to fish, wherein one or more optical wavelengths of the light visible to fish are selected to be disturbing to the selected fish, wherein the light is pulsed at regular intervals in a manner disturbing to the selected fish.

In some additional, alternative, or cumulative embodiments, the barrier comprises an ultrasonic barrier, wherein the barrier also comprises a supplemental barrier in addition to sound, wherein the additional barrier comprises a luminous barrier, wherein the reflectors are optically reflective, wherein the reflectors are adapted to provide a source of light visible to fish, wherein one or more optical wavelengths of the light visible to fish are selected to be disturbing to the selected fish, wherein the light is generated remotely from the surface of the reflectors and propagated to the source through a light pipe or optical fiber.

In some additional, alternative, or cumulative embodiments, system components are adapted to provide a barrier less than or equal to a kilometer between opposing banks.

In some additional, alternative, or cumulative embodiments, system components are adapted to provide a barrier less than or equal to 0.5 kilometers between opposing banks.

In some additional, alternative, or cumulative embodiments, system components are adapted to provide a barrier less than or equal to 250 meters between opposing banks.

In some additional, alternative, or cumulative embodiments, system components are adapted to provide a barrier less than or equal to 100 meters between opposing banks.

In some additional, alternative, or cumulative embodiments, system components are adapted to provide a barrier between 3 and 100 meters between opposing banks.

In some additional, alternative, or cumulative embodiments, sound absorbers are position adjacent to one or more edges of the reflectors to absorb sound that spills over the reflector edges.

In some additional, alternative, or cumulative embodiments, sound absorbers are position adjacent to one or more reflector edges of the reflectors to absorb sound that spills over the reflector edges, wherein the reflector edges include one or more of side edges and a top edge.

In some additional, alternative, or cumulative embodiments, sound absorbers are position adjacent to one or more edges of the reflectors to absorb sound that spills over the reflector edges.

In some additional, alternative, or cumulative embodiments, sound absorbers are position adjacent to one or more edges of the reflectors to absorb sound that spills over the reflector edges, wherein the sound absorbers comprise one or more of: vertical dispersers, dampeners, or baffles.

In some additional, alternative, or cumulative embodiments, sound absorbers are position adjacent to one or more edges of the reflectors to absorb sound that spills over the reflector edges, wherein the sound absorbers comprise rubber or other suitable material.

In some additional, alternative, or cumulative embodiments, the audio frequency or phase of the modulation signal is operable to be shifted (such as swept forward or hopped) to shift the physical locations of peaks and troughs of the sound in the barrier.

In some additional, alternative, or cumulative embodiments, a method for creating a barrier that deters passage of fish in a body of water having opposing first and second banks, comprises: generating an ultrasonic wave; modulating the ultrasonic wave at a frequency detectable by the fish; and propagating the wave between reflectors on the first and second banks.

One of many advantages of these embodiments is that the barrier can selectively repel invasive fish without repelling native fish.

Another advantage is that the barrier does not adversely affect navigation on the body of water.

Additional aspects and advantages will be apparent from the following detailed description of exemplary embodiments, which proceeds with reference to the accompanying drawings.

BRIEF DESCRIPTION OF THE DRAWINGS

FIG. 6A is an isometric view of an embodiment of a receptacle that can be employed to capture fish.

FIG. 6B is a front view of an alternative embodiment of a receptacle that can be employed to capture fish.

FIG. 6C is a right side elevation view of the receptacle shown in FIG. 6B.

FIGS. 18A and 18B show respective perspective and end views of a netting mechanism.

FIG. 18C shows a series of side views demonstrating an example of a sequence in which fish are repetitively netted.

DETAILED DESCRIPTION OF EXEMPLARY EMBODIMENTS

Figure 1:
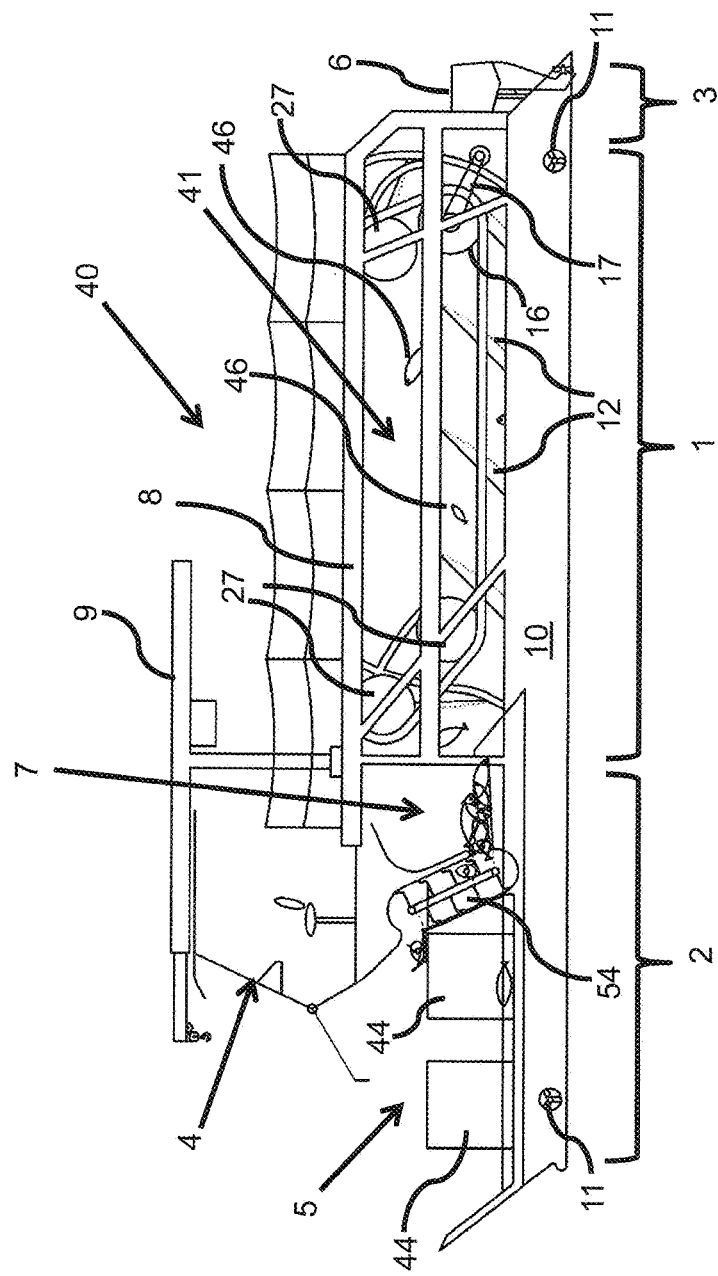
FIG. 1 is a side elevation view of an embodiment of a capture assembly including a capture mechanism and a conveying mechanism supported by a floatable base, such as a boat.

Example embodiments are described below with reference to the accompanying drawings. Unless otherwise expressly stated, in the drawings the sizes, positions, etc., of components, features, elements, etc., as well as any distances therebetween, are not necessarily to scale, and may be disproportionate and/or cumulative exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprises" and/or cumulative "comprising," when used in this specification, specify the presence of stated features, integers, steps, operations, elements, and/or cumulative components, but do not preclude the presence or addition of one or more other features, integers, steps, operations, elements, components, and/or cumulative groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element", or vice versa. The section headings used herein are for organizational purposes only and are not to be construed as limiting the subject matter described.

Unless indicated otherwise, the term "about," "thereabout," "substantially," etc., means that amounts, sizes, formulations, parameters, and other quantities and characteristics are not and need not be exact, but may be approximate and/or cumulative larger or smaller, as desired, reflecting tolerances, conversion factors, rounding off, measurement error and the like, and other factors known to those of skill in the art.

Spatially relative terms, such as "below," "beneath," "lower," "above," and "upper," and the like, may be used herein for ease of description to describe one element or feature's relationship to another element or feature, as illustrated in the figures. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Silver carp, ranging from very small fish up to their maximum size (such as from fingerlings up to at least 110 pounds), can be captured very efficiently by stimulating them to jump out of the water, especially in an enclosed space. A continuous series of nets or other receptacles can be arranged in conveyor fashion in a loop to move forward at an angled orientation, so as to scoop up the fish that are in the air. At the end of their forward travel, the nets rotate forward, so as to deposit the captured fish in a temporary hold, where the fish are available for immediate packing. The capture and conveying mechanisms of this system for catching airborne fish are portable and can preferably be built right into a boat, so the capture mechanism can be easily directed toward schools of silver carp to expeditiously catch them. A pontoon or catamaran style of boat is well suited to provide a floatable base to support the capture and conveying mechanisms. Such a boat could be easily maneuvered over schools of silver carp even in areas that are off-limits, inaccessible, or impractical for other methods of fishing. This system for catching airborne fish would capture nearly all sizes of silver carp, and without any detrimental effects to other species of fish. This system can operate continuously around the clock, either alone or in a fleet.

Silver carp normally congregate near the surface. This is because they primarily eat phytoplankton, which are plants that need light and are therefore near the surface of the water. Occasionally, such as during certain seasons or certain times of day, silver carp may congregate too far below the surface so that near-surface stimuli may not cause the fish to jump out of the water. In such circumstances, the fish can be herded upward. In some embodiments, deep stimulus, such as sound, gas, or light, may be provided to cause the fish to swim to the surface. In some embodiments, such stimulus would be less disturbing to other types of fish. In some other or additional embodiments, underwater drones could be employed to herd the fish toward the surface. In other or additional embodiments, the fish could be lured to the surface by spreading food that they like in front of the boat. The food could be plankton, powdered milk, instant potato powder, breadcrumbs, or other food that provides suitable attraction for the fish. In some embodiments, the food would be less appealing to other types of fish.

Figure 2:
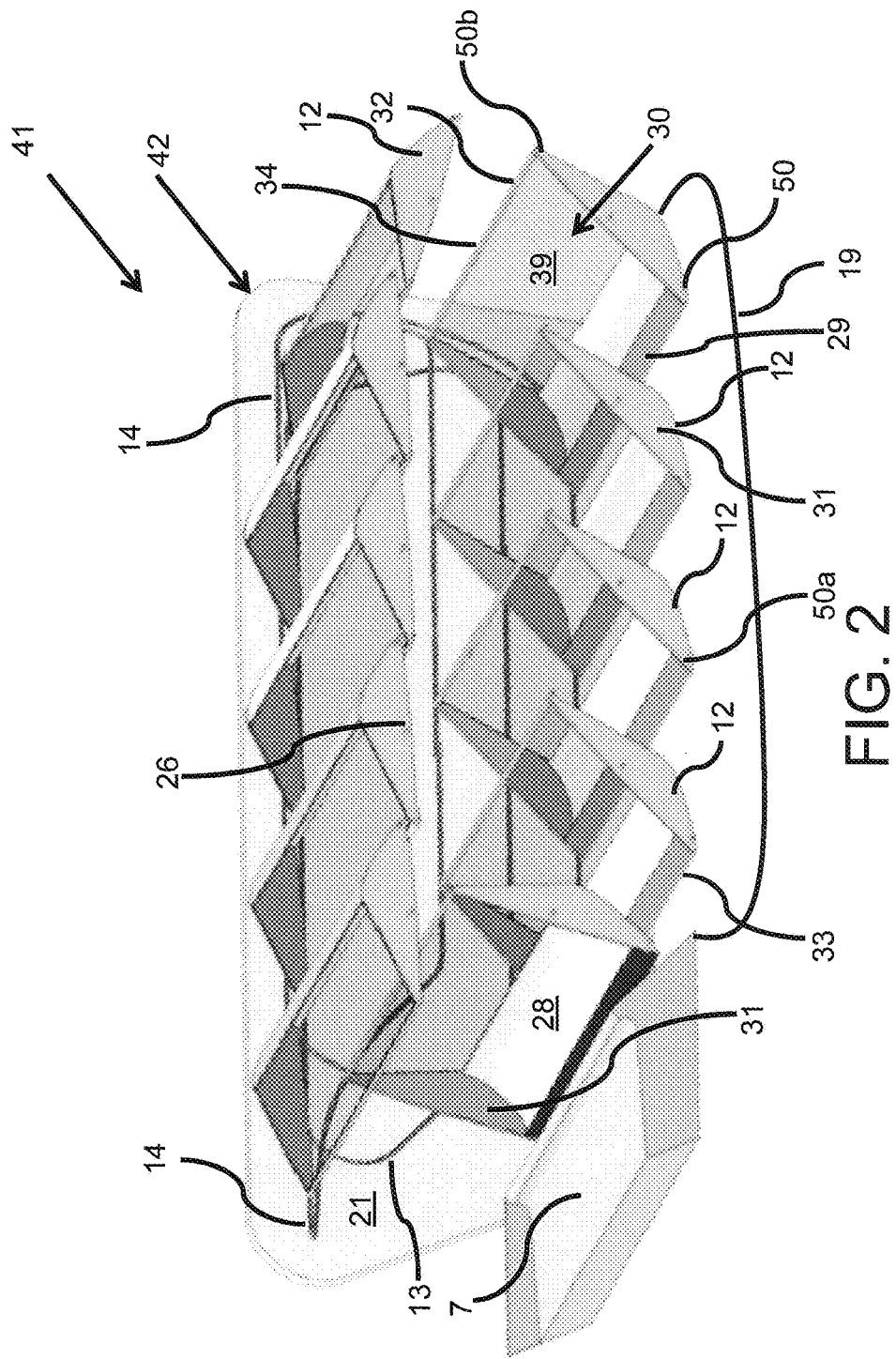
FIG. 2 is an isometric view of the capture mechanism and the conveying mechanism of the capture assembly (opposing wall not shown for clarity).
Figure 3:
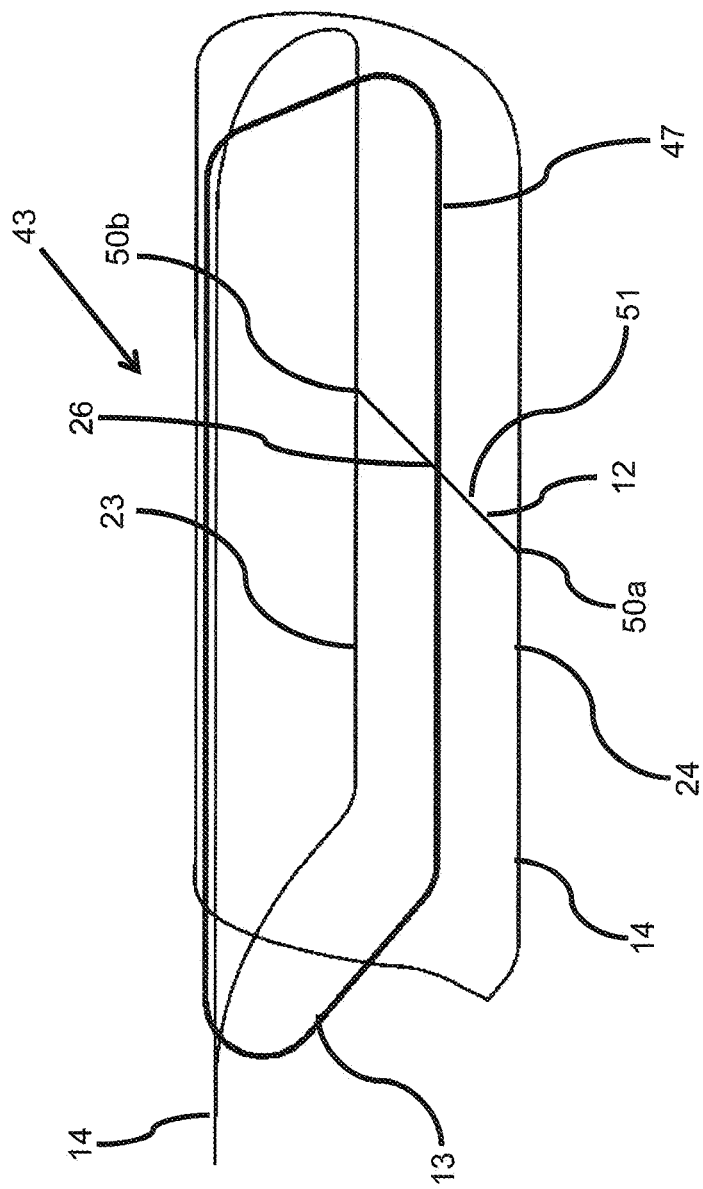
FIG. 3 is a side view of an embodiment of the shape of the power and guide tracks for the conveying mechanism.

FIG. 1 is a side elevation view of an embodiment of a floatable base 40, such as a boat, supporting a capture assembly 41 that includes a capture mechanism 42 (FIG. 2) having catching receptacles 12 and a conveying mechanism 43; FIG. 2 is an isometric view of the capture mechanism 42 and the conveying mechanism 43 (FIG. 3) of the capture assembly 41 (opposing wall not shown for clarity); and FIG. 3 is a side view of a capture mechanism 42, showing an embodiment of the shape of power and guide tracks for the conveying mechanism 43.

With reference to FIG. 1, the floatable base 40 may include a conveyor net section 1 that houses the capture assembly 41 including the capture mechanism 42 and the conveying mechanism 43. The floatable base 40 may also include a forward section (bow) 2 and a rear section (stern) 3. The forward section 2 may include a pilot cabin 4 and a packing section 5, and a temporary fish storage area 7. The rear section 3 may include one or more engines 6. A top deck 8 may be positioned primarily above the conveyor net section 1. One will appreciate that the components can be arranged in a different manner.

An optional counter-balanced crane 9, such as a fish container crane, may be mounted on the floatable base 40, typically toward the center. The container crane 9 may employed to move heavy fish containers 44 from the packing section 5 onto the top deck 8 for transfer to off-ship temporary storage (not shown), a transport boat (not shown), or a dock (not shown) or for direct transfer from the hold to off-ship temporary storage, a transport boat, or a dock.

The floatable base 40 may include spaced-apart pontoons 10 that straddle the capture mechanism 42. Optional side thrusters 11 may be mounted to the pontoons 10 at the forward section 2 and/or the rear section 3 and/or the conveyor section 1.

In some embodiments, the floatable base 40 supports a lift mechanism (not shown) to raise and lower the capture assembly 41 in relation to a water surface 45. The boat's water line (not shown) may depend on the weight supported by the floatable base 40. More fuel and more caught fish 46 will typically cause the floatable base 40 to sit lower in the water. Thus, by having the ability to be raised and lowered, the capture assembly 41 can be adjusted to an elevation that provides the best place in relation to the water level to capture fish 46 with receptacles 12 of the capture mechanism 42. In some embodiments, the lift mechanism can be automated to respond to sensors to adjust the elevation in relation to the surface 45 of the water. The lift mechanism can also be to quickly raise the whole capture assembly 41 to avoid floating logs and other debris, which the boat may drive over, that could hit or damage leading edge 33 of the receptacle 12. The debris avoidance function can also be automated in connection with sonar or other sensors. In some embodiments, the net frames 37 or opening frames 51 themselves may have break-away or bendable elements in tubes (in some embodiments) of the side segments 35 and 36, so that if they hit something, they won't be damaged, or so that they can be sacrificed to prevent greater damage to capture assembly 41 as a whole.

The receptacles 12 can be arranged along the conveyor power track 13 to which they may be directly or indirectly physically attached, but allowed to rotate, and pulled around this power track 13 by a driven power track belt (not shown). A power track sprocket 16 (in some embodiments, it would be buried in the walls for protection) or toothed wheel may supply torque and drive the power track belt with minimal slippage.

The power track 16 may be powered by an electric motor (preferably) or an engine of some kind, either directly, or via another belt 17 or a gear wheel or the like. In some embodiments, the power track motor employs a high-efficiency variable-speed electric motor with adequate horsepower and torque suitable for operating constantly without overheating in hot ambient conditions. The speed of the motor may be manually or automatically controlled in relation to the forward speed of the floatable base 40, so as not to be moving so fast as to not allow enough time for fish 46 to jump into the air between receptacles 12. The speed of the motor can optionally be controlled by a person, such as a fish packer, or by an automatic means, so that the temporary storage area 7 doesn't overflow.

In some embodiments, the temporary storage area 7 can be located at the forward section 2 of the capture assembly 41 and is where the fish 46 are dumped from the receptacles 12. In some embodiments, the temporary storage area 7 can be located along the conveying path in proximity to where the fish 46 are captured. Preferably, the storage space is sufficiently large to permit the capture mechanism 42 to capture a large school of fish 46 in one pass, while the fish packing, which may be slower than the rate at fish 46 are caught, can catch up. An optional transport mechanism 54, such as a supplemental conveyor, can be positioned in proximity to the storage area 7, such as its forward end, to lift the fish 46 up to a convenient height where they may be deposited onto a tray for inspection before they are placed into a fish container 44.

Figure 4:
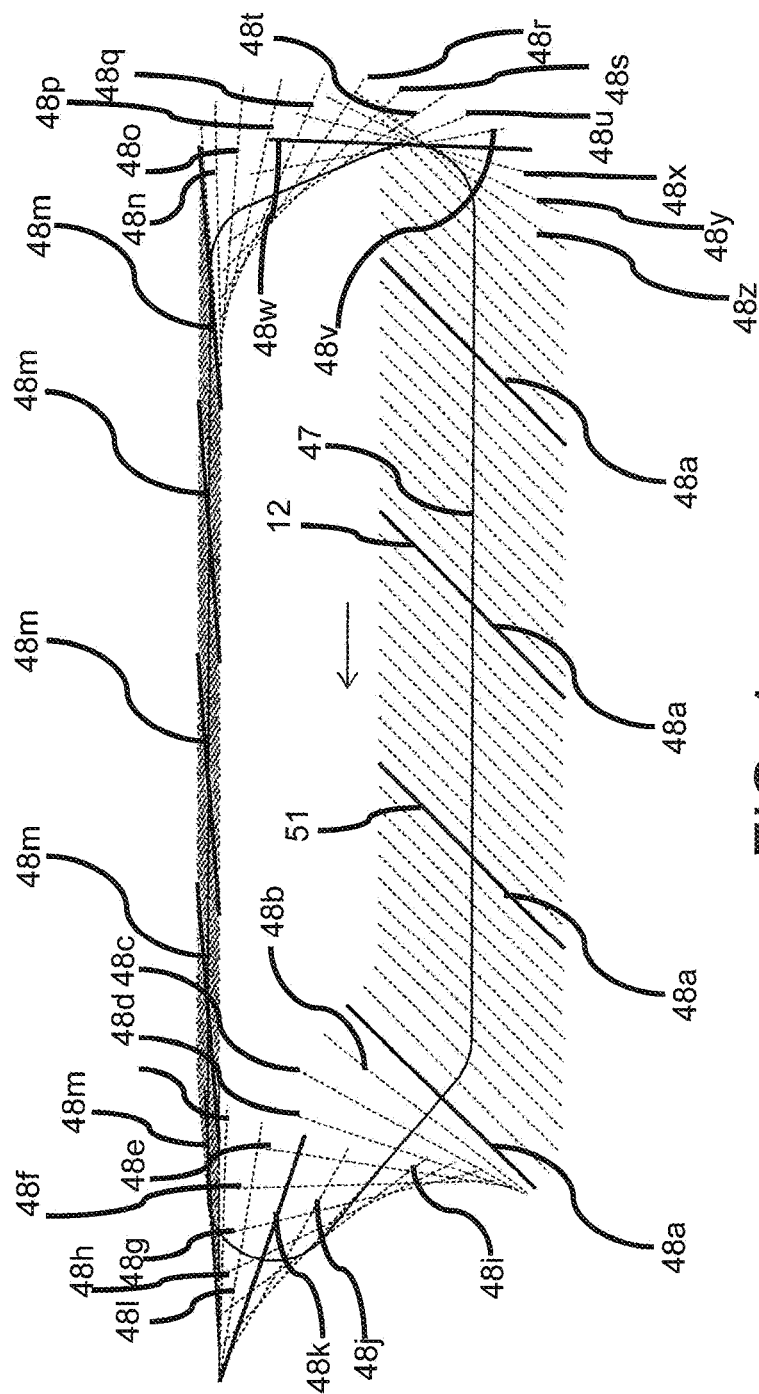
FIG. 4 is a side view showing angular positions of the openings of the receptacles as they travel around a conveyor loop of the conveying mechanism.
Figure 5:
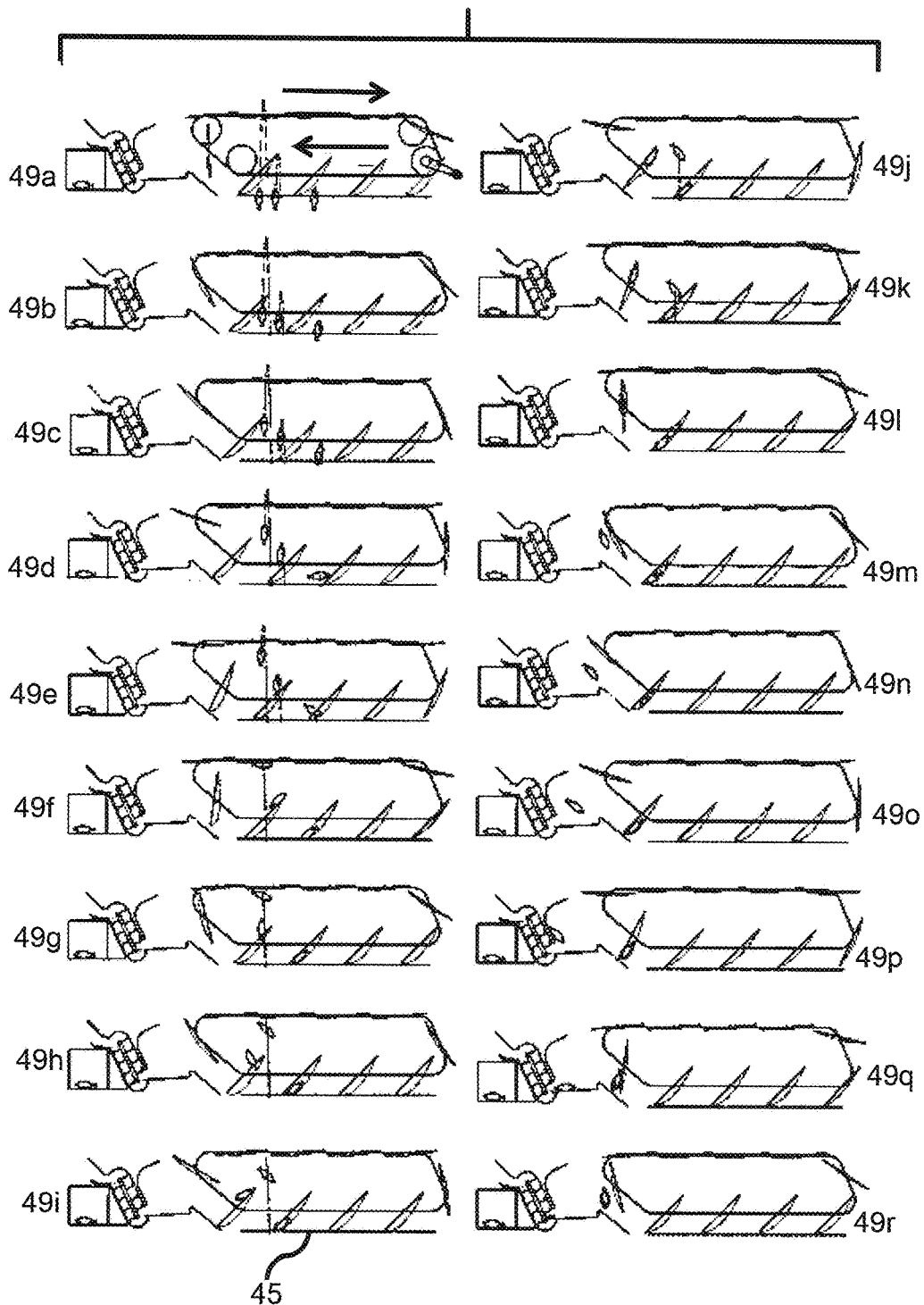
FIG. 5 is a series of side elevation views showing sequential positions of the receptacles as they circulate to capture, transport, and transfer fish according to one embodiment.

FIG. 4 is a side view showing angular positions 48a-48z (angular positions collectively 48) of openings 38 (FIG. 6A) of the receptacles 12 as they travel around a conveyor loop 47 that may be defined by one or more guide tracks 14 associated with the conveying mechanism 43; FIG. 5 is a series of side elevation views showing sequential positions 49a-49r (collectively sequential positions 49) of the receptacles 12 as they circulate to capture, transport, and transfer fish 46 according to one embodiment; FIG. 6A is an isometric view of an embodiment of a receptacle 12 that can be employed to capture fish 46; FIG. 6B is a front view of an alternative embodiment of a receptacle 12 that can be employed to capture fish; and FIG. 6C is a right side elevation view of the receptacle 12 shown in FIG. 6B. FIGS. 6A, 6B, and 6C can be collectively referred to as FIG. 6.

With reference to FIGS. 1-6, starting from the back of the floatable base 40, the receptacles 12 travel low toward the water and at an angle to capture fish 46 that are in the air while the floatable base 40 is moving forward. As the receptacles 12 get to the forward end of the conveyor loop 47 of travel, they individually rotate forward, so as to dump the fish 46 that were caught into the temporary storage area 7.

The receptacles 12 then travel up, and to rotate (typically, but not necessarily, more gradually than instantaneously) through several angular positions 48 to an angular position 48m that may be about horizontal, in order to minimize vertical space of the capture assembly 41. The receptacles 12 travel toward the back end of the capture assembly 41 where they rotate (typically, but not necessarily, more gradually than instantaneously) back to an angular position 48a where they begin the cycle again, scooping fish 46, preferably relatively unharmed, out of the air and preventing them from falling back into the water.

One or more power tracks 13 guide the receptacles 12 around the conveyor loop 47. A power track belt may be adjacent to the power track 13 and may be attached to the receptacles 12 to pull them around the conveyor loop 47 of the conveying path. One or more attachment points 26 of the receptacles 12 may directly or indirectly connect to the power track belt or the power track 13 along sides segments 35 and 36 of an opening frame 51 of the opening 38 and roughly midway between its outer edges (such as leading edges 33 and trailing edges 34). The receptacles 12 can be free to rotate around the attachment point 26, at an angle as determined by the guide tracks 14, such as an inside guide track 23 and an outside guide track 24. The position of the attachment point 26 of the receptacles 12 may be farther toward the leading edge 33 of the receptacles 12, because the weight of any captured fish 46 may be more toward a lower holding section 28 of the receptacle 12. By moving the attachment point 26 (pivot point) closer to the center of mass of the weighted receptacle 12, the loading of the guide tracks 14 can be more uniformly distributed between them.

The guide tracks 14 determine the rotational angle of each receptacle 12 as it moves along the conveyor loop 47. The curves of these guide tracks 14 are such that the rotational angle of the receptacle 12 can be fixed at any angular position 48 along the conveyor loop 47. The curves of the guide tracks 14 may also be adapted so that the rotational acceleration and deceleration of the receptacles 12 can be smooth and continuous. FIG. 3 shows an example of shapes of an inner loop guide tack 23 and an outer loop guide track 24 and their relationship to the power track 13. While the guide tracks 14 mostly maintain their position as an inner loop guide track 23 and an outer loop guide track 24, at two points tracks 23 and 24 effectively cross each other. The first point tracks happens when the receptacle 12 reaches the forward edge of the conveyor loop 47, where each receptacle 12 rotates to dump out the fish 46. To cause the receptacle 12 to rotate, the relative positions of trailing edge 34 and leading edge 33 of the receptacle 12 become reversed. Then as the receptacle 12 moves upward around the conveyor loop 47, the guide tracks 14 cross again just before the receptacle 12 starts its travel back. While the paths cross, the physical tracks 14 do not. At those positions, only one track 14 is continuous, and there is a gap in the other one. This works because the forces acting on the receptacle 12 in those places will cause the corner wheel force to be only against the track 14 that is continuous at those places.

A power track belt (not shown, in some embodiments, it would be buried in the walls for protection) may be employed to pull the receptacles 12 around the conveyor loop 47 may be positioned at a fixed distance from the power track 13. Each receptacle may be attached to the belt directly or indirectly via one or more attachment points 26. While the intention is to make it so that the receptacles 12 glide smoothly along the guide tracks 14 with little friction, the belt is preferably strong enough to withstand both the tension from sudden starting and stopping and the weight of the fish 46 when a receptacle 12 reaching the forward end of the conveyor loop 47 has to lift and rotate with the added weight of the fish 46.

In some embodiments, a toothed belt can provide adequate tension without slippage. Also, because each side of the capture assembly 41 may have its own power track belt and powered toothed wheel or sprocket 16, a conventional tracking mechanism may be employed to have both sides tracking together so as not to cause twisting and binding. In some embodiments, it may be preferable for the conveying mechanism 43 to utilize a distinct belt section between each receptacle attachment point 26. In other words, separate belts or belt segments can be attached to the power track 13 for each receptacle 12. In such embodiments, a broken or worn belt segment can be replaced without having to change the entire belt loop of the conveying mechanism 43.

To guide the rotational angle of the receptacle 12, receptacle wheels 50 that are roughly at the corners of the receptacle 12 roll against or within the guide tracks 14, where wheels 50a at the leading (normally) edge 33 of the receptacles 12 push outward into the outside track 24, and wheels 50b at the trailing edge 34 (normally) push against the outside edge of the inside guide track 23. This way, the wheels 50 are contained between the inside and outside guide tracks 23 and 24, and there is only one rotational angle of the receptacle 12 that will be allowed at each position 49 around the conveyor loop 47.

While the receptacles 12 could also be controlled with their wheels 50 positioned against the outer edges of the guide tracks 14, there is an advantage to having the lower (leading edge) wheel 50a of the receptacle 12 push down against the outer track 24, so as to better support the weight of the fish 46 near the center of mass. While the receptacle 12 can rotate freely around the power track attachment point 26, the rotational angle of the receptacle 12 may be determined by wheels 50 attached to the receptacle 12, roughly at each corner, wherein the wheels 50 roll against a pair of guide tracks 14.

The leading edge 33 of the receptacle 12 may employ a soft padded wedge shape that can maintain its shape as a wedge while helping to prevent damage and bruising of the fish 46 if they hit the leading edge 33. A trailing portion of the receptacle 12 can employ a mesh or a net 39, so as to reduce air resistance, while still providing containment to retain the captured fish 46. Such a flexible net 39 may help the receptacle 12 provide some cushion when the fish 46 hit it. The flexibility that a net 39 or mesh can provide may make it harder for a flopping fish 46 to push against it, and thereby flop back into the water. The net 39 may have openings (mesh size) small enough to allow the capture of any size fish 46 that has managed to get far enough in the air to be caught.

In FIG. 6A, an example of a receptacle 12 includes a net 39 that is supported by a net frame 37 that includes a top bar (or top stretchable plastic) 32, which may also serve as the trailing edge 34, a bottom segment 52, and side net segments 53 that may also form edges of receptacle side walls 31. In some embodiments, the bottom segment 52 of the net frame 37 allows the bottom of the net 39 of the rear net section 30 to be supported across a moon pool 19, while keeping the leading edge 33 of the receptacle 12 as low as possible to the water to catch fish 46 that do not jump very high. In some embodiments, the sides 53 of the net frame 37 allow the net 39 to maximize the use of the space within the capture assembly 41.

In some embodiments, receptacles 12 (which can be individual net frames 37 without a solid lower holding section 30) rotate forward as they get to the end of travel, in order to throw the fish 46 out of the net 39. The net frame 37 may be adapted to support the net 39 so as to move it around quickly and reliability. Other ways to knock the fish 46 out of the net 39, perhaps by hitting the back of the net with something could be employed. In some embodiments, having the net 39 and net frame 39 or opening frame angled at roughly 45 degrees to the surface of the water may facilitate two things: this angular position 48a allows the net 39 or receptacle 12 to do a better job at scooping the fish 46 in the air when they are in front of the net 39 or receptacle 12, and also allows fish 46 to be caught when a fish 46 jumps just after the bottom 52 of the frame 37 (or the leading edge 33 of the receptacle 12) passes by. The fish 46 may jump up, and hit the back of the net 39 at an angle, so that they will be deflected backward into the next net 39 or receptacle 12, while not being knocked back down into the water.

In some embodiments, the lower section 38 on the receptacle 12 is not a mesh with holes, but rather a sheet of fabric or plastic so that the bottom part of the receptacle 12 doesn't drag deeply into the water when loaded down by fish. In some embodiments, the receptacle 12 may have elastic bands or elastic fabric or netting along the sides 31 or top in order to be relatively tight, so that the net 39 and/or receptacle 12 doesn't flop around when moving around the conveyor loop 47, and thereby wear or get caught on something. In some embodiments, the net 39 and/or receptacle 12 is adapted to expand capacity with the weight of the fish 46. In some embodiments, the lower holding section 28 (the portion that can be a plastic or fabric sheet) of the net 39 and/or receptacle 12 can have a depression that will hold small fish 46 that don't have the mass to deflect the net. One exemplary receptacle is depicted in FIGS. 6A-6C. These receptacles 12 may span the width of a moon pool 19 (roughly 10 feet wide) and be about 6 feet tall.

In some embodiments, the moon pool 19 is the opening between the pontoons 10 and under the conveyor net mechanism 43 where the surface 45 of the water is exposed, and where the silver carp or other fish 46 are stimulated to jump up out of the water. In one example, the area of this moon pool 19 may be 10 feet wide and about 20 feet long.

Figure 7A:
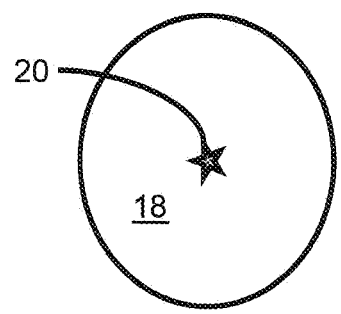
FIGS. 7A and 7B are a plan views showing a relationship between the stimulus location and area where most fish jump with respect to a stationary boat position and a moving boat position, respectively.
Figure 7B:
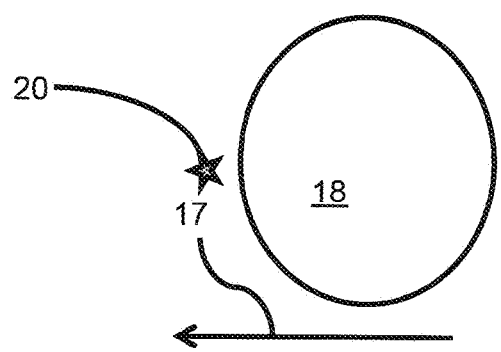

FIGS. 7A and 7B (collectively, FIG. 7) are a plan views showing a relationship between the stimulus location and area where most fish jump with respect to a stationary boat position and a moving boat position, respectively. With reference to FIG. 7, the capture assembly 41 may include a stimulus source 20 to cause particular species of fish 46, such as silver carp, to jump within a general response area 18 associated with the stimulus source 20. The stimulus source type and position preferably causes fish 46 to jump when they are within the confines of the capture mechanism 42. Thus, the stimulus source 20 would preferably be in the center of the moon pool 19 if the floatable base 40 is not moving in relation to a position on the water. However, if the floatable base 40 is moving (in a direction of travel 17 with respect to the water surface 25), because there is a time delay between being spooked and when the fish 46 jump out of the water, the stimulus source 20 can be positioned or directed to be forward of the moon pool 19, so that the fish 46 jump while in the moon pool area 19.

In particular, in some embodiments, the stimulus can be confined or directed to maximize fish 46 jumping within a desired barrier and minimize the number of targeted fish 46 that jump before or after the moon pool 19 of the floatable base 40, or preferably minimize the number of targeted fish 46 that jump outside the moon pool 19. In some embodiments, a single stimulus could be positioned central to the long axis of the moon pool 19, and forward of center if the floatable base 40 is moving, and in the center of the moon pool 19, if the floatable base 40 is stationary (with respect to the flow of the water).

There could also be sources at the inside edge of the moon pool 19 (on the inside side of the pontoons 10) that beam across, or are only heard in, the moon pool 19. There may be multiple kinds of stimulus sources 20, and either a means to move them, or else a means to select one or more that are in different fixed positions. For example, besides a point source centered across the width of the moon pool 19, there could an electric field or beamed sound source across the width of the moon pool 19.

In some embodiments, a barrier may be employed to contain fish 46 that jump, especially those that jump at non-vertical angles, particularly sideways. In some embodiments, the barrier includes one or more walls 21 that preferably extend the height of the capture assembly 41, and are close enough to the width (lateral sides of the openings 38) of the receptacles 12 so that fish 46 can't slip between or beside them. Such wall(s) 21 would prevent fish 46 that jump sideways from jumping out of the moon pool 19 and increase the capture rate of such fish 46. These walls 21, which can include the inner sides of the pontoons 10, can also provide support for the guide tracks 14 and receptacle wheels 50, can be constructed to have structural strength.

In addition, because it is preferable for the stimulus source 20 to cause the fish 46 to jump while in they are in the moon pool area 19, some embodiments are adapted to reduce or eliminate extraneous noise sources that might spook the fish 46 when they are not within the barrier. For this reason, the material and assembly can be designed to minimize or eliminate sound generation and/or propagation extraneous to the desired stimulus.

For some embodiments, the walls 21 can be clear or translucent to allow light to get through the walls 21 and into the moon pool 19. However, artificial lighting could be provided in the daytime to eliminate cues that might keep fish out of the moon pool area 19. For these reasons, fiberglass, because it can be made relatively translucent, and has sound deadening properties, may be a preferable material to use as the walls 21 (and perhaps including the pontoons 10) for some embodiments. For some embodiments, the attachment points from the tracks 14 to the wall 21, and/or cumulative from the walls 21 to the hull, can be designed to include sound deadening layers, to minimize noise generated by the motion of the capture assembly 41 from propagating into the water.

In some embodiments, in order to make a permanent trough so that it would hold little fish 46, the bottom lower holding section 28 can be made out of a fiberglass shape. In some embodiments, when there are not any fish 46 in the net 39, the back side may be at 45 degrees, and any fish 46 hitting the bottom of the net 39 will just bounce back into the next net 39. However, when the net 39 is full of fish, and sagging down, then some fish 46 hitting the bottom can bounce down. So, the design of the receptacle 12 in FIG. 6A includes a permanent trough, while still having most of the back side at an angle, to prevent fish 46 from bouncing straight down.

In areas of high fish concentrations, the capture assembly 41 could catch thousands of fish per hour. The floatable base 40 can patrol up and down a river, stream, or lake, and even catch fish 40 in areas where normal netting can't be done, for example, as in areas of high river traffic, or where the bottom is uneven or has obstructions that would snag a net. The advantage of using a conveyor net boat is that the fishing can be continuous, day and night, as well as year-round (as long as the surface is relatively ice-free and the fish 40 are near the surface and can be induced to jump).

One receptacle 12 will catch some fish 46, but may miss those fish 46 that jump behind the receptacle 12 or over it. However, the jumping fish 46 can be limited to a fixed space, such as by providing a barrier, such as walls 21 and a ceiling, as well as using a series of receptacles 12. The receptacles 12, suspended at an angel, such as 45 degrees, can be spaced close together and can move roughly 12 feet per second (about 8 miles per hour), fast enough so that fish 46 are unable to fall back into the water between the receptacles 12. This speed can be the speed of movement of the conveying mechanism 43 with respect to the speed of the floatable base 40 or the speed of the receptacles 12 with respect to the surface of the water. In some embodiments, the boat 40 may move, such as 4 miles per hour, and the speed of the receptacles 12 within the boat 40 can be moved more slowly, such as 6 feet per second.

If the receptacles 12 moved too slowly, then they may become too full and the excess fish 46 may end up back in the water. Also, some fish 46 that aren't jumping very high will fall back in the water. If the receptacles 12 are moved too fast, then more fish 46 will get bonked on the head by the bottom 28 of the receptacle 12 before they have a chance to get airborne, and thereby not get caught by the receptacles 12. Accordingly, in some embodiments, the receptacle speed can be variable and can be controlled by the person doing the fish packing. So if the receptacles 12 are starting to hold so much fish 46 that some are falling out, then the conveyor mechanism 43 can be speeded up, and will empty faster. And, if the temporary storage area 7 is getting filled up before the fish packer person can empty it, then the boat 40 and/or receptacles 12 can be slowed down or even stopped. Note that if the number of fish 46 caught is overwhelming to the fish packer, and the receptacles 12 are slowed down or stopped, once the temporary holding area 7 is cleared out, the boat 40 can revisit the area again. In some embodiments, 4'/sec to 24'/sec in relation to the water can provide a suitable range for a desirable movement speed of the receptacles 12. Note also that the speed can be directly related to the spacing of the receptacles 12, which could be changed.

The receptacles can be moved in a conveyor belt fashion, with guide tracks 14 controlling the rotation of each receptacle 12 so that it dumps its contents at the front end of the sweep before continuing over and back to start another sweep. In one embodiment, a series of ten 6'×10' receptacles 12, such as modified nets, arranged in this configuration about 4 to 8 feet apart (preferably 6 feet apart) could catch the vast majority of jumping fish 46 in a 10'×20' area.

Each of the ten or so receptacles 12 can be supported by a tubular frame or other type of structure. The receptacles 12, such as nets, may have a portion that hangs loosely enough so that, held at a 45° angle, the weight of the fish 46 will cause the nets to sag and hold large numbers of fish 46. Weak elastic bands along the bottoms and sides can take up slack when there's no weight in the net. All the net frames or receptacles 12 can be driven along by a belt (or equivalent) along a fixed path, keeping the lower edge 33 just above the surface 45 of the water to scoop carp or other fish 46 out of the air. Wheels 50 that can be guided along tracks 14 can be attached at the corners of the net frame or receptacle 12. With the net being pulled along in the vertical center, and the top and bottom corners guided along their own tracks 14, the nets can be rotated as they progress along the conveying path.

At the end of a sweep, as each net is rotated forward and up, the fish that were caught by the net continue their forward momentum, and are thrown into a temporary holding area 7 from which they are moved further forward and packed into bins, such as standard 42"×48" fish containers 44. A fulcrum or deflector, such as an angled surface or one or more levers, or guidance by the tracks 14, may impede progress of the net or receptacle 12 from its fish-catching orientation and cause the net or receptacle 12 to change its orientation to dump the fish 46 out of the net or receptacle 12.

The tracks 14 that guide movement of the receptacles 12 can be designed so that the rotation speed of a net frame or receptacle 12 has a controlled acceleration and deceleration, so the motion is smooth and continuous. Note, that in the figures, the left hand end shows the temporary holding area 7, followed by a supplemental conveyor belt 54 that will lift fish 46 up to a tray for quick inspection and removal of any incidental by-catch, before the desired fish 46 are dumped into the fish containers 44.

In some embodiments, fish inspection/packing may take longer than catching. The fish 46 are preferably scanned before they are dumped into two or more 4'×4' insulated fish containers 6, for example (with a 10' wide moon pool 19 per some embodiments, there could be room on the boat 40 to have two of such containers 44 side-by-side in an operable position for packing). In some embodiments, it may take two seconds to dump ten fish 46 out onto a long tray to be inspected. So the capture assembly 41 can readily catch five or more fish 46 per second, if such number of jumping fish 46 is available in the barrier region. In some embodiments, the number of fish 46 that can be captured by the capture assembly 41 is greater than or equal to one fish per second. In some embodiments, the number of fish 46 that can be captured by the capture assembly 41 is greater than or equal to five fish 46 per second. In some embodiments, the number of fish that can be captured by the capture assembly 41 is greater than or equal to ten fish 46 per second.

Then perhaps four seconds would be utilized to scan the fish 46 after they are dumped from the receptacle 12, then five seconds to transfer them to the fish containers 44 and distribute crushed ice over them. Rounding up to about fifteen seconds, yields about 40 fish per minute to inspect and place fish 46 in bins 44. In some embodiments, inspection and packing may be automated with optical or other sensors that could be arranged along the supplemental conveyor 54 from the dumping area to the storage bins 44.

In some embodiments, it can take 5 fish per layer of average size carp, and 15 layers to fill the container 44, rounding to four minutes to fill both fish-bin containers 44. Once the containers 44 are full, they can be moved out of the way, and empty containers 44 put in their place, adding about one minute for that operation. Another deck hand could use the on-board crane 9 to move the full fish containers 44 up to the top deck 8 above the capture mechanism 42, or the crane 9 can be automated to operate when the containers 44 reach a given weight or optical sensors determine that the bins 44 are filled to a desired level. Similarly, a person or a central controller can adjust capture speed of the capture assembly 41 to ensure adequate time for bin replacement.

Perhaps two full containers 44 could be lifted, and two empty ones lowered, in the four minutes time to fill the next pair. In some embodiments, up to six full containers 44 can be stored in a single row that is centered in the middle of the deck 8. The amount of full containers 44 may depend on the weight distribution, capacity, and sea worthiness of the boat 40.

When the boat 40 is full or almost full, either a support boat can come by and off-load the fish containers 44 (which may take about ten minutes), or the conveyor net boat 40 can travel to a dock where it may take some time to off-load the bins 44 of fish 46. To fill and offload six containers, each with 75 fish 46, a full cycle of 450 fish may take about 30 minutes (to allow some time to maneuver the boat 40 over the fish 46), or about 15 fish 46 per minute—under ideal conditions. In some embodiments, the number of fish that can be captured and ultimately unloaded can be greater than or equal to 5 fish per minute. In some embodiments, the number of fish that can be captured and ultimately unloaded can be greater than or equal to 10 fish per minute. In some embodiments, the number of fish 46 that can be captured and ultimately unloaded can be greater than or equal to 15 fish 46 per minute. In some embodiments, the number of fish 46 that can be captured and ultimately unloaded can be greater than or equal to 20 fish 46 per minute.

As previously mentioned, at the forward end of the conveyor path is the temporary hold 7 where the fish 46 pile up until a conveyor belt 54 hauls them up and dumps them into one or more fish containers 44 (simultaneously). A human inspector, who can inspect the fish 46 before they are dumped into a container 44, can control the speed of both the supplemental lifting conveyor 54 (from the dumping area to the storage area) and the speed of the receptacles 12 traveling in conveying mechanism 43, and can stop either mechanism at any time. For example, he or she may stop one or both when the fish containers 44 are filled up, so as allow time to slide empty containers 44 into position. At the time that the fish 46 are dumped into an insulated fish container 44, some ice can also be dumped over that layer of fish 46, thereby insuring freshness.

Another crewmember can be the captain. On board, the boat 40 can employ a sophisticated array of sonars—forward looking, depth, side-scanning, and even backwards (scanning behind to see how many fish 46 remain because they didn't jump). GPS positioning equipment, along with other data recording, such as the number of fish 46 caught and sonar data, can be used to compile automatically an accurate report to be used for future planning. Another, optional, crewmember may work the crane 9 and move fish containers 44 around so that the person doing the packing doesn't have to stop and do that. Under maximum fish-catching conditions, this crewmember could remove and store full fish containers 44, and position empty ones in the time it takes to fill them up.

One or more support and transport boats can be employed for finding and herding fish 46 as well as transporting filled containers 44 to shore or to a factory ship. In some embodiments, underwater drones or sonar units can be used to herd carp or other fish up from the depths, away from the bank, or to just to consolidate the school before the conveyor net boat 40 passes over them.

In some embodiments, the elements of a herding underwater drone can include one or more of the following characteristics: 1) high maneuverability, with enough forward speed to quickly get to the area where it's needed and to keep up with the boats 40, and powered by quiet electric motor and propeller system with carrying enough battery capacity to work for at least an about hour (more is better); 2) very rugged, so as to be able to run into an obstruction without sustaining damage; 3) small enough size to maneuver in tight places, and preferably be lifted and carried by one person; 4) a quickly-replaceable battery, preferably without having to pull the drone out of the water; 5) a handle or grabbing point, which can be used to hoist the drone into and out of the water; 6) an electronically-generated noise source where the volume can be controlled (preferably real-time and remotely); 7) sensors, such as temperature and sound, battery status, etc; 8) two-way communication to the mother ship 40, probably by means of a modulated ultrasound serial stream, where each of many drones has its own channel, and control of the drones can be done in either a broadcast mode, which all drones respond to, or individual channel control, which talks to only one of many drones (the pack of drones could be controlled and directed in a round-robin, time multiplexed manner); 9) the communication back to the mother ship 40 comes with a header which specifies which drone it is, and will normally be low-bandwidth information, such as status (when requested), or alerts, such as when the battery is going dead, or the on-board computer crashed, or if it's stuck; 10) the drone could be programmed such that if it's stuck, loses communication with the mother ship 40 for a prolonged period, or the battery dies, or the computer crashes, an inflatable bladder on a string could be deployed; 11) optionally a rudimentary sonar system that can track and identify the other drones, so that they can automatically get into a particular formation or maintain the formation that they are already in (this feature would make directing them much easier, because they all move together and stay as a group); 12) they might have a doppler sonar system that can be pointed at a fish 46 and could perhaps identify that it is a filter feeder by the motion of its mouth; 13) one or more of the drones may also be equipped with a light and a camera, and possibly even a remote manipulator arm.

These need not be autonomous drones. Each one can be controlled individually, and directed how fast to go, which way to turn, and what sound to play (and at what sound level). A person using a high-resolution sonar system can see and identify each drone, and see the fish 46 that need to be herded, so as to direct the drones what to do. By employing a human in the loop, the drone doesn't need to have any real intelligence.

In some embodiments, the underside of the front portion of the boat 40 may have panels which emit light with a variable brightness and spectrum to substantially match the light at the surface 45 of the water, so the boat 40 would cast little or no shadow as it moves over the fish 40 to further avoid spooking them unintentionally.

Figure 8:
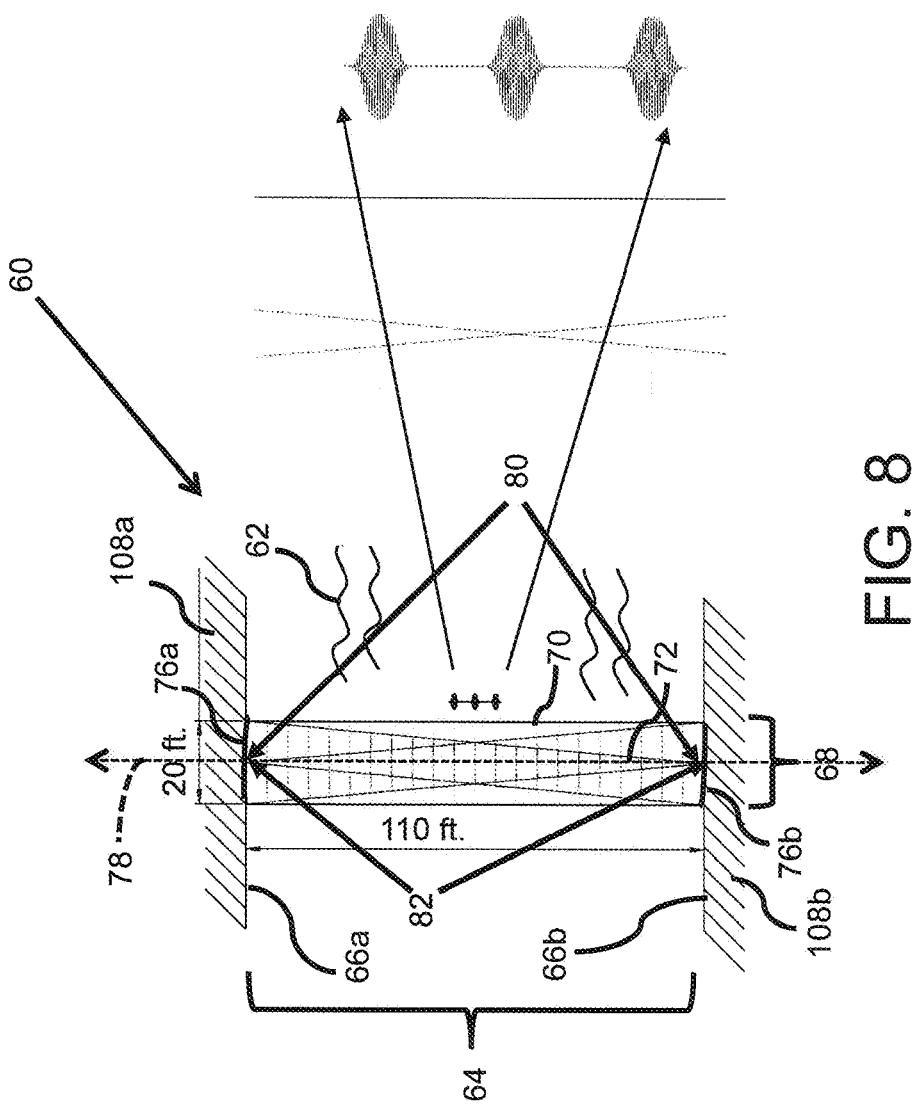
FIG. 8 is plan view showing an embodiment of an ultrasonic barrier extending across a body of water between two banks.

FIG. 8 is plan view showing an embodiment of an ultrasonic barrier 60 extending across a body of water 62, such as a river or channel 64, between two sides or banks 66a and 66b (collectively 66). The method of using modulated ultrasonic waves to project a sound within hearing range is known as "directional sound" or "parametric sound." There are a number of commercial directional speakers that are commercially available. The affect they have is that the audible sound seems to occur inside the listener's own head.

Since some invasive fish 46, such as Asian carp, appear to move away from sound sources, it is reasonable to believe that that they have directional hearing. If they can sense whether the sound is louder in one direction than another, then they will move away from the direction of the sound. Creation of a sharply defined sound wall 68, therefore, should provide an even more startling effect. So, as the fish 46 swim up to the edge 70 of a resonate beam 72 of the sound wall 68, the sound level will increase dramatically, and seem to be very close, and the fish 46 will react quickly and decisively to move away from the sound barrier 60.

An exemplary embodiment generates a resonant ultrasonic barrier 60 across a body of water 62, such as a river or channel, to deter passage of invasive fish 46, such as Asian carp. The resonant barrier 60 forms a wall 68 of sound having sound characteristics designed to frighten Asian carp or other invasive species and cause them to avoid the barrier 60.

In some embodiments, a pair of vertically oriented, cylindrical parabolic reflectors 76a and 76b (collectively 76), are placed on opposite sides 66 of a river or channel 64 and pointed at each other, with the focal point 80 of each cylindrical parabolic reflector 76 being at the surface of the central axis 78 of the opposite reflector 76.

At this cylindrical focal point 80 of each reflector 76, a vertical array 82 of sound emitters, all operating in phase, are aimed directly toward the opposite reflector 76. The sound emitter array 82 projects a cone of sound, with a tight projected beam angle, so as to insure that most of the projected energy hits the opposite reflector 76. The projected sound beam angle, and the distance the reflectors 76 are apart, can be used to select how wide the reflectors 76 should be to capture and reflect back enough energy.

The frequency emitted by the transducers of the emitter array 82 is preferably ultrasonic to facilitate projection of sound in tight enough beam angle. The ultrasonic frequency is outside the hearing range of Asian carp and other fish 46, but by amplitude modulating the ultrasonic sound with a signal in the audible range, then, due to non-linear characteristics in the medium, the audible sound can be heard in the water by the targeted fish 46 while still maintaining a tight projected beam angle.

The audio sound frequency is selected to be in the range to which the targeted fish 46 react. The audio frequency is also selected so that its audio wavelength is an integer multiple of the distance between the two reflectors 76, so that when all the sound emitters are synchronized (in phase), a resonance can build up where reflected waves are in phase with the emitted sound.

As the sound is projected across the channel 64, the beam 72 will diverge in a cone shape until the beam 72 of sound hits the opposite parabolic reflector 76. Because the sound emitters are located at (or near) the parabolic focal point 80 of the opposite reflector 76, once the sound hits the parabolic reflector 76, the reflected wave will bounce back straight across, with an essentially flat wave front. When this straight beam 72 of reflected sound hits the opposite cylindrical parabolic reflector 76, the beam 76 will then converge and focus to the sound emitter array on the opposite side, which then, reflecting back, with the sound in phase with these emitters, the sound amplitude can build up.

By slowly changing the phase of the resonate frequency, peaks and troughs of the sound can be moved. The moving sound may be more startling to a stationary fish 46, and the fish 46 would be less likely to swim into a "quiet" trough in the standing wave.

Because each wave reflected from sound coming from the focal point 80 is straight and essentially non-divergent, there will be a relatively sharp and uniform wall 68 of sound. The noticeable edge 70 should make the barrier 60 more startling to a fish 46 as it approaches the barrier 60.

Along with a relatively uniform and sharp outside edge 70 of the barrier 60, because half of the reflections either focus the sound down to the focal point 80, or come from a focal point 80, the core portion of the barrier 60 will contain two overlapping cones of higher energy, which may offer a backup core barrier to the outside edge barrier.

For reliability reasons, multiple independent redundant systems may be desirable. In some embodiments, vertical arrays 82 of sound emitters can be arranged in a strip. With two or more of these strips grouped close to the central axis 78, if one emitter, or a whole strip failed, it could be pulled up and out of the water 62, and replaced without bringing the system offline. Each strip might also have its own independent driving electronics.

In addition to the array(s) 82 of emitters, multiple hydrophones can be employed to monitor the sound waveform bouncing back. Thus, the modulating frequency can be controlled so as to maintain resonance under different environmental conditions.

Referring again to FIG. 8, in some embodiments the parabolic reflectors 76 are mounted at each side of a channel 64. The size of the reflectors 76 (20' across, for example) is chosen to be large enough to capture and reflect up to 90% of the power of a 200 kHz ultrasonic beam 72 coming from the other side.

The reflectors 76 can be constructed of prefabricated metal or plastic, mounted against a wall at the edge of the channel 64. They may be at least as high as the expected peak flood stage. Transducers that are above the water line are turned off to avoid damaging them. Circuitry can automatically detect if a transducer is above the waterline by sensing a change in its impedance during the start of a transmission pulse 94 (FIG. 12), and can be linked to controls that will quickly turn the particular transducer off. It's desirable that a transducer is automatically cut in and out quickly, because the water level changes with every ship's wake and large wave.

At a distance of only 110' for example, the peak resonate power level may build up to 10 times the power level of just the transducers' power alone. And, if the power level is not high enough, more transducers can be added to an array 82 as needed. To maintain maximum up time, the design preferably employs multiple redundant systems. In addition, it would also be desirable to be able to change out a single failed transducer from the rear of a reflector 76, safely, without shutting down the rest of the system. As a failsafe, should the system completely fail, a physical barrier, such as a net, could be quickly raised along the center of the barrier 60, but that may mean halting ship traffic.

Figure 9:
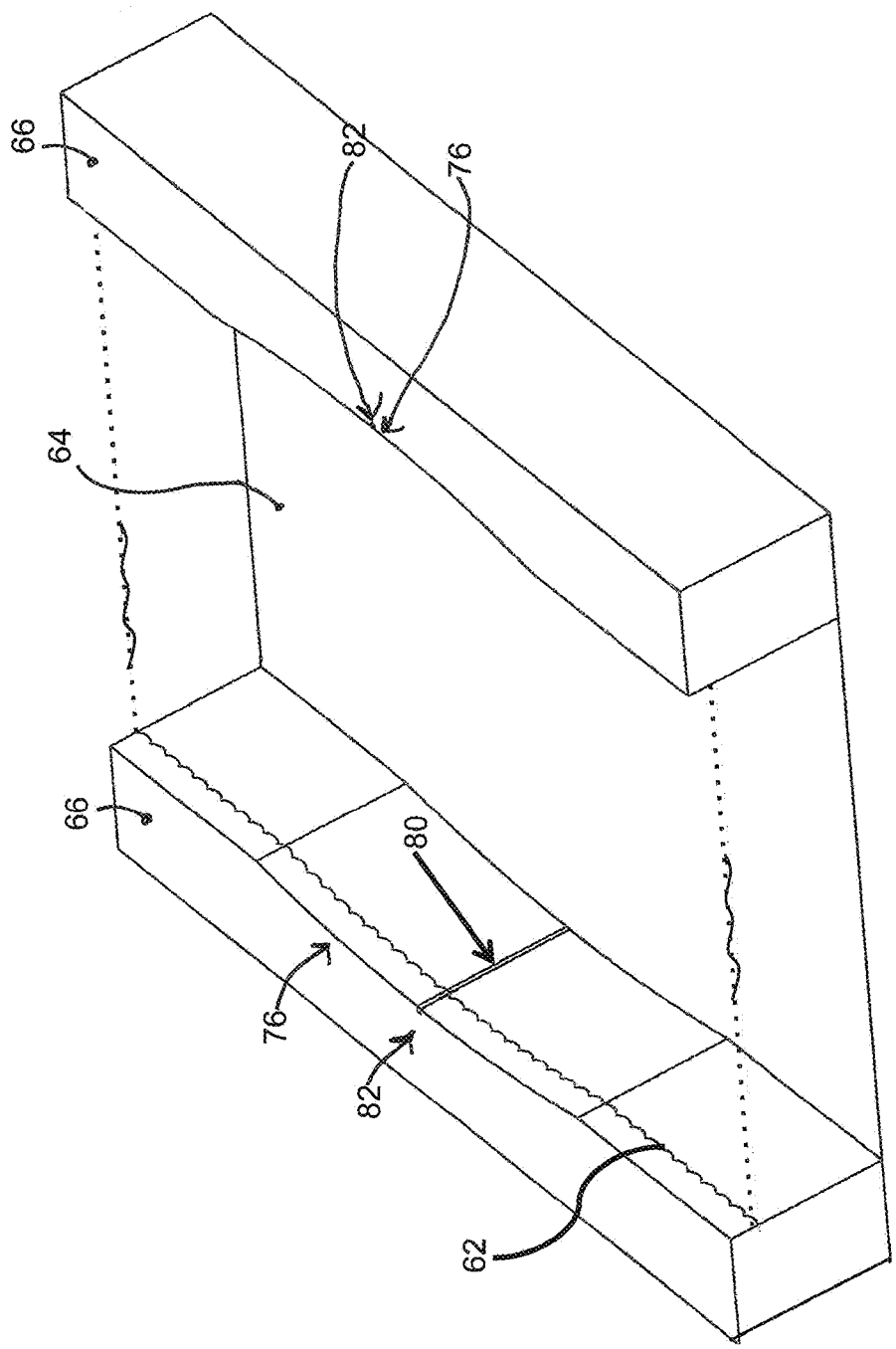
FIG. 9 is an isometric view showing an exemplary embodiment of an isometric reflector employed in an exemplary ultrasonic barrier.

FIG. 9 shows an example of a physical implementation of the resonate underwater sound barrier 60 in a channel 64 of water 62, including: the water channel 64; the channel sides 66; parabolic reflectors 76; and vertical arrays 82 of ultrasonic transducers located at the parabolic focal point 80 of the reflector 76 on the opposite side 66 of the channel 64.

In some embodiments, the parabolic reflectors 76 are mounted on opposite sides 66 of a body of water 62, such as a channel 64, with focal points 80 of the reflectors 76 at the center surface of the opposite reflector 76. In some embodiments, the parabolic reflectors 76 are 10'×20' and are stacked to be at least as high as the highest flood stage level of the channel 64. In some embodiments, at the focal point 80 of each reflector 76 is a cluster of high power ultrasonic sonar transducers operating at around 200 kHz or greater, and modulated by the desired audio waveform.

Figure 10:
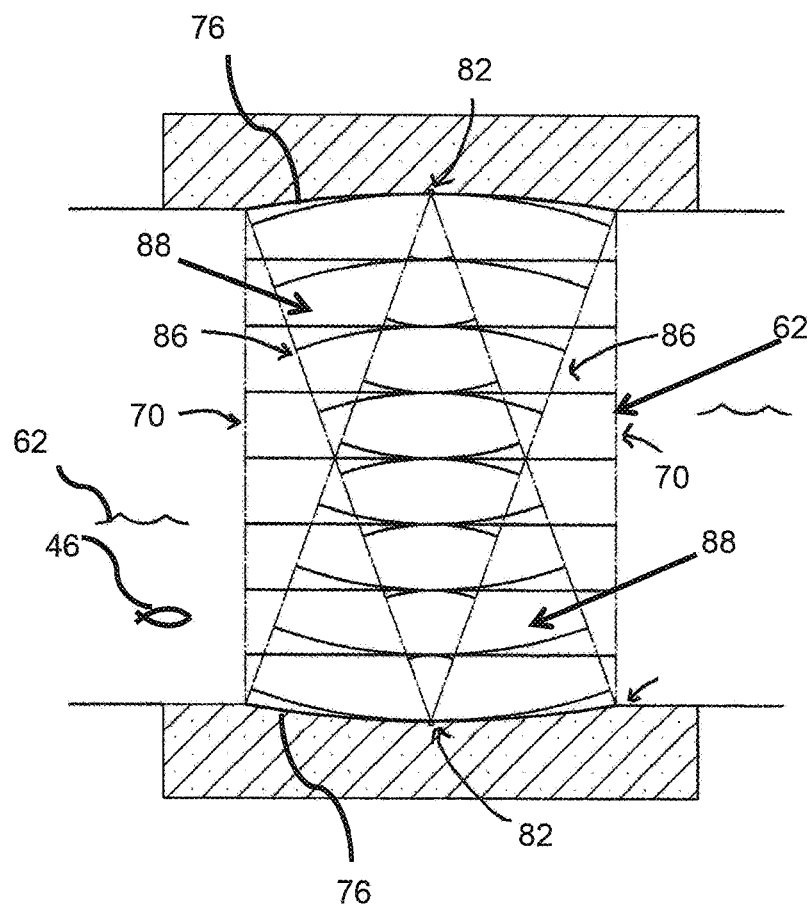
FIG. 10 is plan view showing exemplary resonance between a pair of reflectors with converging and diverging wedges of sound and straight wavefront reflections that create distinct edges of the barrier.

FIG. 10 is a top view of resonance barrier 60 between a pair of reflectors 76 showing converging and diverging wedges of sound, and straight wavefront reflections, which create the resonant ultrasonic barrier, including: the parabolic reflectors 76; the edge 70 of sound barrier wall 68; edge 86 of convergent and divergent sound wedges 88; and a top view of the vertical array 82 of ultrasonic transducers.

Clustered, the transducers make a narrower beam angle. Each sound source broadcasts in phase with all of the other ones in the array 82, and the modulating frequency is chosen so that a resonance builds up in the space between the reflectors 76. During resonance, the peak sound amplitude will increase significantly as reflected sound waves are constructively added to the source sound waves. While in resonance, the sound amplitude will also tend to be uniform across the whole channel 64 and should provide a formidable barrier 60, more effective than just having scattered sound sources across the bottom of the channel 64. Additionally, unlike a bubble barrier, sound will not vary appreciably with water currents or turbulence. Moreover, the reflectors 76 can be angled upstream with the emitters fixed so that their central divergence angle follows the reflector angle, thereby creating a curved path upstream to compensate for the current.

Because of the large number and separation of the transducers, the short wavelength, and the distance between the reflectors 76, a coherent resonance is inconvenient to build at ultrasonic frequencies, such as 200 kHz. However, it can be simpler to set up a resonance at the modulation audio frequency, such as 1 kHz, for example. And while the 200 kHz sound may have random phase relationships as the sound bounces back and forth, the modulated peaks of the audio frequency can be kept in phase. So just as a particular wave of high intensity ultrasound arrives at the transducers and starts to bounce back, the transducers' modulated signal is added to it, and an even higher intensity wavefront progresses back across the body of water 62 to the other reflector 76.

The reflections are resonant in the sense that an integer multiple of the modulated signal continues to build as it bounces back and forth. In effect, a constant stream of low frequency 1 kHz sound coming from each direction is created. At the resonant location lines where the peak amplitude of the wave streams collide, there will be more the energy, and between these peak points, there will be lower energy.

To avoid sound gaps between the resonate lines, the modulating wave can be selected to be asymmetric, with the main ultrasonic power level taking up 10%-20% of the audio cycle, instead of 50%. The phase of the modulating signal can also be shifted at regular (or irregular) intervals, so as to constantly sweep the peak wavefront forward. Thus, if there are any gaps in the sound barrier 60, the gaps will be continuously pushed forward. For example, by shifting the phase 10% every 600 microseconds, the resonant peaks will travel forward by one wavelength (5 feet) every 3 seconds, driving the fish 46 in the direction away from the edges 70 of the wall 68. One will appreciate that different intervals of phase shifting would also be acceptable, even less frequent interval or irregular interval of phase shifting.

Along with the clusters of high-energy transducers mounted along the center of each parabolic reflector wall, separate sound sensors (which can be supplemental transducers) can be employed so that the exact resonate frequency is automatically adjusted. In normal sonar, the transducer also functions as the sound sensor, but with sound resonance, the transducer is not a great choice to double as the sensor, because at the very time the transducer expects to see a return pulse 94, the transducer should be transmitting one.

Figure 11:
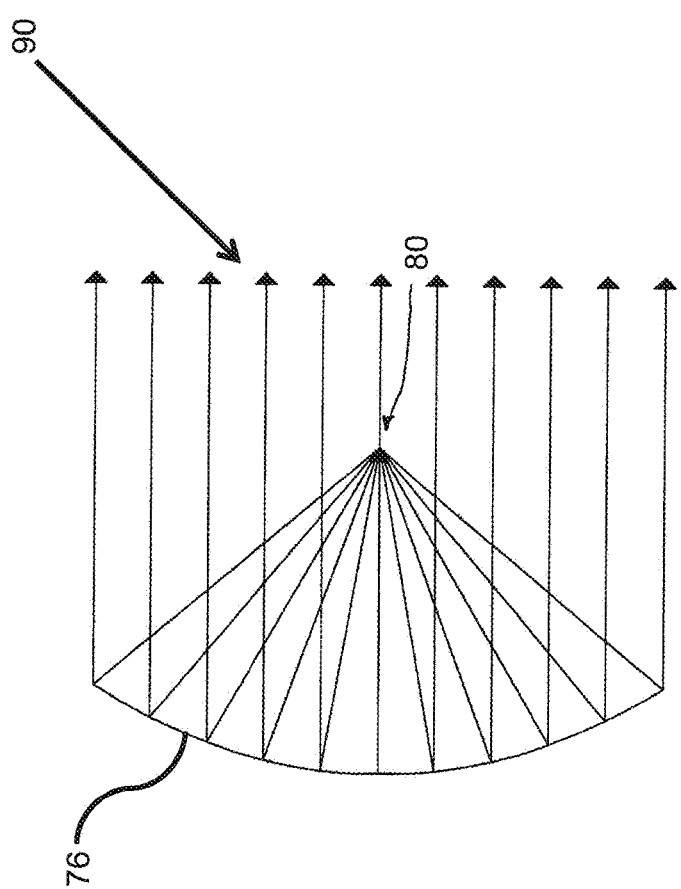
FIG. 11 is a plan view showing how an exemplary parabolic reflector functions.

FIG. 11 explains fundamentals of a parabolic reflector 76, including the parabolic reflector 76 and its focal point 80. Often parabolic arrays are shown with lines diverging outward from a point source, then reflecting off of the reflector 76 in parallel lines. Conversely, parallel lines can strike the reflector 76 and converge to the focal point 80. It works both ways. If a source at the focal point 80 sent out waves radiating outward, as they hit the parabolic reflector 76, the wavefront edge 90 will go out in a straight vertical line off of the reflector 76.

Figure 12:
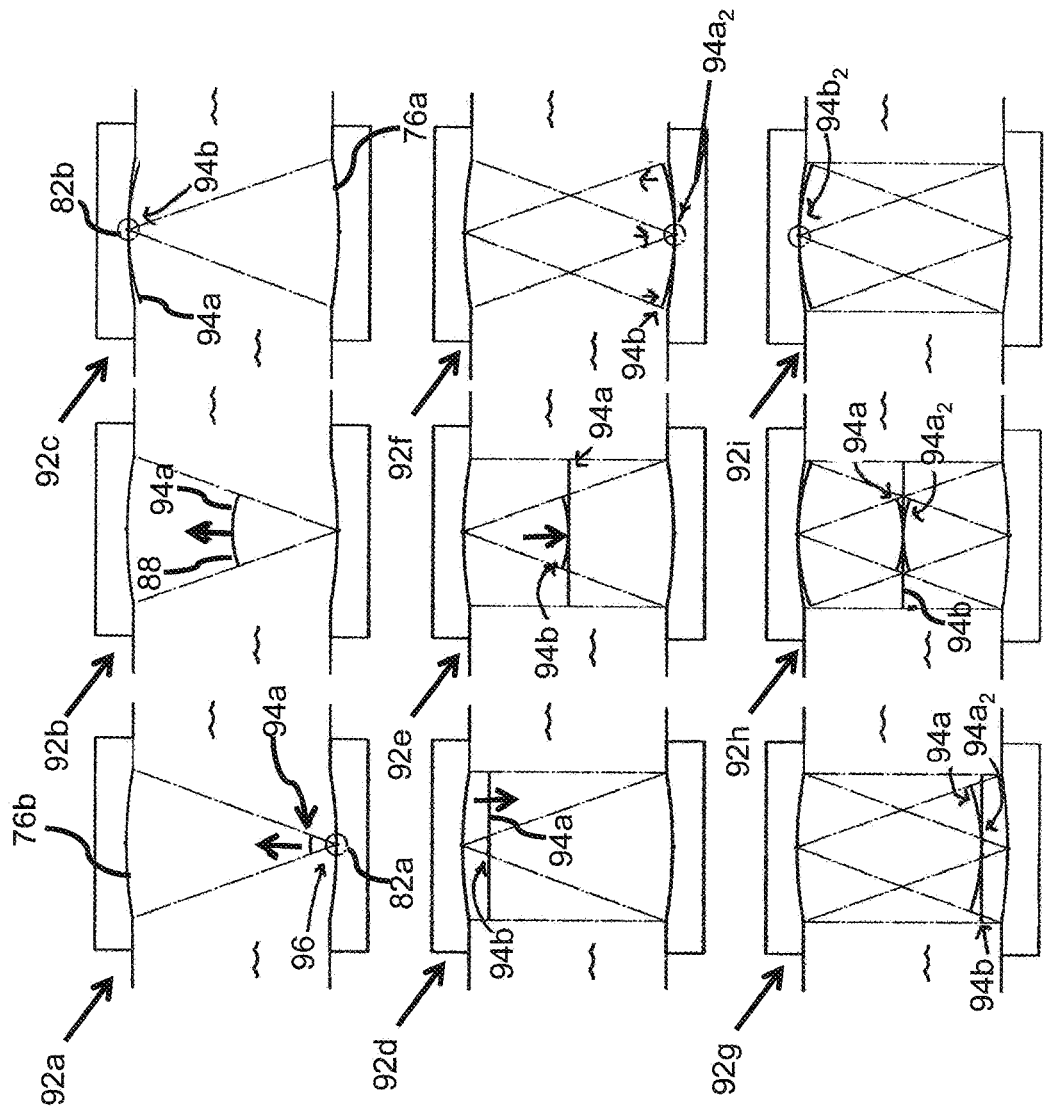
FIG. 12 is a series of plan views showing a simplified example of how resonance of an ultrasonic pulse can build up across a body of water by multiple reflections and synchronized new pulses.

FIG. 12 shows simulated chronological events 92a-92i (collectively 92) using single a pulses 94a bouncing back and forth across the channel 64 to provide a simplified example of how resonance of an ultrasonic pulse 94 can build up across the channel 64 by multiple reflections and a synchronized new pulse 94b.

Every time the pulse 94 bounces off of a reflector 76, the emitter on that side outputs another pulse 94 that is in phase with the reflected pulse 94, so as to build up amplitude of the pulse 94 at every bounce. Note that there is a limit to the number of times a pulse 94 can bounce back and forth across the channel 64 due to attenuation of the sound over distance. The amount of attenuation in fresh water is highly dependent on the temperature of the water and the frequency. At 20° C., a 200 kHz ultrasonic sound will be about 1/10th the original strength after 33 bounces across a 30-meter channel 64. The more reflections, however, the more likely that the waveform shape will be smeared mainly due to longer sound paths of the signal as it diverges in the vertical direction across the channel 64. To limit this smearing, the number of reflections can be selectively limited. To reduce the number of bounces from the reflectors 76, the ultrasonic frequency could be raised to 455 kHz, which is attenuated about three times higher than 200 kHz. In some embodiments, the ultrasonic frequency can be adjusted to compensate for temperature changes tracked by one or more sensors to thereby maintain a uniform number of bounces from the reflectors 76.

At event 92a, a pulse 94a is initiated 96 to radiate outward from the lower array 82a of transducers to the opposite reflector 76b. At event 92b, the pulse (or its sound wave) 94a is shown traveling in a perfect wedge 88 (as viewed from above), in reality, the strength of the pulse 94a will vary across the vertical axis, following the radiation pattern of the transducer.

At event 92c, the upper array 82b of transducers now emits a pulse 94b in phase with the reflected pulse 94a when hit by it. Events 92d and 92e show the pulses 94a and 94b propagating across the channel 64 toward the reflector 76a.

At event 92f, the lower transducer array 82a emits another pulse 94a₂ when hit by the combined pulses of 94a and 94b.

Events 92g and 92h show the pulses 94a, 94b, and 94$a_2$ propagating across the channel 64 toward the reflector 76b.

At event 92i, the upper array 82b now sends out another pulse 94b2 when hit by the combined pulses of pulses 94a, 94b, and 94$a_2$. The pulse strength will continue to build up every time a new pulse 94 is added synchronously. Since the sound level attenuates with distance, each new pulse 94, after some number of reflections will become so weak as to not contribute anymore, and the resonate pulse will reach its maximum strength.

Figure 13:
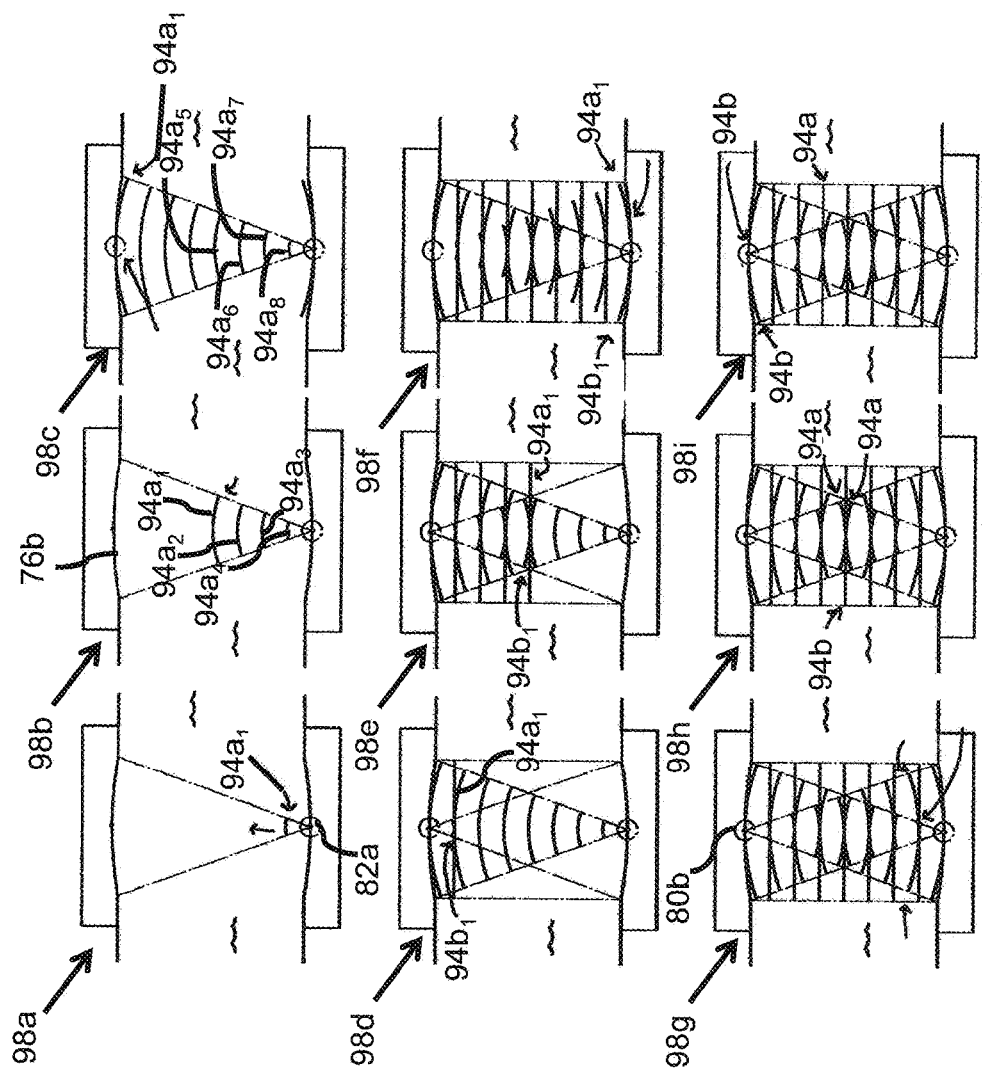
FIG. 13 is a series of plan views showing another example of pulse resonance, with emitters sending out a continuous stream of pulses at a pulse repetition rate selected so that the wavelength of a pulse cycle is an integer multiple of the distance between the reflectors.

FIG. 13 provides another example of pulse resonance, only this time with the emitters sending out a continuous stream of pulses 94, with the pulse repetition rate chosen so that the wavelength of a pulse cycle is an integer multiple of the distance between the reflectors 76. In particular, FIG. 13 shows simulated chronological events 98a-98i (collectively 98) to demonstrate resonance build up using a continuous stream of pulses 94 emitted at matching phases.

Event 98a shows the leading edge of the first pulse 94$a_1$ of the series of pulses 94 emitted by the lower transducer array 82a. Event 98b shows the series of pulses 94$a_1$, 94$a_2$, 94$a_3$, and 94$a_4$ propagating toward the upper reflector 76b. At event 98c, pulses 94$a_2$, 94$a_3$, 94$a_4$, 94$a_5$, 94$a_6$, 94$a_7$, and 94$a_8$ are propagating toward the upper reflector 76b. When the pulse 94$a_1$ reaches the upper transducer array 82b, the upper transducer array 82b starts an identical series of pulses 94b, including 94$b_1$, which line up with the series of 94a pulses coming from the lower array 82a. As the stream pulses 94a hits the parabolic reflector 76b, pulses 94a stop becoming divergent, and bounce back straight across the channel 64 toward the reflector 76a. Events 98d and 98e show the original pulses 94$a_1$ and new pulses 94b (not shown individually numbered) propagating toward the reflector 76a.

At event 98g, the straight wavefront of reflected pulses 94a bounces off of the lower reflector 76a, and now focuses toward the opposite focal point 80b, and then becomes convergent, following the divergent path of pulses 94b. As this happens, the pulse stream that the lower transducer array 80a continued to emit line up with the reflected pulses 94. The resonant pulse stream gains in strength as new and reflected pulses 94a and 94b combine.

Figure 14A:
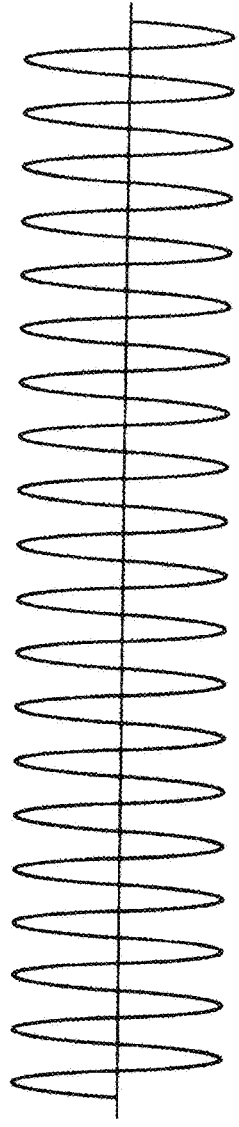
FIG. 14A is an example of an ultrasonic signal.
Figure 14B:
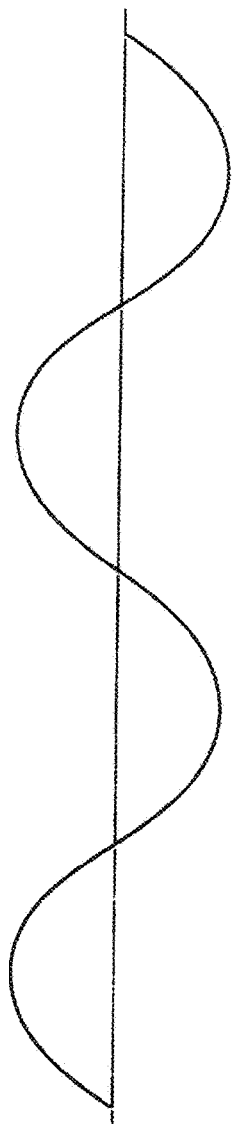
FIG. 14B is an example of an audio signal for modulating the ultrasonic signal.
Figure 14C:
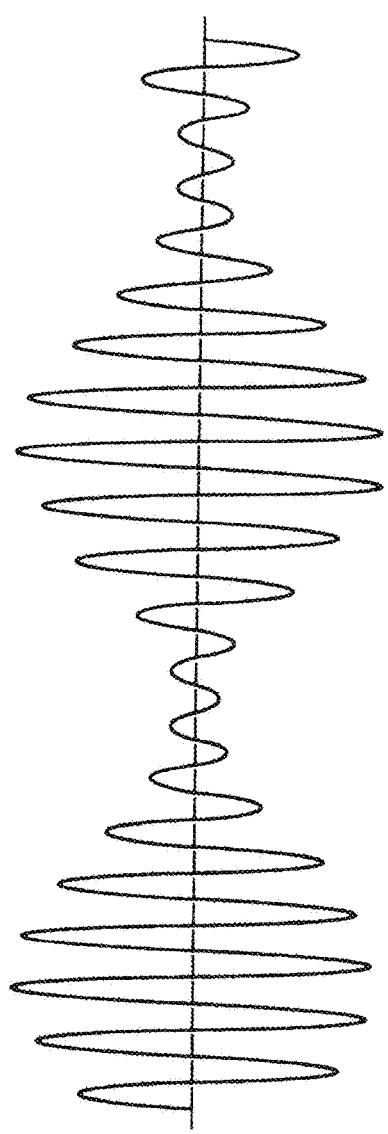
FIG. 14C is an example of the resulting amplitude modulated (AM) signal.

FIG. 14A is an example of an ultrasonic signal; FIG. 14B is an example of an audio signal for modulating the ultrasonic signal; and FIG. 14C is an example of the resulting amplitude modulated (AM) signal.

Instead of the ultrasonic transducers only emitting a full power pulse 94, and then completely stop emitting until the next pulse, with AM modulation the power level smoothly varies from one cycle to the next. The example has a carrier that is 10 times the modulating signal to make it clearer to see what is going on. In reality, the ultrasonic carrier may be at 455 kHz while the modulating signal may be perhaps only 1 kHz.

As the sound bounces back and forth across the channel 64, as long as the wavelengths are in phase, the sound level will continue to build up. There may be a limit to this building up, however, because water attenuates sound over distance, so the sound level will get smaller over time, and eventually won't substantially contribute any more, and at that point, after about 10 bounces since the first waveform is emitted, the sound level may be as loud as it's going to get in the channel 64.

But while there may be some advantages to having the sound bounce back and forth as long as possible; however, every time the sound bounces, the waveform may slightly spread out (smear). This is because sound waves that are angled slightly upward or downward will have to take a longer path to come all the way back, so they will be delayed. This added distance is equal to the cosine of the angle. Keeping the emitted beam diversion angle as narrow as possible will keep the vertical angle small, and will help overall, but also it might be preferred to specifically form the emitted beam shape so that the vertical spread angle, especially, is minimized. Also, increasing the ultrasonic frequency will help, because water attenuates higher frequencies more. So higher frequency sound will effectively bounce fewer times, limiting the smear.

The effect that the delayed waveforms may have on the audio waveform shape, might be to smear the waveform on its trailing edge. Note that the variation in the path lengths, and therefore the delays, are to always take more time, not less. And since the maximum delay of any resonant waveform (because of multiple bounces) may have a lower signal amplitude (because of water attenuation), then the contribution of more delayed signals might be less.

For example, for a 30-meter (width) channel 64, and with a vertical beam angle of 5 degrees, it will be delayed 1.14 meters after ten bounces. The wavelength at a 1 kHz signal is about 1.5 meters, so some portion of the waveform will have spread well into the next cycle. The smear will reduce the peaks and valleys of the resonant waveform, so it would not be as loud. So, depending on the vertical angle of the emitted beam, and the waveform shape, there is a point where allowing more bounces will reduce the sound level, not increase it.

If the vertical spread is only 2.5 degrees in the vertical direction, however, then the delay is only 0.28 meters, which means most of the waveform stays within its period. Since we know that some smear is inevitable, a way to keep a waveform from bleeding into the next period is to shorten up the waveform within its period. For example, if the waveform was just a full power pulse 94 that was on only during 0.2 meters of the 1.5 meter wavelength, then for the case of the 5 degree vertical spread, the pulse would be full power at the leading edge, then gets smeared backwards, and will be at minimum power at or before the end of the period. So the smearing would turn a low-duty-cycle pulse into a kind of flattened-top sawtooth wave, where the amplitude of the audio wave drops down to almost zero before the next full height pulse comes along.

Another consideration about minimizing the number of bounces is when we want to change the phase of the waveform so as to move the waveforms position in the channel (so that the troughs are not always in the same place, which could provide lower intensity sound area where fish might be less deterred). If there are more bounces, it will take more time to transition into the next pattern. For a 30-meter channel 64, the old sound will be bouncing around for perhaps 200 mS (time of 10 bounces) before the new pattern is built up.

So reducing vertical spread of the emitted sound beam, limiting the number of bounces (by increasing the ultrasound frequency), or by changing the wave shape of the audio signal to put more of the energy into a narrower peak, will all work to maximize the waveform power and spectral content.

Figure 15A:
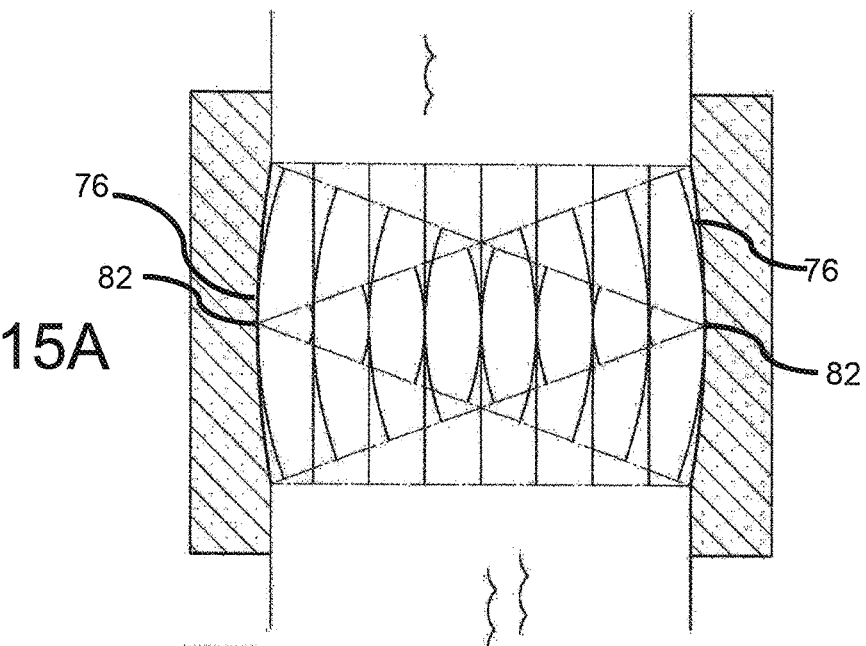
FIGS. 15A and 15B are plan views comparing a first exemplary embodiment with two parabolic reflectors (FIG. 15A) to a second exemplary embodiment with a parabolic reflector and a flat reflector (FIG. 15B).
Figure 15B:
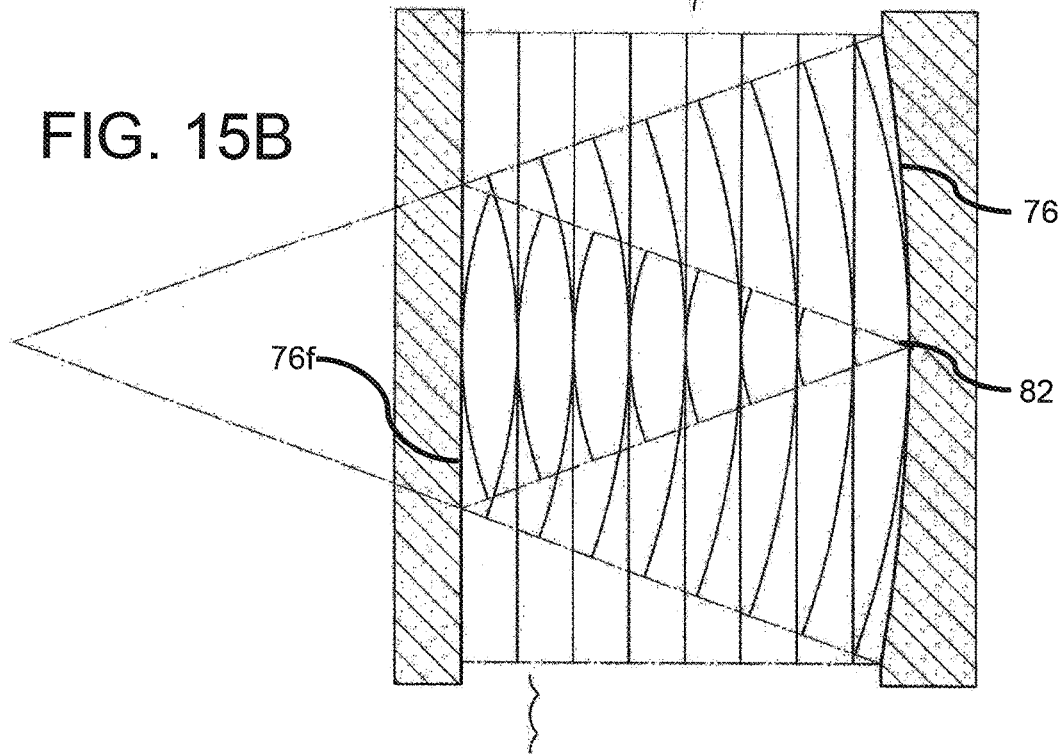

FIGS. 15A and 15B are plan views comparing a first exemplary embodiment with two parabolic reflectors 76 (FIG. 15A) to a second exemplary embodiment with a parabolic reflector 76 and a flat reflector 76f (FIG. 15B). Each is shown with the transducer beam angle of 60 degree (which is exaggerated, for clarity). The exemplary embodiment with flat reflector 76f takes up twice the space along a bank 66, and makes a barrier 60 twice a wide, which has to be filled with sound using transducers placed only on one side 66. Some of such embodiments could be employed across a small stream, where a wider barrier can be desirable, and supplying high levels of ultrasonic energy is not a problem. Some of such embodiments could also be employed at sites where supplying power to both sides 66 of the body of water 62 is undesirable, unpractical, or too costly.

Figure 15C:
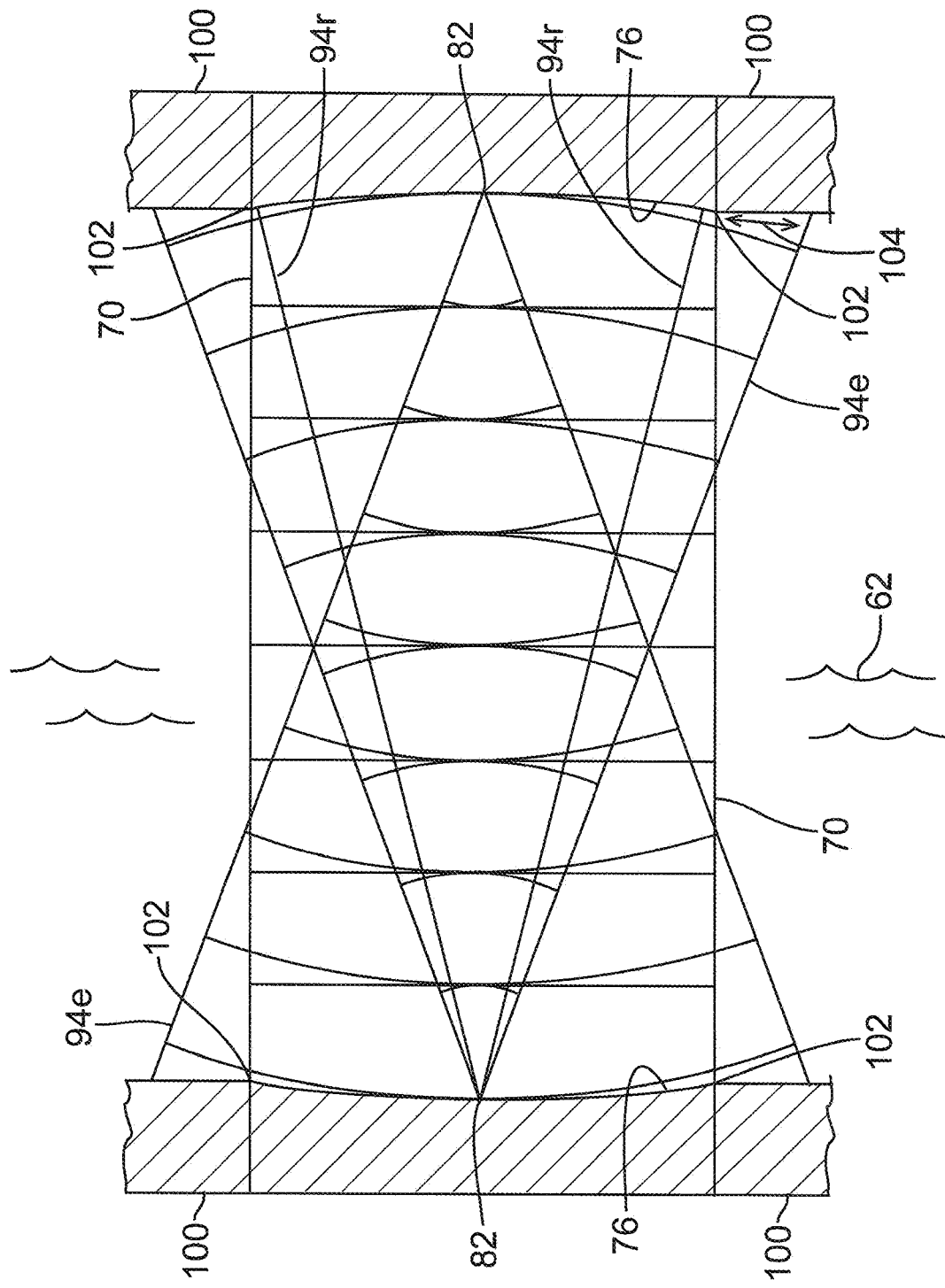
FIG. 15C is a plan view showing an embodiment in which the divergence angle of the transducers is larger than the opposing reflectors (the reflectors are smaller than the divergence angle of the opposing transducers) to facilitate creation of a sharper barrier edge.
Figure 15D:
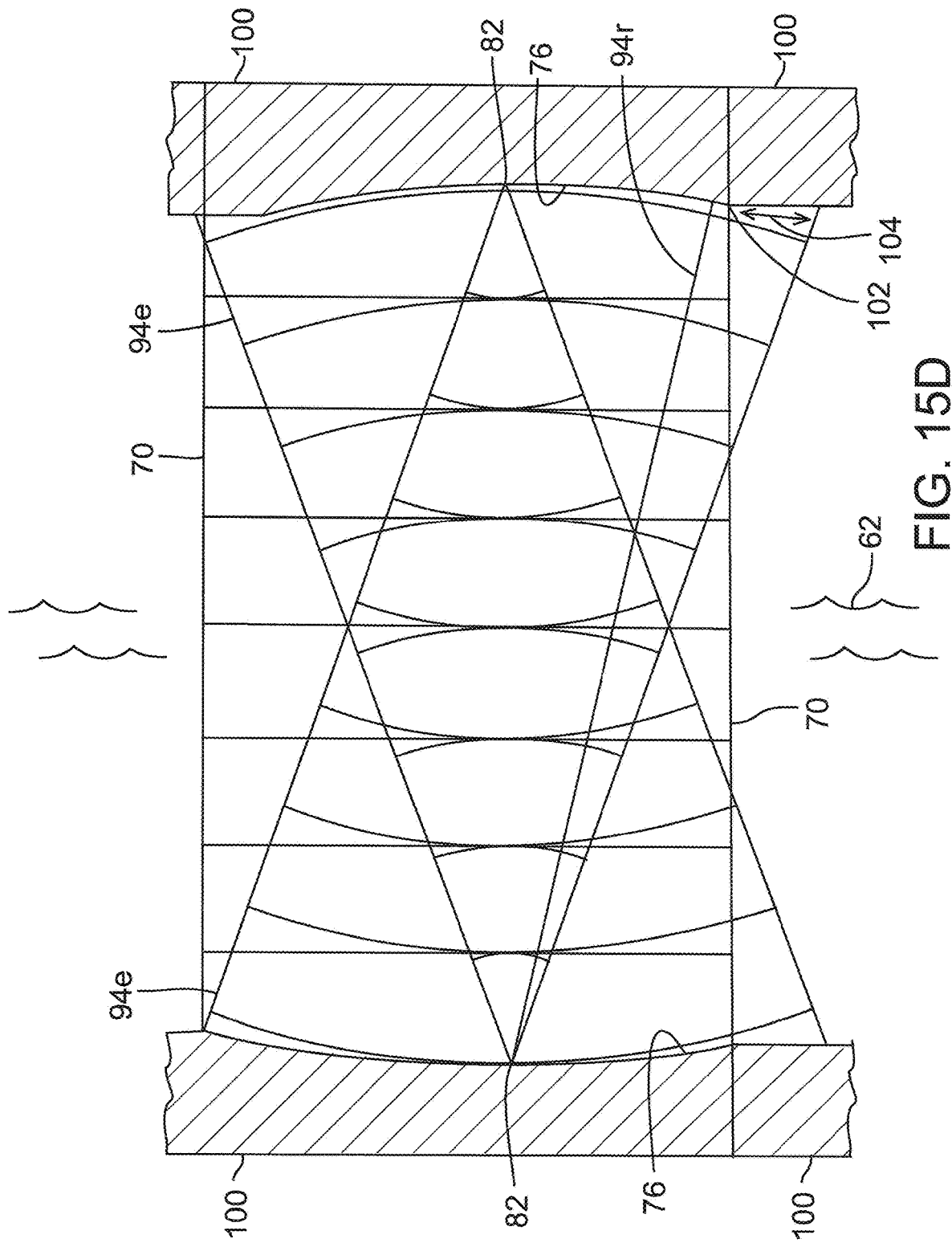
FIG. 15D is a plan view showing an embodiment in which the divergence angle of one of the transducers is larger than the opposing reflector (one of the reflectors is smaller than the divergence angle of the opposing transducer) to facilitate creation of a sharper barrier edge.
Figure 15E:
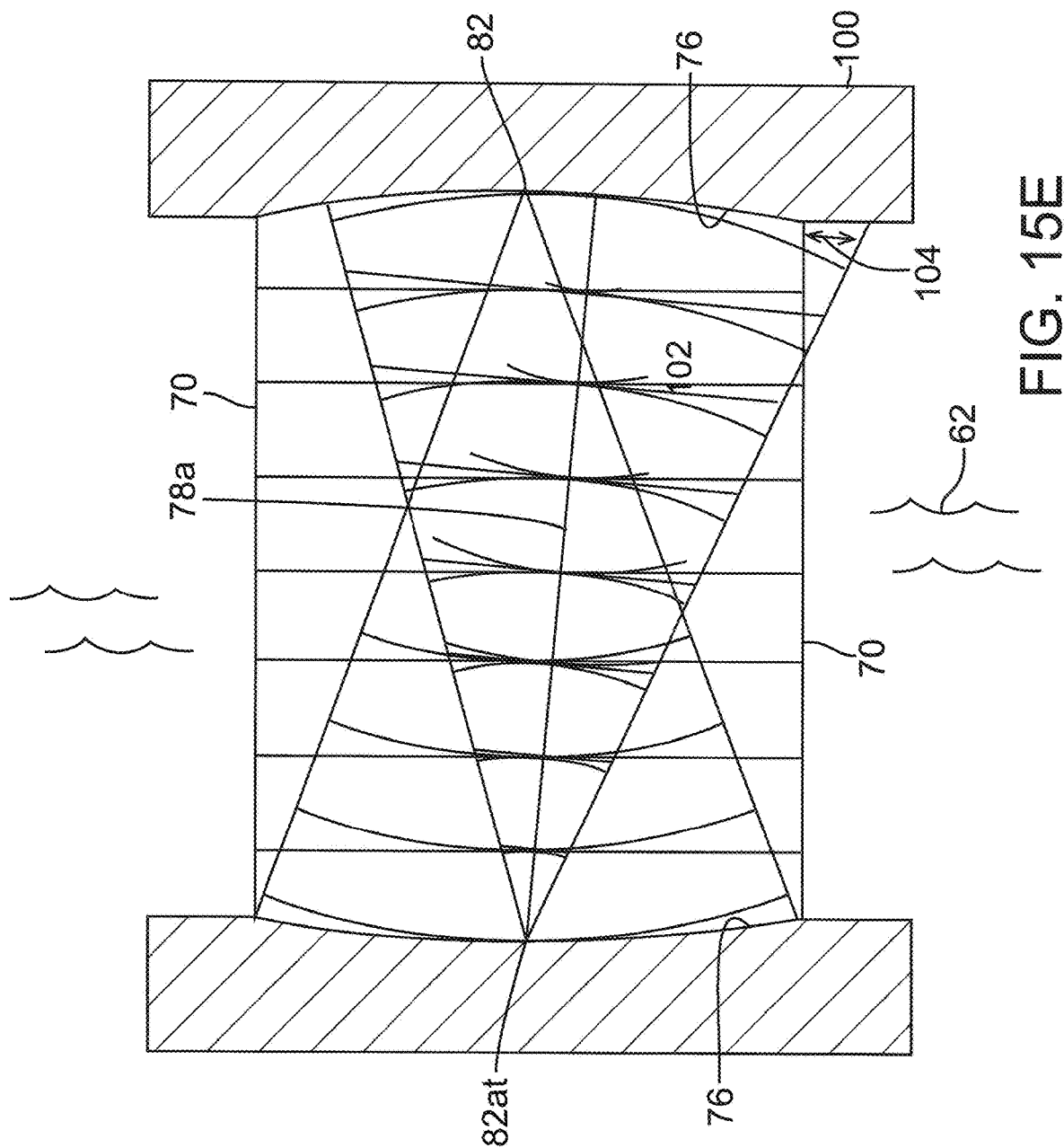
FIG. 15E is a plan view showing an embodiment in which the central axis of the divergence angle of one of the transducers is angled with respect to the opposing reflector to facilitate creation of a sharper barrier edge.

FIGS. 15C-15E show embodiments for of simple design modifications that can facilitate creation of a sharper barrier edge, such as by angling the central axis 78 of transducer emission and/or by selection of the divergence angle of the transducer emission to be greater than the width of one or both of the reflector ends.

The barrier 60 in FIG. 15C employs sound absorbers 100 that extend beyond the ends 102 of the reflectors 76 by a desired distance 104 to cancel out a portion of the edges of the divergent emitted wave 94e. The reflected wave 94r (shown only on one side, but there would be a reflected wave 94r going in the opposite direction) then creates a narrower sound wall 68.

The barrier 60 in FIG. 15D employs sound absorbers 100 that extend beyond the ends 102 of the reflectors 76 (but only on one of the upstream or downstream sides) by a desired distance 104 to cancel out a portion of the edges the edges of the divergent emitted wave 94e. The reflected wave 94r (shown only on one side, but there would be a reflected wave 94r going in the opposite direction) then creates a narrower sound wall 68.

The barrier 60 in FIG. 15E utilizes an angled the central axis 78 of transducer emission from array 82at. One will appreciate that both transducers can be angled.

Figure 16:
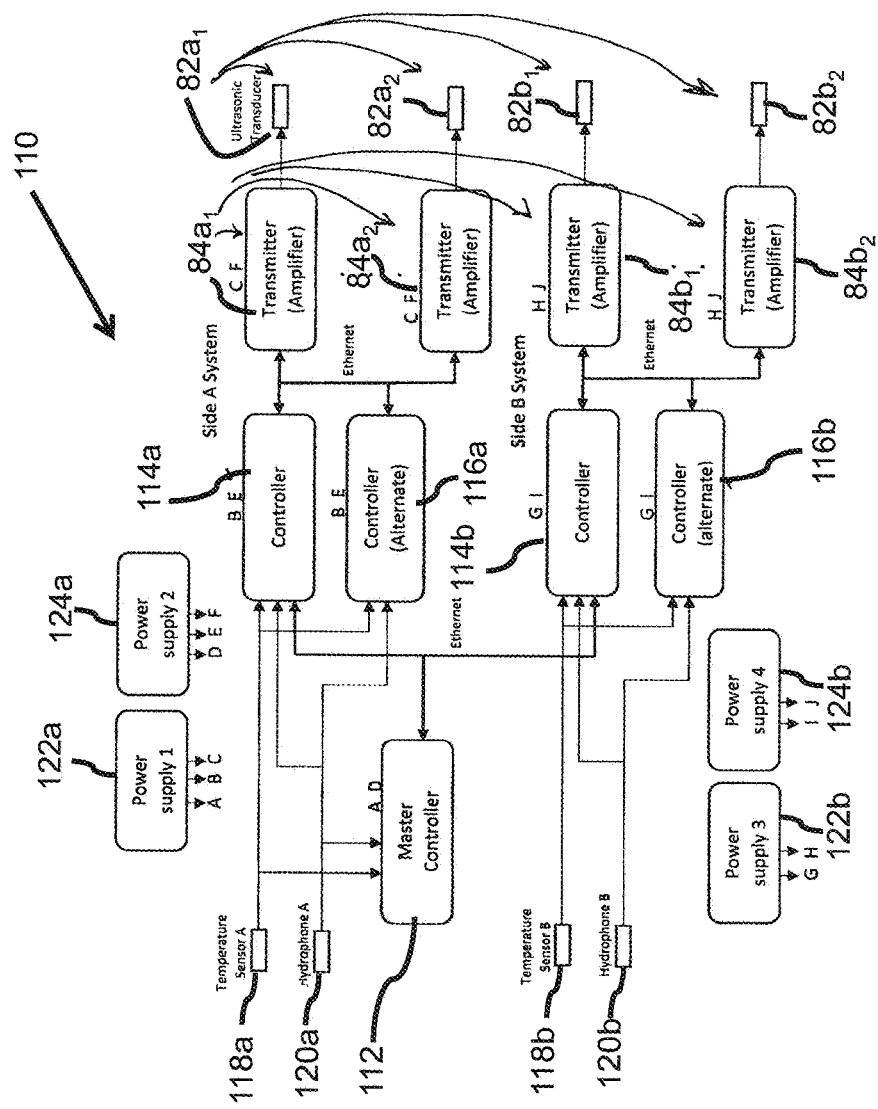
FIG. 16 is a schematic block diagram showing an exemplary embodiment of an electronic control system.

FIG. 16 is a schematic block diagram showing an exemplary embodiment of an electronic control system 110 that includes a master controller 112 for directly or indirectly controlling any or all of the various barrier system components including, but not limited to, the transducers of the arrays 82. The master controller 112 can ensure that the emitter arrays 82 on opposite sides 66 of the channel 64 are operating in synch. The master controller 112 can also reports back status and errors to the headquarters in charge of that barrier 60.

Each reflector side 108 may have one or more controllers 114 that communicate with the master controller 112. For example, side 108a may utilize a controller 114a that communicates with the master controller 112 via a network such as Ethernet, monitors the temperature and sound for side 108a of the channel 64, controls and monitors each of the many transmitters 84a, such as $84a_1$ and $84a_2$, via another network path, (such as Ethernet) and reports status back to the master controller 112. If the master controller 112 fails, the first controller 114 on each side 108 goes into a mode where it takes over controlling its side 108. The frequency that the controller 114 outputs may stay the same as the last valid instruction as a default; however, the default frequency may change with temperature and feedback from a hydrophone associated from the side associated with the controller 114. Without direct communication to the controller 114 on the other side 108 through a master controller 112, the two controllers 114a and 114b can communicate and synch to each other by sending specific ultrasonic synch and communication pulses. They can also agree to which controller 114a or 114b is in charge.

An alternate controller 116a for side 108a may monitor network traffic, but may control anything only if the main controller 114a fails. One will appreciate that the power output may be provided with enough capability so that one side 108a may be able to provide a sufficient sound wall 68, even if three of the four arrays 82 fail.

The controller 114b for side 108b may operate identically or differently from the way that controller 114a operates. Similarly, the alternate controller 116b for side 108b may operate identically or differently from the way that controller 116a operates.

One will appreciate that the transmitters 84 may all be located on a single side 108 in conjunction with a number of embodiments previously described. The transmitters 84 and transducers 82 are paired up. Note that since each transducer 82 is driving the same audio modulated ultrasound, the transmitters 84 could be combined so that each one can drive multiple transducers 82. However, each of the two arrays 82 should have separate controllers 114. The controllers 114 digitize and send to each transmitter 84 the modulation waveform, along with frequency, phase and power level information. The transmitters 84 preferably do the modulating. Also, for each amplifier 84 driving a particular transducer 82, there should be a monitoring system to detect if a transducer 82 has failed, or if it is/was out of the water 62. In both cases, that transducer 82 is shut down and the status is reported to the master controller 112. For cases when it has been determined that a transducer 82 is out of the water 62, the transmitter 84 can occasionally drive a test signal to see if the transducer 82 still out of the water 62.

The ultrasonic transducers 82 may be paired up with one transmitter output and may be split up into two arrays 82 for each side 108, and located as close as possible to the centerline of the exact focal point 80. Each array 82 should be able to be easily pulled out of the water 62, and reinstalled as a group, in order to do repairs or be swapped out. In some embodiments, sonar coverage can be maximized by thoughtful distribution of the transducers 82 or groups of transducers. Multiple columns may have groups of transducers 82 at different elevation levels. For example, each of multiple groups of transducers 82 in multiple columns of transducers 82 can be staggered vertically with respect to the multiple groups in neighboring columns. In a more specific example, a first column might have a group of three transducers 82 occupying the lowest three rows of transducers 82, and a neighboring column might have no transducers 82 in the lowest three rows, but might instead have transducers in rows four through six. Alternatively, the neighboring column might have transducers 82 in rows three through five so that there may be better coverage in the event of failure in a group.

Each of the sides 108a and 108b has its own temperature sensors 118a and 118b and sound sensors 120a and 120b. The master controller 112 could tap into a set of these sensors or have its own set.

In some embodiments, a primary power supply 122a runs all of the electronics on side 108a and connects to each function. For example, output A of the primary power supply 122a goes only to the master controller (assuming that it's on side 108a), output B goes to both of the controllers 114a and 116a, and output C goes to the transmitters $84a_1$ and $84a_2$. Each of these functional groups also receive outputs from a back up power supply 124a, so that if the primary power supply 122a fails, they can draw from back up power supply 124a. These power supplies 122a and 124a may also include battery backup in case of a power main failure.

Similarly, a primary power supply 122b runs all of the electronics on side 108a and connects to each function. For example, output G of the primary power supply 122a goes to both of the controllers 114b and 116b, and output H goes to the transmitters 84*b*1 and 84*b*2. Each of these functional groups also receive outputs from a back up power supply 124*b*, so that if the primary power supply 122*b* fails, they can draw from back up power supply 124*b*. These power supplies 122*b* and 124*b* may also include battery backup in case of a power main failure.

Figure 17:
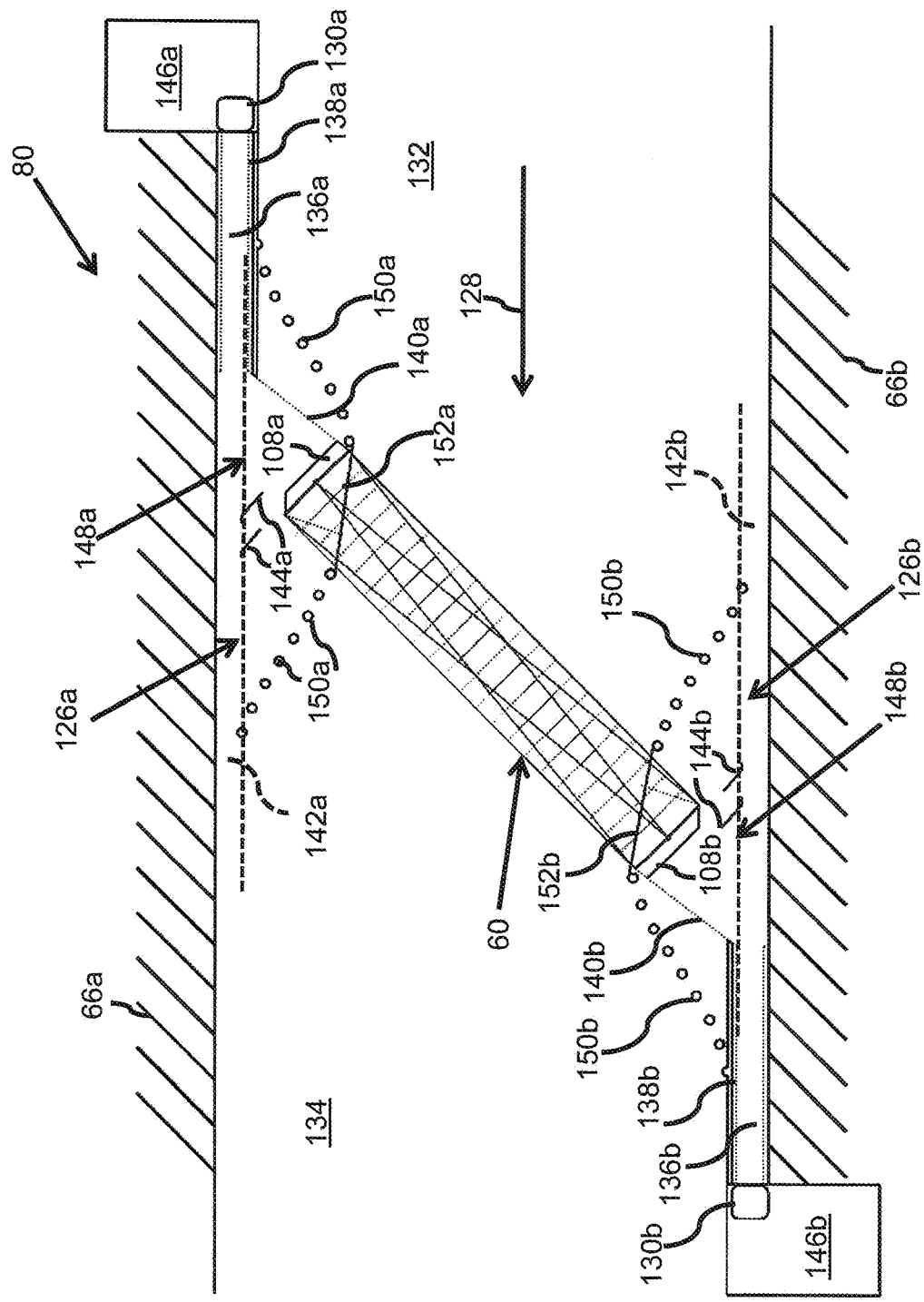
FIG. 17 is a plan view of an embodiment of barrier diversion system.

FIG. 17 is a plan view of an embodiment of barrier diversion system 80 whether electrified field, sound waves, or net, guiding the target fish 46 into a side channel 126 or capture pool 130 where all fish 46 can be captured in nets or by other means. While Asian carp may be more sensitive than native fish to the barrier 60, and should all be diverted into the capture pool 130, a few representatives of every species and size of fish 46 in the river may be caught, so this solution may additionally utilize people to sort out native fish from invasive ones and return the native fish to the body of water 62.

This diversion barrier 80, when built into a channel 64 or in a river or other body of water 62, can block fish coming from both upstream 132 and downstream 134 regardless of river flow direction 128. One objective may be to divert the fish 46 as they migrate upstream 132 to spawn. Should a few Asian carp or other invasive species ever get into the Great Lakes and establish a foothold there, this solution may also offer a way to eradicate them, since they need to spawn in fast moving water, and so are forced to swim into tributaries where this diversion barrier 80 can capture them.

In some embodiments, a diversion barrier 80 such as a sound barrier 60 at an angle across the channel 64 or river can be employed (or angled with respect to the direction of flow 128 of the current). If the loud and annoying diversion barrier 60 is pointing down and to the right (as is shown in FIG. 17), for example, the Asian carp that encounter the barrier 60 as they migrate upstream 132 may want to move to the left. One will appreciate, however, that the diversion barrier 60 can be angled in the opposite direction.

As the fish 46 reach the left bank 66*a*, a comfortable (with) side channel 126*a* may be provided that leads to a fish staging area 148*a* and into a long trough 136*a* that may be lined with a net 138*a* and/or lead to a capture pool 130*a*. The comfort channel 126*a* may extend from a quiet zone 142*a* and may employ one or more side lobe anti-reflectors 144*a* to provide a refuge in the staging area 148*a* from the disturbance provided by the main barrier 60. If the barrier 60 does not extend all the way to the trough 136*a*, then a supplemental barrier 140*a* may be employed to extend between the side 108*a* of the barrier 60 and the trough 136*a*. This supplemental barrier 140*a* may utilize a physical barrier such as a solid wall or a net, for example, or may utilize a non-physical barrier such as a sound barrier 60.

Depending on the size of the mesh of the net 138*a*, all the fish 46 can be captured. A net lifting mechanism (not shown) may surround the net 138*a* in the trough 136*a*. After fish 46 enter the trough 136*a*, the lifting mechanism may work by slowly blocking off the opening, forcing the fish forward, and eventually dumps them out into the capture pool 130*a*. Then the lifting mechanism returns to repeat the process all over again. When there is heavy fish migration, the mechanism can be sped up to avoid overloading the net 138*a*. The right bank 66*b* can be similarly equipped with a comfort channel 126*b*, a quiet zone 142*b*, one or more side lobe anti-reflectors 144*b*, a barrier 140*b*, a trough 136*b*, a net 138*b*, and a capture pool 130*b*. An example of a continuous netting sequence 160 is shown in FIG. 18.

As previously described, fish 46 that are going both upstream 132 and downstream 134 are diverted into comfort side channels 126. At the end of each channel 126 is a capture pool 130 where the fish 40 are dumped until they can be sorted. Asian carp are then picked out and packed into fish containers to be taken to a processing plant (which may even be on-site), and native species are released on the opposite side of the barrier 60 from where they were captured. Buildings 146*a* and 146*b* may be used to sort and pack fish and may include a protected space for the capture pools 130.

Pylons 150*a* and 150*b* may be employed to protect the equipment-housing sides 108 and reflectors 76 of the barrier 60 from accidental damage from river traffic. A heavy cable 152 across the barrier 60 connecting the pylons 150 may be mounted above the surface 45 of the water 62 so as not to interfere with operation of the barrier 60. One will appreciate that the sound barrier 60, itself, would not need protection.

The pair of little reflectors 144*a*, located at the upstream end of the barrier 60, where the Asian carp that are being diverted away from the barrier 60 and entering the quiet channel, may be used to block any sonar side lobes (if the resonant ultrasonic barrier 60 is being used) and may be placed at ¼ wavelength spacing from the main beam, so that their reflections cancel the side lobes and make the edge 70 of the barrier 60 sharper.

FIGS. 18A and 18B show respective perspective and end views of a netting mechanism 164, and FIG. 18C shows a series of side views demonstrating an example of a netting sequence 160 in which fish 46 are repetitively netted. FIGS. 18A, 18B, and 18C can collectively be referred to as FIG. 18. With reference to FIG. 18, the netting sequence 160 may include net movement events 162*a*-162*d* (collectively 162) of the net mechanism 164 to lift the net 138 and dump out the fish 46 into a capture pool 130, a fish bin, or a sorting and/or packing area.

The net 138 may be anchored on the bottom 166 and sides 168 and or corners at an opening 170 (on the right side as shown in FIG. 18) of the trough 136. There may be no way for fish to get over, under, or around the net 138. In this embodiment, the mechanism 164 has two or more rollers 172*a* and 172*b* (collectively 172) that hang from tracks (not shown) that are above the water 62. The hanging rollers 172 follow a continuous counter-clockwise motion of the track, so as to first block off the opening 170 of the net 138 by lifting it high above the surface 45 of the water 62, and then by driving the fish 46 forward (toward the left), until they are eventually dumped out. In addition to the rollers 172 moving along with the motion of the track, they also have powered rotation. The rollers 172 have knobs (not shown) that engage in the net openings so that the rotation of the rollers 172 can help lift the net 138 up and over the rollers 172. This functionality may be desirable at the back end (left side of FIG. 18C) when the net 138 is full of fish 46 and has to be lifted up so that the fish 46 can be dumped out.

The net 138 may be anchored at its open end 170 and may be held up by beams supported on each end. Also, the rollers 172 may be hung from the tracks at an angle so that the rollers 172 do not hit each other as one roller 172 crosses over and above the other roller 172.

The event 162*a* shows the net 138 in an open condition to accept fish 46. One roller 172*a* is toward the front opening 170 (at the right side of the drawing) at the right side 168*a* of the trough 136 and toward the bottom 166. At event 162*b*, the roller 172*a* has moved counter-clockwise to be at the left side 168*b* of the trough 136 and at an elevated position. The roller 172*b* is at the back of the trough and moving downward and toward the right side 168*a*. At the event 162*c*, the roller 172*a* has continued to move counter-clockwise to be closer to the back of the trough 136 at the left side 168*b* and at an elevated position. The roller 172b is in the middle at the right side 168a of the trough 136 and moving toward the opening 170. At event 162b, the roller 172a is at the back of the trough 136 at or near the left side 168b, causing the fish 46 to be dumped out of the net 138. The roller 172b is at the opening 170 of the net 138 near bottom on the right side 168a of the trough 136.

The overall power requirements should be relatively low. The diversion barrier 60 might utilize few tens of kilowatts, but the netting mechanism 164 utilizes relatively low power.

As a back up or extra deterrent, the barrier 60 may also employ a supplemental barrier (not shown) in addition to sound, such as a luminous barrier. In some embodiments, the luminous barrier may be implemented by employing sound reflectors 76 that are also optically reflective. The reflectors 76 may house the light sources directly. However, the light source does not have to be underwater near the transducers 82, the light source could be topside and propagated down and emitted alongside the transducers 82, then the light generating system would not need to take up as much space underwater or in front of the reflectors 76. Common ways to propagate light include fiber optics and/or mirrors. Optical fibers could be used to propagate light from one or more above-surface light sources to emission locations under water.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A method for creating an ultrasonic barrier that deters passage of non-native fish in a body of water having a surface and opposing first and second banks and containing non-native fish and native fish, the method comprising:
generating ultrasonic waves;
modulating the ultrasonic waves at a frequency detectable by the non-native fish; and
propagating the ultrasonic waves between a first reflector on the first bank and a second reflector on the second bank, wherein one of the first or second reflectors comprises a directional reflector, to create the ultrasonic barrier to deter passage of the non-native fish through the ultrasonic barrier while permitting native fish to pass through the ultrasonic barrier.

2. The method of claim 1, wherein the first and second reflectors both comprise a directional reflector, such that the first reflector propagates the ultrasonic waves towards the second reflector and such that the second reflector propagates the ultrasonic waves toward the first reflector.

3. The method of claim 1, wherein the directional reflector appears parabolic from its top and cylindrical from its side.

4. The method of claim 1, wherein the body of water has a floor at its bottom, and wherein at least one of the reflectors extends to the floor of the body of water.

5. The method of claim 1, wherein at least one of the reflectors includes a surface portion that extends above the surface of the water to a height greater than or equal to a highest flood stage level.

6. The method of claim 1, wherein the first reflector comprises a first directional reflector having a first surface, wherein the the second reflector comprises a second directional reflector having a second surface, wherein the first surface has a first horizontal width with a first reflector central axis, wherein the second surface has a second horizontal width with a second reflector central axis, wherein the ultrasonic waves are generated by one or more first ultrasonic transducers that are operatively connected to the first surface in proximity to or within 50 cm of the first reflector central axis of the first surface of the first reflector, and wherein the ultrasonic waves are generated by one or more second ultrasonic transducers that are operatively connected to the second surface in proximity to or within 50 cm of the second reflector central axis of the second surface of the second reflector, wherein a first shape of a first reflector creates a first reflector focal point on the second reflector in proximity to the second reflector central axis, wherein a second shape of a second reflector creates a second reflector focal point on the first reflector in proximity to the first reflector central axis, wherein the first and second transducers each have an emission divergence angle and a central emission axis, wherein the central emission axes are directed at the opposing reflector focal points.

7. The method of claim 1, wherein the first reflector comprises a first directional reflector having a first surface, wherein the second reflector comprises a second directional reflector having a second surface, wherein the first surface has a first horizontal width with a first reflector central axis, wherein the second surface has a second horizontal width with a second reflector central axis, wherein the ultrasonic waves comprise first ultrasonic waves generated by one or more first ultrasonic transducers operatively connected to the first surface in proximity to or within 50 cm of the first reflector central axis of the first surface of the first reflector, and wherein the ultrasonic waves comprise second ultrasonic waves generated by one or more of the second ultrasonic transducers operatively connected to the second surface in proximity to or within 50 cm of the second reflector central axis of the second surface of the second reflector, wherein a first shape of a first reflector creates a first reflector focal point on the second reflector in proximity to the second reflector central axis, wherein a second shape of a second reflector creates a second reflector focal point on the first reflector in proximity to the first reflector central axis, wherein the first and second transducers each have an emission divergence angle and a central emission axis, wherein the body of water has a current with a flow speed and a flow direction, wherein at least one of the central emission axes is directed at angle offset from the opposing reflector focal point in an offset direction that is opposite to the flow direction.

8. The method of claim 1, wherein the ultrasonic waves are continuously generated by one or more ultrasonic transducers to maintain the ultrasonic barrier, and wherein one or more of the ultrasonic transducers comprise transmitters.

9. The method of claim 1, wherein the ultrasonic waves are generated by first ultrasonic transducers at the first bank and second ultrasonic transducers at the second bank, wherein first and second sets of respective the first and second ultrasonic transducers employ multiple transducers, and wherein at least one of the sets is arranged as a vertical array of transducers.

10. The method of claim 1, wherein the ultrasonic waves are generated by multiple ultrasonic transducers that are configured to broadcast in phase.

11. The method of claim 1, wherein a modulator is operable to amplitude modulate, by an audio waveform, an ultrasonic signal emittable from an ultrasonic transducer that generates the ultrasonic waves.

12. The method of claim 1, wherein modulating an audio frequency of the ultrasonic waves is selected to build resonance between the first and second reflectors.

13. The method of claim 12, wherein one or more transducer drivers that modulate the ultrasonic waves are in operative communication with a controller, wherein the controller is operable to adjust modulation of the ultrasonic waves in response to temperature information, wherein an audio modulating frequency for the ultrasonic waves is adjusted so that it is as close as possible to a frequency detectable by the non-native fish while still maintaining resonance.

14. The method of claim 1, wherein an audio frequency or phase of a modulation signal of the ultrasonic waves is operable to shift physical locations of peaks and troughs of sound in the ultrasonic barrier.

15. The method of claim 1, wherein a modulator is operable to provide audio modulated ultrasound in phase with reflected audio modulated ultrasound.

16. The method of claim 1, wherein a modulator is operable to provide a modulating signal with a phase for the ultrasonic waves, and wherein the modulator is operable to shift the phase of a modulating signal for the ultrasonic waves.

17. The method of claim 1, wherein an emission angle of one or more transducers that generate the ultrasonic waves are adapted to permit initial ultrasonic waves to exceed the width of an opposite reflector, thereby facilitating a crisper edge to the ultrasonic barrier.

18. The method of claim 1, wherein sound absorbers are positioned adjacent to one or more edges of the reflectors to absorb sound that spills over edges of the reflector, wherein the sound absorbers comprise one or more of: vertical dispersers, dampeners, or baffles.

19. The method of claim 1, wherein transducers and their respective drivers that generate the ultrasonic waves are arranged in multiple columns including first and second columns, wherein the second column is operable to be inactive while first column is active, wherein the second column is operable to become active when the first column becomes inactive, wherein the first column is operable to be replaced while the second column is active.

20. The method of claim 1, wherein the reflectors include one or more reflectors positioned along each bank and beneath the surface of the water, wherein at least one of the reflectors on at least one of the banks comprises a directional focusing reflector, wherein the ultrasonic waves are generated by one or more ultrasonic transducers operatively connected to at least one reflector on at least one of the banks, wherein the one or more ultrasonic transducers are capable of operating at one or more frequencies between 75 kHz and 600 kHz and are adapted for modulation by one or more audio waveforms, wherein one or more transducer drivers are operatively connected to the one or more ultrasonic transducers to establish the one or more frequencies and the one or more waveforms, and wherein one or more controllers are configured for setting the one or more frequencies and the one or more waveforms.

21. The method of claim 1, wherein the first reflector is focused at the second reflector.

22. The method of claim 1, wherein the directional reflector is at least partly parabolic.

23. The method of claim 1, wherein the ultrasonic barrier includes substantially parallel first and second barrier edges and a barrier core, wherein the barrier edges are sufficiently uniform such that different points along the barrier edge have less than or equal to 5 decibel difference.

24. The method of claim 1, wherein the reflectors have a size and shape large enough to reflect greater than or equal to 70% of the power of the ultrasonic waves emitted from an opposing transducer employed to generate the ultrasonic waves.

25. The method of claim 1, wherein the reflectors have a depth, and wherein ultrasonic transducers extend along at least 95% of the depth of one of the reflectors.

26. The method of claim 1, wherein each directional reflector has a width that is greater than 1 meter.

27. A system for deterring a target fish from obtaining passage to a region of a body of water having a surface and opposing first and second banks while permitting non-target fish to pass into the region of the body of water, comprising:
one or more reflectors positioned along each of the first and second banks and beneath the surface of the water, wherein at least one of the reflectors on at least one of the banks comprises a directional reflector;
one or more ultrasonic transducers operatively connected to at least one reflector on at least one of the banks, wherein the one or more ultrasonic transducers are capable of operating at one or more frequencies greater than 40 kHz and are adapted for modulation by one or more audio waveforms;
one or more transducer drivers operatively connected to the one or more ultrasonic transducers to establish the one or more frequencies and the one or more waveforms; and
one or more controllers configured for setting the one or more frequencies and the one or more waveforms to create ultrasonic waves, wherein the directional reflector is configured to reflect the ultrasonic waves emanating from one of the opposing banks toward the one or more reflectors positioned along the other one of the opposing banks.

28. The system of claim 27, wherein the ultrasonic waves are configured to create an audio modulated ultrasonic barrier to deter passage of the non-native fish through the ultrasonic barrier while permitting native fish to pass through the ultrasonic barrier.

29. The system of claim 27, wherein the directional reflector is positioned along the first bank and is focused at one or more of the reflectors positioned along the second bank.

30. The system of claim 27, wherein the directional reflector is at least partly parabolic.

31. The system of claim 27, wherein the reflectors include a first directional reflector first bank and a second directional reflector on the second bank, wherein the first directional reflector has a first surface, wherein the second reflector has a second surface, wherein the first surface has a first horizontal width with a first reflector central axis, wherein the second surface has a second horizontal width with a second reflector central axis, wherein the ultrasonic waves are generated by one or more first ultrasonic transducers that are operatively connected to the first surface in proximity to or within 50 cm of the first reflector central axis of the first surface of the first reflector, and wherein the ultrasonic waves are generated by one or more second ultrasonic transducers that are operatively connected to the second surface in proximity to or within 50 cm of the second reflector central axis of the second surface of the second reflector, wherein a first shape of a first reflector creates a first reflector focal point on the second reflector in proximity to the second reflector central axis, wherein a second shape of a second reflector creates a second reflector focal point on the first reflector in proximity to the first reflector central axis, wherein the first and second transducers each have an emission divergence angle and a central emission axis, wherein the central emission axes are directed at the opposing reflector focal points.

32. The system of claim 27, wherein the ultrasonic barrier includes substantially parallel first and second barrier edges and a barrier core, wherein the barrier edges are sufficiently uniform such that different points along the barrier edge have less than or equal to 5 decibel difference.

33. The system of claim 27, wherein the reflectors have a size and shape large enough to reflect greater than or equal to 70% of the power of the ultrasonic waves emitted from an opposing transducer.

34. The system of claim 27, wherein the reflectors have a depth, and wherein the ultrasonic transducers extend along at least 95% of the depth of one of the reflectors.

35. The system of claim 27, wherein each directional reflector has a width that is greater than 1 meter.

36. The method of claim 35, wherein the ultrasonic waves are amplitude modulated by an audio waveform having an audio frequency that is greater than or equal to 0.5 kHz and less than or equal to 5 kHz.

* * * * *